(12) United States Patent  
Smart et al.

(10) Patent No.: US 8,795,903 B2  
(45) Date of Patent: Aug. 5, 2014

(54) LITHIUM-ION ELECTROLYTES CONTAINING FLAME RETARDANT ADDITIVES FOR INCREASED SAFETY CHARACTERISTICS

(75) Inventors: Marshall C. Smart, Studio City, CA (US); Kiah A. Smith, Milwaukee, WI (US); Ratnakumar V. Bugga, Arcadia, CA (US); Surya G. Prakash, Hacienda Heights, CA (US); Frederick Charles Krause, San Francisco, CA (US)

(73) Assignee: California Institute of Technology, Pasadena, CA (US)

( * ) Notice: Subject to any disclaimer, the term of this patent is extended or adjusted under 35 U.S.C. 154(b) by 918 days.

(21) Appl. No.: 12/543,495

(22) Filed: Aug. 18, 2009

(65) Prior Publication Data

US 2010/0047695 A1 Feb. 25, 2010

Related U.S. Application Data

(60) Provisional application No. 61/189,415, filed on Aug. 19, 2008, provisional application No. 61/201,842, filed on Dec. 16, 2008.

(51) Int. Cl.
*H01M 6/16* (2006.01)

(52) U.S. Cl.
USPC ........... 429/332; 429/330; 429/199; 429/200; 429/307; 429/331; 252/62.2

(58) Field of Classification Search
USPC ............... 429/332, 330, 199, 200, 307, 331; 252/62.2
See application file for complete search history.

(56) References Cited

U.S. PATENT DOCUMENTS

| | | | |
|---|---|---|---|
| 6,399,255 B2 | 6/2002 | Herreyre et al. | |
| 6,492,064 B1 | 12/2002 | Smart et al. | |
| 2005/0277027 A1* | 12/2005 | Kim et al. | 429/330 |
| 2006/0073391 A1* | 4/2006 | Kim | 429/329 |
| 2009/0017386 A1* | 1/2009 | Xu et al. | 429/331 |

OTHER PUBLICATIONS

Doughty, D.H., et al., "Effects of Additives on Thermal Stability of Li Ion Cells", Journal of Power Sources, 2005, 146, pp. 116-120.
Ma, Y., et al., "A Phosphorous Additive for Lithium-Ion Batteries", Electrochemical and Solid State Letters, 2008, 11 (8), pp. A129-A131.
Nam, T., et al., "Diphenyloctyl Phosphate and Tris(2,2,2-trifluoroethyl) Phosphite as Flame-Retardant Additives for Li-Ion Cell Electrolytes at Elevated Temperatures", Journal of Power Sources, 2008, 180, pp. 561-567.

(Continued)

*Primary Examiner* — Laura Weiner

(57) ABSTRACT

The invention discloses various embodiments of Li-ion electrolytes containing flame retardant additives that have delivered good performance over a wide temperature range, good cycle life characteristics, and improved safety characteristics, namely, reduced flammability. In one embodiment of the invention there is provided an electrolyte for use in a lithium-ion electrochemical cell, the electrolyte comprising a mixture of an ethylene carbonate (EC), an ethyl methyl carbonate (EMC), a fluorinated co-solvent, a flame retardant additive, and a lithium salt. In another embodiment of the invention there is provided an electrolyte for use in a lithium-ion electrochemical cell, the electrolyte comprising a mixture of an ethylene carbonate (EC), an ethyl methyl carbonate (EMC), a flame retardant additive, a solid electrolyte interface (SEI) film forming agent, and a lithium salt.

9 Claims, 40 Drawing Sheets

TRIPHENYL PHOSPHATE

(56) References Cited

OTHER PUBLICATIONS

Smart, M.C., et al., "Improved Performance of Lithium-Ion Cells With the Use of Fluorinated Carbonate-Based Electrolytes", Journal of Power Sources, 2003, 119-121, pp. 359-367.

Smith, K.A., et al., "Lithium-Ion Electrolytes Containing Flame-Retardant Additives for Increased Safety Characteristics", ECS Transactions, 2009, 16 (35), pp. 33-41, The Electrochemical Society.

Smith, K.A., et al., "Lithium-Ion Electrolytes Containing Flame-Retardant Additives for Increased Safety Characteristics", 214th Meeting of the Electrochemical Society, Honolulu, HI, Oct. 15, 2008.

Wang, X., et al., "Nonflammable Trimethyl Phosphate Solvent-Containing Electrolytes for Lithium-Ion Batteries", Journal of the Electrochemical Society, 2001, 148 (10), pp. A1058-A1065.

Wang, X., et al., "Nonflammable Trimethyl Phosphate Solvent-Containing Electrolytes for Lithium-Ion Batteries", Journal of the Electrochemical Society, 2001, 148 (10), pp. A1066-A1071.

Xu, K., et al., "An Attempt to Formulate Nonflammable Lithium Ion Electrolytes with Alkyl Phosphates and Phosphazenes", Journal of the Electrochemical Society, 2002, 149 (5), pp. A622-A626.

Xu, K., et al., "Nonflammable Electrolytes for Li-Ion Batteries Based on a Fluorinated Phosphate", Journal of the Electrochemical Society, 2002, 149 (8), pp. A1079-A1082.

Xu, K., et al., "Evaluation of Fluorinated Alkyl Phosphates as Flame Retardants in Electrolytes for Li-Ion Batteries", Journal of the Electrochemical Society, 2003, 150 (2), pp. A161-A169.

Xu, K., "Nonaqueous Liquid Electrolytes for Lithium-Based Rechargeable Batteries", Chem. Rev., 2004, 104, pp. 4303-4417.

Zhang, S.S., et al., "Tris(2,2,2-Trifluoroethyl) Phosphite as a Co-Solvent for Nonflammable Electrolytes in Li-Ion Batteries", Journal of Power Sources, 2003, 113, pp. 166-172.

\* cited by examiner

Fig. 1

Charge-discharge characteristics of experimental lithium-ion cells containing various electrolytes subjected to formation cycling

| ELECTROLYTE TYPE | CHARGE CAPACITY (Ah) 1ST CYCLE | DISCHARGE CAPACITY (AH) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH CYCLE) | COULOUMBIC EFFICIENCY (5TH CYCLE) |
|---|---|---|---|---|---|---|---|---|
| 1.0 M LiPF6 EC+EMC (20:80 v/v %) | 0.4216 | 0.3334 | 0.088 | 79.08 | 0.3341 | 0.3266 | 0.1241 | 97.76 |
| 1.0 M LiPF6 EC+EMC (20:80 v/v %) | 0.46816 | 0.40443 | 0.064 | 86.39 | 0.40126 | 0.39136 | 0.1136 | 97.53 |
| 1.0 M LiPF6 EC+DEC+DMC (1:1:1 v/v) | 0.47882 | 0.41059 | 0.068 | 85.75 | 0.41169 | 0.39789 | 0.1313 | 96.65 |
| 1.0 M LiPF6 EC+EMC+TFEB (20:60:20 v/v %) | 0.51793 | 0.44202 | 0.076 | 85.34 | 0.43826 | 0.43123 | 0.1140 | 98.40 |
| 1.0 M LiPF6 EC+EMC+TFEB+TPP (20:55:20:5 v/v %) | 0.48152 | 0.41348 | 0.068 | 85.87 | 0.40638 | 0.39901 | 0.1045 | 98.19 |
| 1.0 M LiPF6 EC+EMC+TFEB+TBP (20:55:20:5 v/v %) | 0.48621 | 0.40535 | 0.081 | 83.37 | 0.40872 | 0.39525 | 0.1393 | 96.70 |
| 1.0 M LiPF6 EC+EMC+TFEB+TEP (20:55:20:5 v/v %) | 0.46896 | 0.38857 | 0.080 | 82.86 | 0.39595 | 0.38401 | 0.1340 | 96.98 |
| 1.0 M LiPF6 EC+EMC+TFEB+BTFEMP (20:55:20:5 v/v %) | 0.48073 | 0.39720 | 0.084 | 82.62 | 0.39859 | 0.38546 | 0.1476 | 96.71 |

Fig. 2

Summary of the Discharge Capacity at Low Temperature for MCMB-LiNiCoO$_2$ containing Electrolytes with Flame Retardant Additives

| TEMP. (°C) | DISCHARGE CURRENT (mA) | 1.00 M LiPF6 EC+EMC+TFEB (20:60:20 v/v %) CAPACITY (Ah) | PERCENT (%) | 1.0 M LiPF6 EC+EMC+TFEB+TPhPh (20:55:20:5 v/v %) CAPACITY (Ah) | PERCENT (%) | 1.0 M LiPF6 EC+EMC+TFEB+TBuPh (20:55:20:5 v/v %) CAPACITY (Ah) | PERCENT (%) | 1.0 M LiPF6 EC+EMC+TFEB+TEtPh (20:55:20:5 v/v %) CAPACITY (Ah) | PERCENT (%) | 1.0 M LiPF6 EC+EMC+TFEB+TFMPo (20:55:20:5 v/v %) CAPACITY (Ah) | PERCENT (%) |
|---|---|---|---|---|---|---|---|---|---|---|---|
| 23° | 25 | 0.4312 | 100.00 | 0.3990 | 100.00 | 0.3953 | 100.00 | 0.3840 | 100.00 | 0.3855 | 100.00 |
| 0° | 25 | * | * | 0.3012 | 75.50 | 0.2898 | 73.32 | 0.2553 | 66.48 | 0.2867 | 74.37 |
| -20° | 25 | 0.3718 | 86.22 | 0.2583 | 64.73 | 0.2708 | 68.51 | 0.2218 | 57.75 | 0.2469 | 64.05 |
|  | 50 | 0.3528 | 81.81 | 0.2290 | 57.38 | 0.0416 | 10.51 | 0.1681 | 43.77 | 0.1810 | 46.95 |
|  | 100 | * | * | 0.1244 | 31.19 | 0.1141 | 28.87 | 0.0625 | 16.28 | 0.0532 | 13.80 |
| -30° | 25 | * | * | 0.1432 | 35.88 | 0.2022 | 51.15 | 0.0626 | 16.31 | 0.1461 | 37.90 |
| -40° | 25 | 0.3166 | 73.42 | 0.0789 | 19.76 | 0.0879 | 22.25 | 0.2023 | 52.67 | 0.0894 | 23.20 |
|  | 50 | 0.2631 | 61.01 | 0.0366 | 9.17 | 0.0416 | 10.51 | 0.0472 | 12.30 | 0.0389 | 10.09 |
|  | 100 | * | * | 0.0245 | 6.13 | 0.0288 | 7.30 | 0.0305 | 7.94 | 0.0259 | 6.73 |
| -50° | 25 | 0.2024 | 46.94 | 0.0253 | 6.34 | 0.0301 | 7.61 | 0.0281 | 7.31 | 0.0271 | 7.03 |
|  | 50 | 0.0324 | 7.51 | 0.0004 | 0.09 | 0.0201 | 5.09 | 0.0208 | 5.42 | 0.0195 | 5.05 |
| -60° | 5 | 0.2723 | 63.14 | 0.0660 | 16.54 | 0.1206 | 30.52 | 0.0590 | 15.35 | 0.0518 | 13.43 |
|  | 10 | 0.1918 | 44.48 | 0.0008 | 0.19 | 0.0074 | 1.87 | 0.0051 | 1.34 | 0.0042 | 1.10 |
|  | 25 | 0.0209 | 4.85 | 0.0004 | 0.09 | 0.0063 | 1.60 | 0.0099 | 2.58 | 0.0079 | 2.05 |

Discharge capacity at -20°C (expressed as percent of room temperature capacity) of MCMB-LiNiCoO$_2$ cells containing electrolytes with Flame Retardant Additives

TRIPHENYL PHOSPHATE

TRIBUTYL PHOSPHATE

TRIETHYL PHOSPHATE

BIS (2,2,2-TRIFLUOROETHYL)
METHYL PHOSPHONATE

TRIS (2,2,2-TRIFLUOROETHYL) PHOSPHATE

TRIS (2,2,2-TRIFLUOROETHYL) PHOSPHITE

TRIPHENYLPHOSPHITE

DIETHYL PHENYLPHOSPHONATE

DIETHYL ETHYLPHOSPHONATE

Fig. 6

Charge-discharge characteristics of experimental MCMB-LiNiCoO₂ cells containing electrolytes with Flame Retardant Additives subjected to formation cycling

| ELECTROLYTE TYPE | CHARGE CAPACITY (Ah) 1ST CYCLE | DISCHARGE CAPACITY (Ah) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH CYCLE) | COULOUMBIC EFFICIENCY (5TH CYCLE) |
|---|---|---|---|---|---|---|---|---|
| 1.0 M LiPF6 EC+EMC+TFPa (20:75:5 v/v %) | 0.5267 | 0.3944 | 0.1323 | 74.88 | 0.4312 | 0.3870 | 0.3419 | 89.76 |
| 1.0 M LiPF6 EC+EMC+TFPi (20:75:5 v/v %) | 0.4949 | 0.4195 | 0.0754 | 84.76 | 0.4224 | 0.4097 | 0.1353 | 96.99 |
| 1.0 M LiPF6 EC+EMC+TPPi (20:75:5 v/v %) | 0.4726 | 0.3982 | 0.0744 | 84.26 | 0.4130 | 0.4022 | 0.1283 | 97.37 |
| 1.0 M LiPF6 EC+EMC+DEP (20:75:5 v/v %) | 0.4713 | 0.4151 | 0.0563 | 88.06 | 0.4001 | 0.3987 | 0.0703 | 99.65 |
| 1.0 M LiPF6 EC+EMC+DPP (20:75:5 v/v %) | 0.4632 | 0.3960 | 0.0672 | 85.49 | 0.3924 | 0.3862 | 0.1027 | 98.40 |

Fifth discharge of formation cycling for cells containing Flame Retardant Additives. Discharge at 25 mA at room temperature.

Fig. 8

Summary of the discharge capacity at low temperature of a number of MCMB-LiNiCoO₂ cells containing electrolytes with Flame Retardant Additives.

| | | | | FLAME RETARDANT ADDITIVES | | | | | | | | |
|---|---|---|---|---|---|---|---|---|---|---|---|---|
| | | 1.0 M LiPF6 EC+EMC+TFPa (20:75:5 v/v %) #2 | | 1.0 M LiPF6 EC+EMC+TFPi (20:75:5 v/v %) | | 1.0 M LiPF6 EC+EMC+TPPi (20:75:5 v/v %) | | 1.0 M LiPF6 EC+EMC+DEP (20:75:5 v/v %) | | 1.0 M LiPF6 EC+EMC+DPP (20:75:5 v/v %) | |
| ELECTROLYTE TYPE | | CAPACITY (Ah) | PERCENT (%) | CAPACITY (Ah) | PERCENT (%) | CAPACITY (Ah) | PERCENT (%) | CAPACITY (Ah) | PERCENT (%) | CAPACITY (Ah) | PERCENT (%) |
| TEMP. (°C) | DISCHARGE CURRENT (mA) | | | | | | | | | | |
| 23° | 25 | 0.3918 | 100.00 | 0.3991 | 100.00 | 0.4007 | 100.00 | 0.3770 | 100.00 | 0.3756 | 100.00 |
| 0° | 25 | 0.3617 | 92.31 | 0.3656 | 91.62 | 0.3477 | 86.78 | 0.3450 | 91.52 | 0.3466 | 92.30 |
| -20° | 25 | 0.3295 | 84.10 | 0.3449 | 86.42 | 0.3016 | 75.28 | 0.3298 | 87.50 | 0.3249 | 86.52 |
| | 50 | 0.3152 | 80.45 | 0.3301 | 82.71 | 0.2785 | 69.51 | 0.3164 | 83.94 | 0.3114 | 82.92 |
| | 100 | 0.2891 | 73.78 | 0.2998 | 75.11 | 0.2398 | 59.84 | 0.2949 | 78.23 | 0.2878 | 76.63 |
| -30° | 25 | 0.2980 | 76.06 | 0.3166 | 79.32 | 0.2617 | 65.31 | 0.3071 | 81.47 | 0.2998 | 79.83 |
| -40° | 25 | 0.2846 | 72.65 | 0.2908 | 72.87 | 0.2276 | 56.81 | 0.2916 | 77.34 | 0.2753 | 73.29 |
| | 50 | 0.1873 | 47.80 | 0.2083 | 52.21 | 0.1220 | 30.44 | 0.2250 | 59.68 | 0.1986 | 52.88 |
| | 100 | 0.0385 | 9.83 | 0.0647 | 16.21 | 0.0268 | 6.69 | 0.0920 | 24.41 | 0.0682 | 18.15 |
| -50° | 25 | 0.0649 | 16.56 | 0.1080 | 27.06 | 0.0450 | 11.23 | 0.1465 | 38.86 | 0.0926 | 24.66 |
| | 50 | 0.0098 | 2.51 | 0.0165 | 4.13 | 0.0091 | 2.27 | 0.0200 | 5.29 | 0.0139 | 3.70 |
| -60° | 5 | 0.0922 | 23.52 | 0.1919 | 48.10 | 0.0481 | 12.02 | 0.2153 | 57.12 | 0.1602 | 42.66 |
| | 10 | 0.0076 | 1.94 | 0.0170 | 4.25 | 0.0073 | 1.81 | 0.0543 | 14.40 | 0.0122 | 3.26 |

Discharge capacity at -20°C (expressed as percent of room temperature capacity) of MCMB-LiNiCoO₂ cells containing electrolytes with Flame Retardant Additives Cycle life performance of MCMB-LiNiCoO$_2$ cells containing electrolytes with Flame Retardant Additives A ◇ 1.0 M LiPF6 IN EC:EMC:TFPa (20:75:5 v/v %)
B □ 1.0 M LiPF6 IN EC:EMC:TFPi (20:75:5 v/v %)
C ▽ 1.0 M LiPF6 IN EC:EMC:TPPi (20:75:5 v/v %)
D ○ 1.0 M LiPF6 IN EC:EMC:DEP (20:75:5 v/v %)
E ● 1.0 M LiPF6 IN EC:EMC:DPP (20:75:5 v/v %)
F ■ 1.0 M LiPF6 IN EC:EMC (20:80 v/v %)

Fig. 12
Formation Characteristics of Electrolytes with Flame Retardant Additives and Fluoroester

| ELECTROLYTE TYPE | CHARGE CAPACITY (Ah) 1ST CYCLE | DISCHARGE CAPACITY (Ah) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH CYCLE) | COULOUMBIC EFFICIENCY (5TH CYCLE) |
|---|---|---|---|---|---|---|---|---|
| 1.0 M LiPF6 EC+EMC+TFEB (20:60:20 v/v %) | 0.5179312 | 0.44202 | 0.07591 | 85.34 | 0.4382585 | 0.4312333 | 0.11402 | 98.40 |
| 1.0 M LiPF6 EC+EMC+TFEB+TPhPh (20:55:20:5 v/v %) | 0.4815 | 0.4134756 | 0.0680 | 85.87 | 0.4063783 | 0.3990103 | 0.1045 | 98.19 |
| 1.0 M LiPF6 EC+EMC+TFEB+TBuPh (20:55:20:5 v/v %) | 0.4862076 | 0.4053501 | 0.08086 | 83.37 | 0.4087209 | 0.3952519 | 0.1393 | 96.70 |
| 1.0 M LiPF6 EC+EMC+TFEB+TEtPh (20:55:20:5 v/v %) | 0.4689576 | 0.388573 | 0.08038 | 82.86 | 0.3959548 | 0.3840084 | 0.1340 | 96.98 |
| 1.0 M LiPF6 EC+EMC+TFEB+TFMPo (20:55:20:5 v/v %) | 0.4807283 | 0.3971957 | 0.08353 | 82.62 | 0.3985919 | 0.38546 | 0.1476 | 96.71 |

Cycle Life of Electrolytes with Flame Retardant Additives and Fluoroester

Fig. 14
Electrochemical Impedance Spectroscopy (EIS) Measurements for Cathodes in Contact with Electrolytes with Flame Retardant Additives and Fluoroesters

| ELECTROLYTE TYPE | | | 1.0 M LiPF6 EC+EMC+TFEB (20:60:20 v/v %) | | 1.0 M LiPF6 EC+EMC+TFEB+TPhPh (20:55:20:5 v/v %) | | 1.0 M LiPF6 EC+EMC+TFEB+TBuPh (20:55:20:5 v/v %) | | 1.0 M LiPF6 EC+EMC+TFEB+TEtPh (20:55:20:5 v/v %) | | 1.0 M LiPF6 EC+EMC+TFEB+TFMPo (20:55:20:5 v/v %) | |
|---|---|---|---|---|---|---|---|---|---|---|---|---|
| TEMP. (°C) | | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) |
| ROOM TEMP | CATHODE | Rs | R(CR)(CR) | 0.1473 | R(CR)(C(Rw)) | 0.2101 | R(CR)(C(Rw)) | 0.2206 | R(CR)(C(Rw)) | 0.2806 | R(CR)(C(Rw)) | 0.1907 |
| | | Rf | | 0.2054 | | 0.09887 | | 0.1303 | | 0.1447 | | 0.08046 |
| | | Rct | | 0.03208 | | 0.0381 | | 0.02144 | | 0.01459 | | 0.01671 |
| 0° | CATHODE | Rs | R(CR)(CR) | 0.1578 | R(CR)(C(Rw)) | 0.2125 | R(CR)(C(Rw)) | 0.2355 | R(CR)(C(Rw)) | 0.279 | R(CR)(CR) | 0.2203 |
| | | Rf | | 0.3627 | | 0.1013 | | 0.165 | | 0.1586 | | 0.1576 |
| | | Rct | | 0.304 | | 0.1634 | | 0.3078 | | 0.2648 | | 0.3891 |
| -20° | CATHODE | Rf | R(CR)(CR) | 0.2451 | R(CR)(C(Rw)) | 0.3942 | R(CR)(C(Rw)) | 0.3382 | R(CR)(C(Rw)) | 0.3214 | R(CR)(CR) | 0.3197 |
| | | Rs | | 0.3963 | | 0.2356 | | 0.1518 | | 0.1211 | | 0.1695 |
| | | Rct | | 1.822 | | 1.563 | | 1.903 | | 1.28 | | 2.424 |
| -30° | CATHODE | Rs | R(CR)(C(Rw)) | 0.3186 | R(CR)(C(Rw)) | 0.4833 | R(CR)(C(Rw)) | 0.5902 | R(CR)(C(Rw)) | 0.4213 | R(CR)(C(Rw)) | 0.4192 |
| | | Rf | | 0.1531 | | 0.20188 | | 0.2529 | | 0.2839 | | 0.2116 |
| | | Rct | | 0.2992 | | 6 | | 12.05 | | 9.176 | | 8.037 |
| -40° | CATHODE | Rs | R(CR)(C(Rw)) | 0.4405 | R(CR)(CR) | 0.9883 | R(CR)(CR) | 0.7944 | R(CR)(C(Rw)) | 0.6059 | R(CR)(CR) | 1.013 |
| | | Rf | | 0.3273 | | 1.693 | | 0.512 | | 0.1361 | | 1.189 |
| | | Rct | | 0.4389 | | 22.81 | | 33.64 | | .05846? | | 26.27 |
| -50° | CATHODE | Rs | R(CR)(C(Rw)) | 0.9402 | R(CR)(CR) | 2.008 | R(CR)(CR) | 1.697 | R(CR)(CR) | 1.372 | R(CR)(CR) | 1.793 |
| | | Rf | | 0.3305 | | 3.831 | | 2.652 | | 2.798 | | 3.673 |
| | | Rct | | 0.4702 | | 124.8 | | 88.56 | | 105.3 | | 54.38 |

Fig. 15
Electrochemical Impedance Spectroscopy (EIS) Measurements for Anodes in Contact with Electrolytes with Flame Retardant Additives and Fluoroesters

| ELECTROLYTE TYPE | | | 1.0 M LiPF6 EC+EMC+TFEB (20:60:20 v/v %) | | 1.0 M LiPF6 EC+EMC+TFEB+TPhPh (20:55:20:5 v/v %) | | 1.0 M LiPF6 EC+EMC+TFEB+TBuPh (20:55:20:5 v/v %) | | 1.0 M LiPF6 EC+EMC+TFEB+TEtPh (20:55:20:5 v/v %) | | 1.0 M LiPF6 EC+EMC+TFEB+TFMPo (20:55:20:5 v/v %) | |
|---|---|---|---|---|---|---|---|---|---|---|---|---|
| TEMPERATURE (°C) | | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) |
| ROOM TEMP | ANODE | Rs | R(CR)(CR) | 0.1555 | R(CR)(C(Rw)) | 0.2118 | R(CR)(C(Rw)) | 0.2019 | R(CR)(C(Rw)) | 0.2512 | R(CR)(C(Rw)) | 0.195 |
| | | Rf | | 0.06419 | | 0.03664 | | 0.05478 | | 0.0578 | | 0.06138 |
| | | Rct | | 0.03474 | | 0.04416 | | 0.0361 | | 0.03349 | | 0.02916 |
| 0° | ANODE | Rs | R(CR)(C(Rw)) | 0.2189 | R(CR)(C(Rw)) | 0.3149 | R(CR)(C(Rw)) | 0.2855 | R(CR)(C(Rw)) | 0.347 | R(CR)(C(Rw)) | 0.2805 |
| | | Rf | | 0.08007 | | 0.2834 | | 0.1968 | | 0.182 | | 0.1383 |
| | | Rct | | 0.0753 | | 0.3895 | | 0.206 | | 0.2486 | | 0.1503 |
| -20° | ANODE | Rf | R(CR)(C(Rw)) | 0.2977 | R(CR)(CR) | 0.4223 | R(CR)(CR) | 0.4403 | R(CR)(C(Rw)) | 0.4298 | R(CR)(CR) | 0.4526 |
| | | Rs | | 0.1165 | | 0.3084 | | 0.5059 | | 0.275 | | 0.4733 |
| | | Rct | | 0.6088 | | 1.156 | | 1.586 | | 0.4817 | | 1.263 |
| -30° | ANODE | Rs | R(CR)(C(Rw)) | 0.4721 | R(CR)(CR) | 0.8177 | R(CR)(CR) | 0.646 | R(CR)(C(Rw)) | 0.5978 | R(CR)(C(Rw)) | 0.5932 |
| | | Rf | | 0.1441 | | 1.4210 | | 0.8261 | | 0.2991 | | 0.2923 |
| | | Rct | | 1.422 | | 8.6490 | | 5.773 | | 1.5 | | 1.69 |
| -40° | ANODE | Rs | R(CR)(C(Rw)) | 0.6271 | R(CR)(CR) | 1.2 | R(CR)(CR) | 0.8956 | R(CR)(C(Rw)) | 0.799 | R(CR)(C(Rw)) | 0.9303 |
| | | Rf | | 0.2882 | | 1.023 | | 1.033 | | 0.5051 | | 0.5388 |
| | | Rct | | 5.303 | | 12.58 | | 10.54 | | 4.157 | | 4.558 |
| -50° | ANODE | Rs | R(CR)(C(Rw)) | 1.389 | R(CR)(CR) | 2.987 | R(CR)(CR) | 2.17 | R(CR)(CR) | 1.702 | R(CR)(CR) | 2.239 |
| | | Rf | | 0.8344 | | 4.858 | | 2.83 | | 1.869 | | 2.009 |
| | | Rct | | 22.96 | | 68.04 | | 53.77 | | 41.19 | | 40.87 |

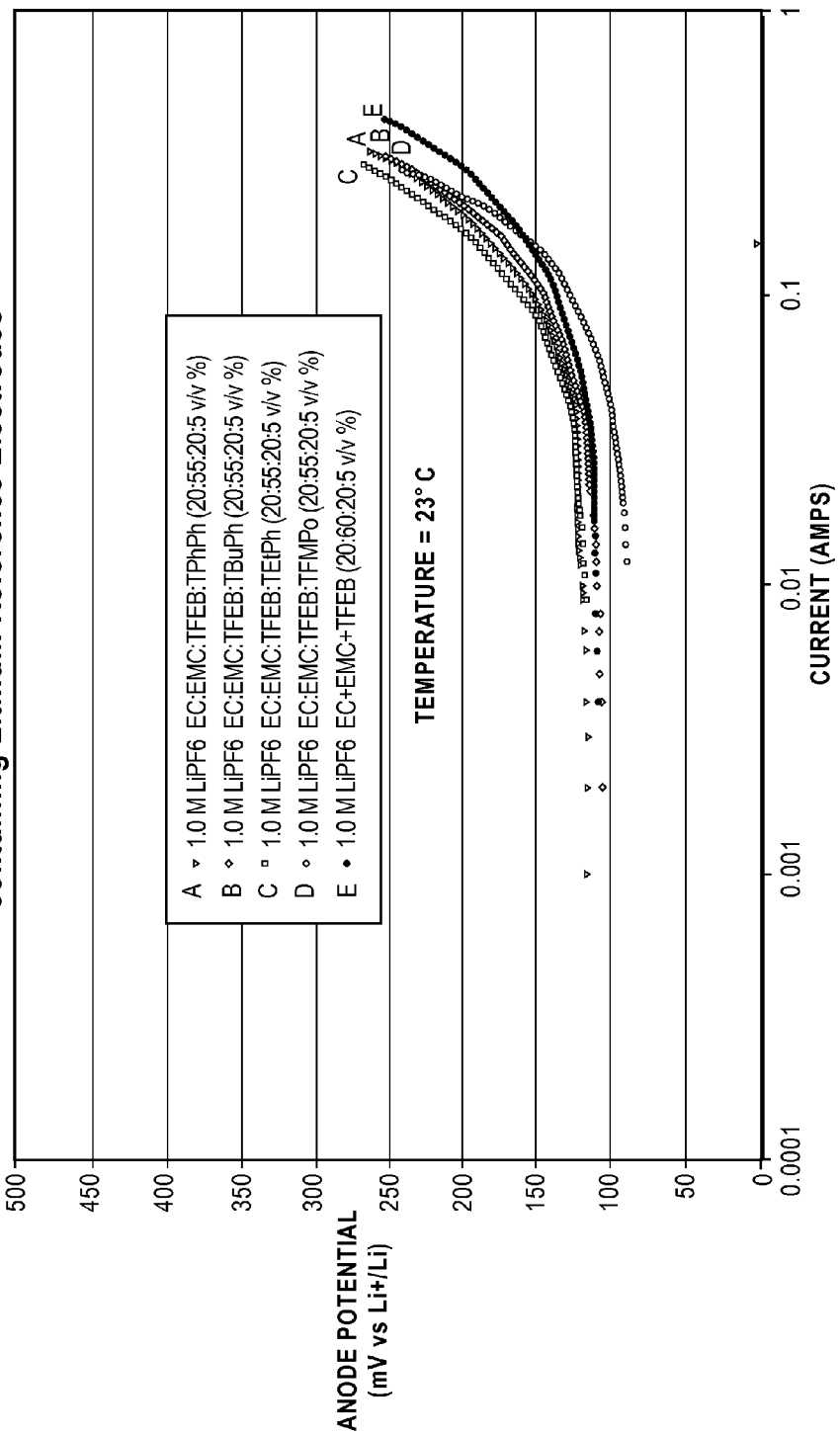
Fig. 16 Tafel Polarization Measurements Performed on MCMB Anodes in contact with Electrolytes with Flame Retardant Additives and Fluoroesters
Data Obtained from MCMB-LiNi$_{0.8}$Co$_{0.2}$O$_2$ Cells containing Lithium Reference Electrodes

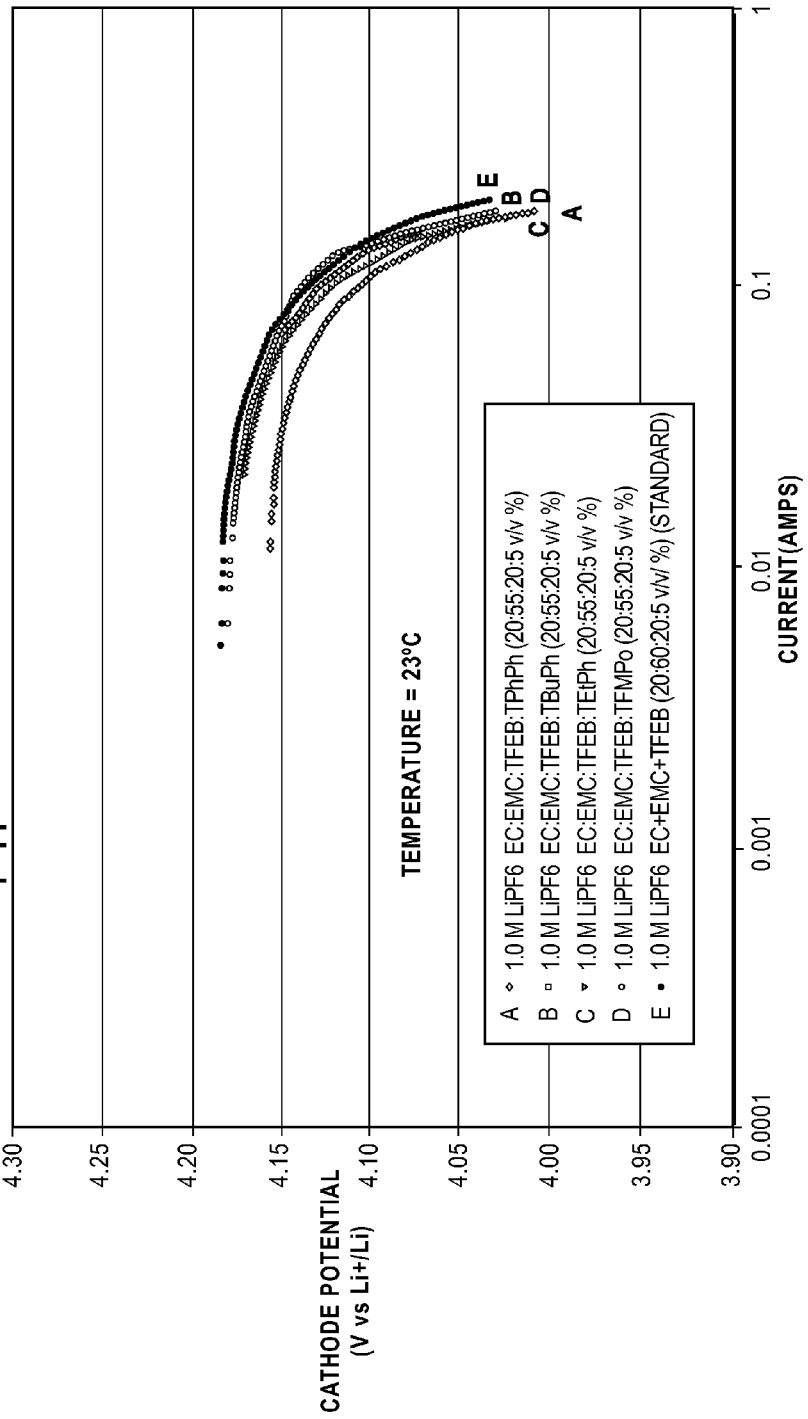

Fig. 18

DC Micro-Polarization Measurements for the Cathode of Cells containing Flame Retardant Additives and Fluoroester Electrolytes

| ELECTROLYTE COMPOSITION | LINEAR POLARIZATION VALUE OF CATHODE | | | | | | |
|---|---|---|---|---|---|---|---|
| | 23°C | 0°C | -10°C | -20°C | -30°C | -40°C | -50°C |
| 1.0M LiPF6 in EC:EMC:TFEB (20:60:20 v/v%) (Baseline) | 0.62 | 0.87 | * | 2.91 | 10.00 | 139.86 | 195.65 |
| 1.0M LiPF6 in EC:EMC:TFEB:TPhPh (20:55:20:5 v/v%) | 0.44 | 0.78 | 1.71 | 3.41 | 9.78 | 50.51 | 143.29 |
| 1.0M LiPF6 in EC:EMC:TFEB:TBuPh (20:55:20:5 v/v%) | 0.39 | 0.97 | 1.86 | 2.48 | 11.40 | 41.67 | 236.32 |
| 1.0M LiPF6 in EC:EMC:TFEB:TEtPh (20:55:20:5 v/v%) | 0.64 | 1.07 | 1.61 | 2.46 | 11.86 | 36.63 | 224.59 |
| 1.0M LiPF6 in EC:EMC:TFEB:TFMPo (20:55:20:5 v/v%) | 0.33 | 0.87 | 1.75 | 2.66 | 7.87 | 45.46 | 231.14 |

Fig. 19

DC Micro-Polarization Measurements for the Anode of Cells containing Flame Retardant Additives and Fluoroester Electrolytes

| ELECTROLYTE COMPOSITION | LINEAR POLARIZATION VALUE OF ANODE ||||||||
| --- | --- | --- | --- | --- | --- | --- | --- |
| | 23°C | 0°C | -10°C | -20°C | -30°C | -40°C | -50°C |
| 1.0M LiPF6 in EC:EMC:TFEB (20:60:20 v/v%) (Baseline) | 0.35 | 0.72 | * | 2.17 | 7.39 | 17.53 | 55.56 |
| 1.0M LiPF6 in EC:EMC:TFEB:TPhPh (20:55:20:5 v/v%) | 0.63 | 1.48 | 3.76 | 2.71 | 16.64 | 24.42 | 159.66 |
| 1.0M LiPF6 in EC:EMC:TFEB:TBuPh (20:55:20:5 v/v%) | 0.45 | 1.51 | 3.84 | 3.52 | 12.47 | 29.87 | 128.21 |
| 1.0M LiPF6 in EC:EMC:TFEB:TEtPh (20:55:20:5 v/v%) | 0.54 | 1.39 | 2.32 | 3.77 | 11.28 | 29.32 | 93.14 |
| 1.0M LiPF6 in EC:EMC:TFEB:TFMPo (20:55:20:5 v/v%) | 0.56 | 1.40 | 2.26 | 3.56 | 9.67 | 20.52 | 87.88 |

SEI Enhancing Agent

VINYLENE CARBONATE

Fig. 21
Formation Characteristics of Electrolytes with Flame Retardant Additives and SEI Enhancing Agent

| ELECTROLYTE TYPE | CHARGE CAPACITY (Ah) 1ST CYCLE | DISCHARGE CAPACITY (Ah) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH CYCLE) | COULOUMBIC EFFICIENCY (5TH CYCLE) |
|---|---|---|---|---|---|---|---|---|
| 1.0 M LiPF6 EC+EMC (20:80 v/v %) | 0.4537 | 0.3846 | 0.0691 | 84.7700 | 0.3886 | 0.3781 | 0.1220 | 97.2862 |
| 1.0 M LiPF6 EC+EMC (20:80 v/v %) w/ 1.5% VC | 0.4696 | 0.3967 | 0.0729 | 84.4786 | 0.4001 | 0.3903 | 0.1116 | 97.5450 |
| 1.0 M LiPF6 EC+EMC+TPhPh (20:75:5 v/v %) | 0.4705 | 0.4071 | 0.0635 | 86.5096 | 0.4011 | 0.3974 | 0.0748 | 99.0606 |
| 1.0 M LiPF6 EC+EMC+TPhPh (20:75:5 v/v %) w/ 1.5% VC | 0.4649 | 0.3698 | 0.0951 | 79.5530 | 0.3828 | 0.3774 | 0.1355 | 98.5969 |
| 1.0 M LiPF6 EC+EMC+TFEB (20:60:20 v/v %) | 0.0518 | 0.4420 | 0.0760 | 85.3400 | 0.4383 | 0.4312 | 0.1140 | 98.4000 |

Fig. 22
Evaluation of Low Temperature Performance of Cells containing Flame Retardant Additive and SEI additive

| | | BASELINE | | ELECTROLYTES WITH ADDITIVES | | | | | |
|---|---|---|---|---|---|---|---|---|---|
| ELECTROLYTE TYPE | DISCHARGE CURRENT (mA) | 1.0 M LiPF6 EC+EMC (20:80 v/v %) | | 1.00 M LiPF6 EC+EMC (20:80 v/v %) w/ 1.5% VC | | 1.00 M LiPF6 EC+EMC+TPhPh (20:75:5 v/v %) | | 1.00 M LiPF6 EC+EMC+TPhPh (20:75:5 v/v %) w/ 1.5% VC | |
| TEMPERATURE (°C) | | CAPACITY (Ah) | PERCENT (%) | CAPACITY (Ah) | PERCENT (%) | CAPACITY (Ah) | PERCENT (%) | CAPACITY (Ah) | PERCENT (%) |
| 23° | 25 | 0.3781 | 100.00 | 0.3903 | 100.00 | 0.3974 | 100.00 | 0.3774 | 100.00 |
| 0° | 25 | 0.3288 | 86.95 | 0.3382 | 86.66 | 0.3517 | 88.50 | 0.3388 | 89.76 |
| -20° | 25 | 0.3105 | 82.11 | 0.3173 | 81.29 | 0.3284 | 82.64 | 0.3204 | 84.88 |
| | 50 | 0.2842 | 75.16 | 0.2935 | 75.19 | 0.3044 | 76.61 | 0.2973 | 78.77 |
| | 100 | 0.2374 | 62.78 | 0.2499 | 64.03 | 0.2651 | 66.72 | 0.2536 | 67.19 |
| | 150 | 0.2063 | 54.57 | 0.2063 | 52.87 | 0.1922 | 48.36 | 0.1823 | 48.31 |
| -30° | 25 | 0.2748 | 72.69 | 0.2920 | 74.83 | 0.3020 | 76.00 | 0.2907 | 77.02 |
| -40° | 25 | 0.2640 | 69.83 | 0.2665 | 68.29 | 0.2661 | 66.98 | 0.2565 | 67.96 |
| | 50 | 0.1697 | 44.89 | 0.1664 | 42.63 | 0.1130 | 28.44 | 0.1265 | 33.52 |
| | 100 | 0.0157 | 4.15 | 0.0389 | 9.97 | 0.0303 | 7.64 | 0.0281 | 7.45 |
| | 150 | 0.0001 | 0.02 | 0.0056 | 1.44 | 0.0145 | 3.65 | 0.0011 | 0.30 |
| -50° | 25 | 0.1291 | 34.16 | 0.1317 | 33.75 | 0.0817 | 20.56 | 0.0891 | 23.61 |
| | 50 | 0.0222 | 5.87 | 0.0234 | 5.99 | 0.0257 | 6.47 | 0.0151 | 4.01 |
| -60° | 5 | 0.2043 | 54.04 | 0.2026 | 51.90 | 0.1537 | 38.67 | 0.1619 | 42.88 |
| | 10 | 0.1106 | 29.26 | 0.0631 | 16.16 | 0.0387 | 9.74 | 0.0443 | 11.73 |
| | 25 | 0.0064 | 1.70 | 0.0031 | 0.80 | 0.0032 | 0.81 | 0.0026 | 0.69 |

Fig. 23
Electrochemical Impedance Spectroscopy (EIS) Measurements for the Cathodes of Cells containing Electrolytes with Flame Retardant Additives/VC

| ELECTROLYTE TYPE | | | 1.0 M LiPF6 EC+EMC (20:80 v/v %) | | 1.0 M LiPF6 EC+EMC (20:80 v/v %) w/1.5% VC | | 1.0 M LiPF6 EC+EMC+TPhPh (20:75:5 v/v %) | | 1.0 M LiPF6 EC+EMC+TPhPh (20:75:5 v/v %) w/1.5% VC | |
|---|---|---|---|---|---|---|---|---|---|---|
| TEMPERATURE (°C) | | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) |
| Room Temp | Cathode | $R_s$ | R(CR)(C(RW)) | 0.5918 | R(CR)(C(RW)) | 0.2345 | R(CR)(C(RW)) | 0.1623 | R(CR)(C(RW)) | 0.2579 |
| | | $R_f$ | | 0.2423 | | 0.202 | | 0.2702 | | 0.006863 |
| | | $R_{ct}$ | | 0.03378 | | 0.01247 | | 0.03598 | | 0.07206 |
| 0° | Cathode | $R_s$ | R(CR)(C(RW)) | 0.1833 | R(CR)(C(RW)) | 0.213 | R(CR)(C(RW)) | 0.1739 | R(CR)(C(RW)) | 0.3777 |
| | | $R_f$ | | 2.919 | | 1.771 | | 1.515 | | 2.326 |
| | | $R_{ct}$ | | 0.6802 | | 0.3864 | | 0.4928 | | 0.4761 |
| -20° | Cathode | $R_s$ | R(CR)(CR) | 0.3142 | R(CR)(C(RW)) | 0.2658 | R(CR)(CR) | 0.2278 | R(CR)(CR) | 0.5368 |
| | | $R_f$ | | 0.2908 | | 0.2079 | | 0.3055 | | 0.1043 |
| | | $R_{ct}$ | | 1.753 | | 0.8338 | | 1.233 | | 0.7084 |
| -40° | Cathode | $R_s$ | R(CR)(CR) | 0.4437 | R(CR)(CR) | 0.4515 | R(CR)(CR) | 0.5991 | R(CR)(CR) | 0.6277 |
| | | $R_f$ | | 5.019 | | 1.768 | | 1.192 | | 2.722 |
| | | $R_{ct}$ | | 35.86 | | 62.83 | | 74.72 | | 16.25 |
| -60° | Cathode | $R_s$ | R(CR)(CR) | 2.016 | R(CR)(CR) | 2.571 | *** | | R(CR)(CR) | 3.299 |
| | | $R_f$ | | 6.242 | | 1.07 | | | | 1.449 |
| | | $R_{ct}$ | | 17.03 | | 29.9 | | | | 48.27 |

Fig. 24
Electrochemical Impedance Spectroscopy (EIS) Measurements for the Anodes of Cells containing Electrolytes with Flame Retardant Additives/VC

| ELECTROLYTE TYPE | | | 1.0 M LiPF6 EC+EMC (20:80 v/v %) | | 1.0 M LiPF6 EC+EMC (20:80 v/v %) w/1.5% VC | | 1.0 M LiPF6 EC+EMC+TPhPh (20:75:5 v/v %) | | 1.0 M LiPF6 EC+EMC+TPhPh (20:75:5 v/v %) w/ 1.5% VC | |
|---|---|---|---|---|---|---|---|---|---|---|
| TEMPERATURE (°C) | | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) |
| Room Temp | Anode | $R_s$ | R(CR)(C(RW)) | 0.4303 | R(CR)(C(RW)) | 0.2753 | R(CR)(C(RW)) | 0.1906 | R(CR)(CR) | 0.7406 |
| | | $R_f$ | | 0.02344 | | 0.07171 | | 0.01922 | | 0.1332 |
| | | $R_{ct}$ | | 0.03534 | | 0.03001 | | 0.04464 | | 0.06951 |
| 0° | Anode | $R_s$ | R(CR)(C(RW)) | 0.386 | R(CR)(C(RW)) | 0.3676 | R(CR)(CR) | 0.2653 | R(CR)(C(RW)) | 0.3754 |
| | | $R_f$ | | 0.03427 | | 0.2808 | | 0.2306 | | 0.4767 |
| | | $R_{ct}$ | | 0.03546 | | 0.4105 | | 0.182 | | 0.271 |
| -20° | Anode | $R_s$ | R(CR)(C(RW)) | 0.3669 | R(CR)(C(RW)) | 0.4122 | R(CR)(C(RW)) | 0.3251 | R(CR)(CR) | 0.5133 |
| | | $R_f$ | | 0.3294 | | 0.36 | | 0.3087 | | 0.3748 |
| | | $R_{ct}$ | | 0.9189 | | 1.701 | | 0.7985 | | 2.199 |
| -40° | Anode | $R_s$ | R(CR)(C(RW)) | 0.6563 | R(CR)(C(RW)) | 0.6576 | R(CR)(C(RW)) | 0.7849 | R(CR)(CR) | 1.012 |
| | | $R_f$ | | 0.5904 | | 1.241 | | 1.499 | | 2.502 |
| | | $R_{ct}$ | | 1.461 | | 5.764 | | 3.171 | | 31.9 |
| -60° | Anode | $R_s$ | R(CR)(CR) | 3.812 | R(CR)(CR) | 3.671 | R(CR)(CR) | 5.838 | R(CR)(CR) | 4.734 |
| | | $R_f$ | | 5.11 | | 8.337 | | 12.66 | | 9.91 |
| | | $R_{ct}$ | | 126.9 | | 264.9 | | 176.2 | | 265.1 |

Fig. 25

Linear Polarization Measurements for the Anodes of cells containing Electrolytes with Flame Retardant Additives/VC

| ELECTROLYTE COMPOSITION | LINEAR POLARIZATION VALUE OF ANODE | | | | | | | | |
|---|---|---|---|---|---|---|---|---|---|
| | 23°C | 0°C | -10°C | -20°C | -30°C | -40°C | -50°C | -60°C |
| 1.0M LiPF6 in EC:EMC (20:80 v/v%) (Baseline) | 0.64 | 0.83 | 1.63 | 2.85 | 9.04 | 22.95 | 95.00 | 106.61 |
| 1.0M LiPF6 in EC:EMC (20:80 v/v%) w/ 1.5% VC | 0.62 | 1.94 | 4.40 | 5.09 | * | 59.75 | 287.88 | 1067.42 |
| 1.0M LiPF6 in EC:EMC:TPhPh (20:75:5 v/v%) | 0.46 | 1.09 | 2.94 | 2.53 | 14.98 | 33.69 | 144.16 | 536.723 |
| 1.0M LiPF6 in EC:EMC:TPhPh (20:75:5 v/v%) w/ 1.5% VC | 1.22 | 1.89 | 4.87 | 4.59 | 23.00 | 64.94 | 323.13 | 1055.56 |

Fig. 26

Linear Polarization Measurements for the Cathodes of cells containing Electrolytes with Flame Retardant Additives/VC

| ELECTROLYTE COMPOSITION | LINEAR POLARIZATION VALUE OF CATHODE | | | | | | | | |
|---|---|---|---|---|---|---|---|---|---|
| | 23°C | 0°C | -10°C | -20°C | -30°C | -40°C | -50°C | -60°C |
| 1.0M LiPF6 in EC:EMC (20:80 v/v%) (Baseline) | 0.85 | 4.03 | 7.09 | 2.49 | 27.38 | 68.84 | 162.50 | 472.64 |
| 1.0M LiPF6 in EC:EMC (20:80 v/v%) w/ 1.5% VC | 0.45 | 2.28 | 3.17 | 1.55 | 15.20 | 51.91 | 395.83 | 215.42 |
| 1.0M LiPF6 in EC:EMC:TPhPh (20:75:5 v/v%) | 0.62 | 2.32 | 3.32 | 1.71 | 12.26 | 44.32 | 111.08 | 154.76 |
| 1.0M LiPF6 in EC:EMC:TPhPh (20:75:5 v/v%) w/ 1.5% VC | 0.43 | 3.39 | 4.38 | 1.55 | 18.34 | 49.48 | 291.41 | 494.78 |

Fig. 27 Formation of characteristics of experimental MCMB-LiNiCoO$_2$ cells containing electrolytes with Flame Retardant Additives subjected to formation cycling

| ELECTROLYTE TYPE | CHARGE CAPACITY (Ah) 1ST CYCLE | DISCHARGE CAPACITY (Ah) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH CYCLE) | COULOUMBIC EFFICIENCY (5TH CYCLE) |
|---|---|---|---|---|---|---|---|---|
| 1.0 M LiPF6 EC+DEC+DMC(1:1:1 v/v %) | 0.4980 | 0.4160 | 0.082 | 83.52 | 0.4119 | 0.4022 | 0.1264 | 97.64 |
| 1.0 M LiPF6 EC+EMC (20:80 v/v %) | 0.4504 | 0.3768 | 0.074 | 83.64 | 0.3799 | 0.3676 | 0.1356 | 96.75 |
| 1.0 M LiPF6 EC+EMC+TPP (20:70:10 v/v %) | 0.4705 | 0.3978 | 0.073 | 84.55 | 0.3969 | 0.3819 | 0.1449 | 96.20 |
| 1.0 M LiPF6 EC+EMC+DTFEC+TPP (20:50:20:10 v/v %) | 0.4929 | 0.4234 | 0.070 | 85.89 | 0.4248 | 0.4148 | 0.1157 | 97.64 |
| 1.0 M LiPF6 EC+EMC+DTFEC+TPP (20:30:40:10 v/v %) | 0.4904 | 0.4124 | 0.078 | 84.09 | 0.4272 | 0.4035 | 0.1958 | 94.45 |
| 1.0 M LiPF6 FEC+EMC+TFEMC+TPP (20:50:20:10 v/v %) | 0.4391 | 0.3687 | 0.070 | 83.97 | 0.3698 | 0.3646 | 0.0967 | 98.60 |
| 1.0 M LiPF6 FEC+EMC+TPP (20:70:10 v/v %) | 0.4784 | 0.4095 | 0.069 | 85.59 | 0.4127 | 0.4063 | 0.1015 | 98.45 |
| 1.0 M LiPF6 FEC+EMC+TFEMC+TPP (20:50:20:10 v/v %) | 0.4494 | 0.3753 | 0.074 | 83.51 | 0.3655 | 0.3596 | 0.1192 | 98.40 |
| 1.0 M LiPF6 FEC+EMC+TFEMC+TPP (20:50:20:10 v/v %)+1.5%VC | 0.4574 | 0.3868 | 0.071 | 84.55 | 0.3941 | 0.3867 | 0.1036 | 98.13 |

Fig. 28

Summary of the discharge capacity at low temperature of a number of MCMB-LiNiCoO₂ cells containing electrolytes with Flame Retardant Additives

| ELECTROLYTE TYPE | | 1.0 M LiPF₆ EC+EMC (20:80 v/v %) | | 1.0 M LiPF₆ EC+EMC+TPP (20:70:10 v/v %) | | 1.0 M LiPF₆ EC+EMC+DTFEC+TPP (20:50:20:10 v/v %) | | 1.0 M LiPF₆ EC+EMC+DTFEC+TPP (20:30:40:10 v/v %) | |
|---|---|---|---|---|---|---|---|---|---|
| TEMP. (°C) | CURRENT (mA) | CAPACITY (Ah) | PERCENT (%) | CAPACITY (Ah) | PERCENT (%) | CAPACITY (Ah) | PERCENT (%) | CAPACITY (Ah) | PERCENT (%) |
| 23° | 25 mA | 0.3676 | 100.00 | 0.3819 | 100.00 | 0.4148 | 100.00 | 0.4035 | 100.00 |
| 0° | 25 mA | 0.3568 | 97.07 | 0.3688 | 96.58 | 0.3952 | 95.28 | 0.3763 | 93.26 |
|  | 50 mA | 0.3375 | 91.83 | 0.3534 | 92.55 | 0.3695 | 89.09 | 0.3465 | 85.87 |
|  | 100 mA | 0.3207 | 87.23 | 0.3356 | 87.90 | 0.3380 | 81.49 | 0.2057 | 50.98 |
|  | 150 mA | 0.3086 | 83.95 | 0.3101 | 81.19 | 0.2485 | 59.90 | 0.0656 | 16.25 |
| -20° | 25 mA | 0.3056 | 83.15 | 0.3208 | 84.00 | 0.3202 | 77.20 | 0.2364 | 58.60 |

Discharge performance at 0°C (expressed as percent of room temperature capacity) of a ~ 400mAh MCMB-LiNiCoO2 cell containing 1.0 M LiPF6 in EC+EMC+TPP (20:70:10 v/v%). The cell was charged at 23°C prior to discharge.

Fig. 30 Discharge performance at 0°C (expressed as percent of room temperature capacity) of a MCMB-LiNiCoO$_2$ cell containing 1.0 M LiPF$_6$ in EC+EMC+DTFEC+TPP (20:50:20:10 v/v%). The cell was charged at 23°C prior to discharge.

Tafel Polarization Measurements of LiNiCoO2 Electrodes from MCMB-LiNiCoO2 Cells containing Electrolytes with 10% TPP and with and without the addition of DTFEC

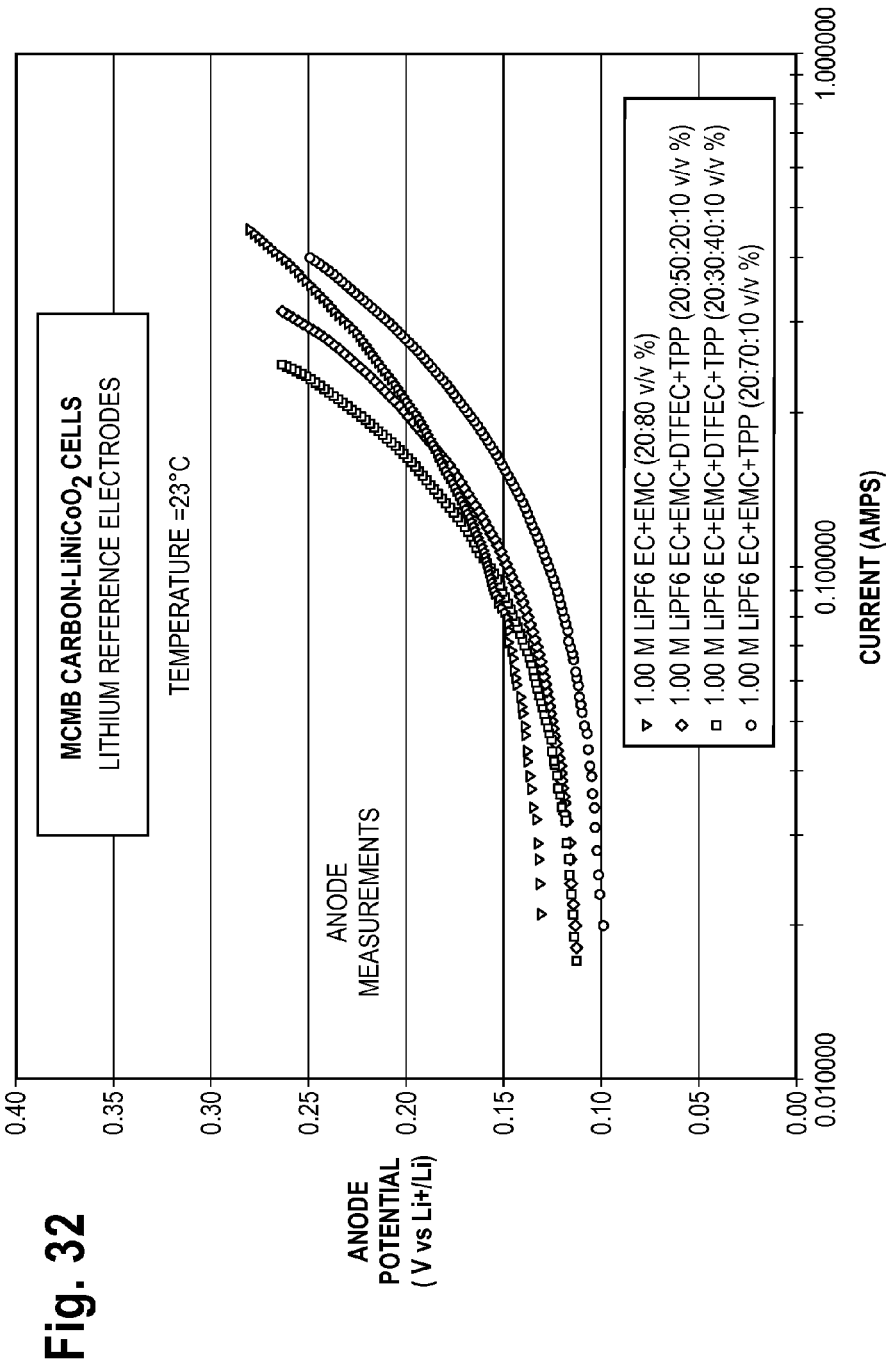
Fig. 32 Tafel Polarization Measurements of MCMB Electrodes from MCMB-LiNiCoO₂ Cells containing Electrolytes with 10% TPP and with and without the addition of DTFEC

Fig. 33

Summary of the discharge capacity at low temperature of a number of MCMB-LiNiCoO$_2$ cells containing electrolytes with 10% TPP and TFEMC and/or FEC

| ELECTROLYTE TYPE | | 1.0 M LiPF$_6$ EC+DEC+DMC (1:1:1 v/v %) | | 1.0 M LiPF$_6$ FEC+EMC+TFEMC+TPPa (20:50:20:10 v/v %) | | 1.0 M LiPF$_6$ FEC+EMC+TPP (20:70:10 v/v %) | | 1.0 M LiPF$_6$ EC+EMC+TFEMC+TPP (20:30:40:10 v/v %) | | 1.0 M LiPF$_6$ FEC+EMC+TFEMC+TPPa (20:50:20:10 v/v %) +1.5%VC | |
|---|---|---|---|---|---|---|---|---|---|---|---|
| TEMP. (°C) | CURRENT (mA) | CAPACITY (Ah) | PERCENT (%) | CAPACITY (Ah) | PERCENT (%) | CAPACITY (Ah) | PERCENT (%) | CAPACITY (Ah) | PERCENT (%) | CAPACITY (Ah) | PERCENT (%) |
| 23° | 25 mA | 0.4022 | 100.00 | 0.3646 | 100.00 | 0.4063 | 100.00 | 0.3596 | 100.00 | 0.3867 | 100.00 |
| 0° | 25 mA | 0.3633 | 90.31 | 0.3497 | 95.92 | 0.3805 | 93.63 | 0.3410 | 94.81 | 0.3621 | 93.64 |
|  | 50 mA | 0.3609 | 89.73 | 0.3409 | 93.48 | 0.3731 | 91.82 | 0.3362 | 93.47 | 0.3591 | 92.88 |

Fig. 35 Summary of the formation characteristics of a number of Li-Li(Li$_{0.17}$Ni$_{0.25}$Mn$_{0.58}$)O$_2$ cells containing various electrolytes with TPP and TPPi flame retardant additives

| ELECTROLYTE TYPE | ANODE TYPE | CATHODE WEIGHT (g) | CHARGE CAPACITY (mAh) 1ST CYCLE | DISCHARGE CAPACITY (mAh) 1ST CYCLE | DISCHARGE CAPACITY (mAh/g) 1ST CYCLE | IRREVERSIBLE CAPACITY 1ST CYCLE | COULOMBIC EFFICIENCY 1ST CYCLE | CHARGE CAPACITY (mAh) 5TH CYCLE | REVERSIBLE CAPACITY (mAh) 5TH CYCLE | REVERSIBLE CAPACITY (mAh/g) 5TH CYCLE | CUMULATIVE IRREVERSIBLE CAPACITY (1ST-5TH CYCLE) (mAh) | CUMULATIVE IRREVERSIBLE CAPACITY (1ST-5TH CYCLE) (mAh/g) | COULOMBIC EFFICIENCY 1ST CYCLE |
|---|---|---|---|---|---|---|---|---|---|---|---|---|---|
| 1.0 M LiPF6 EC+EMC (20:80 v/v%) | LITHIUM METAL | 0.0175 | 5.3022 | 4.2184 | 241.05 | 1.084 | 79.56 | 4.2422 | 4.1153 | 235.16 | 1.6211 | 92.63 | 97.01 |
| 1.0 M LiPF6 EC+EMC (20:80 v/v%) | LITHIUM METAL | 0.0166 | 5.0498 | 4.0088 | 241.49 | 1.041 | 79.39 | 4.0104 | 3.8866 | 234.13 | 1.5555 | 93.70 | 96.91 |
| 1.0 M LiPF6 EC+EMC+TPP (20:75:5 v/v%) | LITHIUM METAL | 0.0122 | 3.5549 | 2.9879 | 244.91 | 0.567 | 84.05 | 2.8756 | 2.8377 | 232.60 | 0.6519 | 53.43 | 98.68 |
| 1.0 M LiPF6 EC+EMC+TPP (20:75:5 v/v%) | LITHIUM METAL | 0.0141 | 4.1911 | 3.3283 | 236.05 | 0.863 | 79.41 | 3.3776 | 3.1484 | 223.29 | 1.7495 | 124.01 | 93.21 |
| 1.0 M LiPF6 EC+EMC+TPP (20:75:5 v/v%) +1.5% VC | LITHIUM METAL | 0.0130 | 4.4004 | 2.9701 | 228.47 | 1.430 | 67.50 | 3.4184 | 2.7415 | 210.88 | 4.3334 | 333.34 | 80.20 |
| 1.0 M LiPF6 EC+EMC+TPP (20:75:5 v/v%) +1.5% VC | LITHIUM METAL | 0.0182 | 5.9747 | 4.2199 | 231.86 | 1.755 | 70.63 | 4.6908 | 3.8683 | 212.54 | 5.6966 | 313.00 | 82.47 |
| 1.0 M LiPF6 EC+EMC+TPPi (20:75:5 v/v%) | LITHIUM METAL | 0.0154 | 4.7756 | 1.9835 | 129.12 | 2.787 | 41.54 | 2.6031 | 1.9362 | 125.73 | 6.7913 | 440.99 | 74.38 |
| 1.0 M LiPF6 EC+EMC+TPPi (20:75:5 v/v%) | LITHIUM METAL | 0.0115 | 2.93880 | 1.28800 | 112.00 | 1.651 | 43.83 | 1.7486 | 1.3933 | 121.16 | 4.3401 | 377.40 | 79.67 |
| 1.0 M LiPF6 EC+EMC+TPP (20:70:10 v/v%) | LITHIUM METAL | 0.0113 | 3.3552 | 2.6198 | 232.25 | 0.735 | 78.08 | 2.301 | 2.4717 | 219.12 | 1.9715 | 174.78 | 87.34 |
| 1.0 M LiPF6 EC+EMC+TPP (20:70:10 v/v%) | LITHIUM METAL | 0.0121 | 3.5093 | 2.8579 | 236.58 | 0.651 | 81.44 | 2.9397 | 2.6911 | 222.77 | 1.4162 | 117.24 | 91.54 |
| 1.0 M LiPF6 EC+EMC+DTFEC+TPP (20:50:20:10 v/v%) | LITHIUM METAL | 0.0107 | 03.1482 | 2.5084 | 233.99 | 0.640 | 79.68 | 2.6608 | 2.3205 | 216.46 | 1.8025 | 168.14 | 87.21 |
| 1.0 M LiPF6 EC+EMC+DTFEC+TPP (20:50:20:10 v/v%) | LITHIUM METAL | 0.0111 | 3.3069 | 2.6087 | 234.60 | 0.698 | 78.89 | 2.8064 | 2.4042 | 216.21 | 2.1158 | 190.27 | 85.67 |

Fig. 36

| TEMP (°C) | RATE | CURRENT (A) | LW473 1.0 M LiPF6 in EC+EMC+TPP+VC (19.7:73.9:4.9:1.5 v/v %) | | | | LW474 1.0 M LiPF6 in EC+EMC+TPP+VC (19.7:73.9:4.9:1.5 v/v %) | | | |
|---|---|---|---|---|---|---|---|---|---|---|
| | | | CAPACITY (Ah) | WATT-HOURS (Wh) | ENERGY (Wh/Kg) | % OF ROOM TEMP | CAPACITY (Ah) | WATT-HOURS (Wh) | ENERGY (Wh/Kg) | % OF ROOM TEMP |
| 20°C (Initial) | C/5 | 1.800 | 6.9080 | 25.073 | 103.95 | 100 | 6.8947 | 25.03 | 104.06 | 100 |
| 20° | C | 7.000 | 6.2737 | 22.020 | 91.30 | 90.82 | 6.3852 | 22.667 | 94.25 | 92.61 |
| | C/2 | 3.500 | 6.5372 | 23.322 | 96.69 | 94.63 | 6.5249 | 23.295 | 96.86 | 94.64 |
| | C/5 | 1.400 | 6.9152 | 24.877 | 103.14 | 100.10 | 6.9055 | 24.856 | 103.35 | 100.16 |
| | C/10 | 0.700 | 7.1899 | 25.884 | 107.31 | 104.08 | 7.1895 | 25.892 | 107.66 | 104.28 |
| | C/20 | 0.350 | 7.3629 | 26.527 | 109.98 | 106.58 | 7.3678 | 26.551 | 110.40 | 106.86 |
| | C/50 | 0.140 | 7.4035 | 26.660 | 110.53 | 107.17 | 7.4345 | 26.770 | 111.31 | 107.83 |
| 10° | C | 7.000 | 5.8089 | 20.206 | 83.77 | 84.09 | 5.9083 | 20.860 | 86.73 | 85.69 |
| | C/2 | 3.500 | 6.0681 | 21.605 | 89.57 | 87.84 | 6.0524 | 21.572 | 89.70 | 87.78 |
| | C/5 | 1.400 | 6.4461 | 23.241 | 96.35 | 93.31 | 6.4372 | 23.223 | 96.56 | 93.37 |
| | C/10 | 0.700 | 6.7325 | 24.343 | 100.92 | 97.46 | 6.7299 | 24.342 | 101.21 | 97.61 |
| | C/20 | 0.350 | 7.0210 | 25.370 | 105.18 | 101.64 | 7.0269 | 25.396 | 105.60 | 101.92 |
| | C/50 | 0.140 | 7.2964 | 26.292 | 109.01 | 105.62 | 7.3254 | 26.397 | 109.76 | 106.25 |
| 0° | C | 7.000 | 5.4378 | 18.526 | 76.81 | 78.72 | 5.5533 | 19.271 | 80.13 | 80.54 |
| | C/2 | 3.500 | 5.6957 | 20.009 | 82.96 | 82.45 | 5.6758 | 19.953 | 82.96 | 82.32 |
| | C/5 | 1.400 | 6.0224 | 21.626 | 89.66 | 87.18 | 6.0129 | 21.603 | 89.82 | 87.21 |
| | C/10 | 0.700 | 6.2889 | 22.750 | 94.32 | 91.04 | 6.2847 | 22.742 | 94.56 | 91.15 |
| | C/20 | 0.350 | 6.5637 | 23.808 | 98.70 | 95.02 | 6.5725 | 23.844 | 99.15 | 95.33 |
| | C/50 | 0.140 | 6.9334 | 25.076 | 103.96 | 100.37 | 6.9652 | 25.192 | 104.75 | 101.02 |
| -10° | C | 7.000 | 5.0073 | 16.430 | 68.12 | 72.49 | 5.1258 | 17.227 | 71.63 | 74.34 |
| | C/2 | 3.500 | 5.2855 | 18.081 | 74.96 | 76.51 | 5.2613 | 17.998 | 74.83 | 76.31 |
| | C/5 | 1.400 | 5.5653 | 19.750 | 81.88 | 80.56 | 5.5501 | 19.701 | 81.92 | 80.50 |
| | C/10 | 0.700 | 5.8634 | 21.075 | 87.37 | 84.88 | 5.8591 | 21.065 | 87.59 | 84.98 |
| | C/20 | 0.350 | 6.1313 | 22.205 | 92.06 | 88.76 | 6.1315 | 22.211 | 92.35 | 88.93 |
| | C/50 | 0.140 | 6.4670 | 23.493 | 97.40 | 93.62 | 6.4913 | 23.584 | 98.06 | 94.15 |
| -20° | C | 7.000 | 4.7786 | 14.257 | 59.11 | 69.18 | 4.6554 | 14.844 | 61.72 | 67.52 |
| | C/2 | 3.500 | 4.8704 | 15.881 | 65.84 | 70.50 | 4.8393 | 15.753 | 65.60 | 70.19 |
| | C/5 | 1.400 | 5.1634 | 17.657 | 73.20 | 74.75 | 5.1371 | 17.551 | 72.98 | 74.51 |
| | C/10 | 0.700 | 5.4255 | 19.056 | 79.00 | 78.54 | 5.4142 | 19.011 | 79.05 | 78.53 |
| | C/20 | 0.350 | 5.6926 | 20.362 | 84.42 | 82.41 | 5.6887 | 20.346 | 84.60 | 82.51 |
| | C/50 | 0.140 | 6.0245 | 21.813 | 90.44 | 87.21 | 6.0432 | 21.881 | 90.98 | 87.65 |
| -30° | C | 7.000 | 4.5880 | 11.984 | 49.68 | 66.42 | 4.0878 | 11.885 | 49.42 | 59.29 |
| | C/2 | 3.500 | 4.3046 | 13.065 | 54.17 | 62.31 | 4.2251 | 12.736 | 52.96 | 61.28 |
| | C/5 | 1.400 | 4.6824 | 15.065 | 62.46 | 67.78 | 4.6663 | 14.964 | 62.22 | 67.68 |
| | C/10 | 0.700 | 4.9371 | 16.516 | 68.47 | 71.47 | 4.9252 | 16.461 | 68.44 | 71.44 |
| | C/20 | 0.350 | 5.2225 | 18.038 | 74.78 | 75.60 | 5.2133 | 17.993 | 74.82 | 75.61 |
| | C/50 | 0.140 | 5.5779 | 19.813 | 82.14 | 80.75 | 5.5942 | 19.873 | 82.63 | 81.14 |
| -40° | C | 7.000 | 0.5644 | 1.396 | 5.79 | 8.17 | 3.8324 | 9.297 | 38.66 | 55.59 |
| | C/2 | 3.500 | 3.6000 | 9.754 | 40.44 | 52.11 | 3.5997 | 9.757 | 40.57 | 52.21 |
| | C/5 | 1.400 | 4.1115 | 12.038 | 49.91 | 59.52 | 4.0825 | 11.905 | 49.50 | 59.21 |
| | C/10 | 0.700 | 4.3587 | 13.415 | 55.62 | 63.10 | 4.3394 | 13.319 | 55.38 | 62.94 |
| | C/20 | 0.350 | 4.6906 | 15.109 | 62.64 | 67.90 | 4.6809 | 15.054 | 62.59 | 67.89 |
| | C/50 | 0.140 | 5.0578 | 17.150 | 71.10 | 73.22 | 5.0783 | 17.203 | 71.53 | 73.66 |
| | C/100 | 0.070 | 5.2632 | 18.422 | 76.37 | 76.19 | 5.3032 | 18.547 | 77.12 | 76.92 |
| -50° | C/2 | 3.500 | 1.5415 | 3.486 | 14.45 | 22.32 | 1.5253 | 3.502 | 14.56 | 22.12 |
| | C/5 | 1.400 | 2.8741 | 7.328 | 30.38 | 41.61 | 2.8355 | 7.199 | 29.93 | 41.13 |
| | C/10 | 0.700 | 3.4388 | 9.195 | 38.12 | 49.78 | 3.4039 | 9.063 | 37.68 | 49.37 |
| | C/20 | 0.350 | 3.9363 | 11.204 | 46.45 | 56.98 | 3.8984 | 11.056 | 45.97 | 56.54 |
| | C/50 | 0.140 | 4.4235 | 13.677 | 56.70 | 64.03 | 4.4448 | 13.719 | 57.04 | 64.47 |
| | C/100 | 0.070 | 4.6809 | 15.292 | 63.40 | 67.76 | 4.7114 | 15.361 | 63.87 | 68.33 |
| -60° | C/2 | 3.500 | 0.0004 | 0.001 | 0.00 | 0.01 | 0.0004 | 0.001 | 0.00 | 0.01 |
| | C/5 | 1.400 | 0.6521 | 1.378 | 5.71 | 9.44 | 0.6537 | 1.376 | 5.72 | 9.48 |
| | C/10 | 0.700 | 1.1357 | 2.563 | 10.63 | 16.44 | 1.0732 | 2.420 | 10.06 | 15.57 |
| | C/20 | 0.350 | 2.1648 | 5.090 | 21.10 | 31.34 | 2.1100 | 4.948 | 20.57 | 30.60 |
| | C/50 | 0.140 | 3.4634 | 9.048 | 37.51 | 50.14 | 3.4477 | 8.977 | 37.33 | 50.01 |

Fig. 37 Discharge rate performance at 20°C of a 7 Ah Li-ion cell containing 1.0M LiPF$_6$ in EC+EMC+TPP+VC (19.7/73.9/4.9/1.5 v/v%)

LITHIUM-ION ELECTROLYTES CONTAINING FLAME RETARDANT ADDITIVES FOR INCREASED SAFETY CHARACTERISTICS

CROSS-REFERENCE TO RELATED APPLICATIONS

This application claims priority to U.S. Provisional Patent Application Ser. No. 61/189,415, filed Aug. 19, 2008, which is incorporated herein by reference in its entirety, and this application also claims priority to U.S. Provisional Patent Application Ser. No. 61/201,842, filed Dec. 16, 2008, which is also incorporated herein by reference in its entirety.

GOVERNMENT RIGHTS

The invention described herein was made in the performance of work under a NASA contract, and is subject to the provisions of Public Law 96-517 (35 USC 202) in which the Contractor has elected to retain title.

BACKGROUND a. Field of the Invention

The invention relates to electrolytes and organic solvents for electrochemical cells. In particular, the invention relates to lithium-ion electrolytes and organic solvents for lithium-ion cells.

b. Background Art

Lithium-ion ("Li-ion") cells typically include a carbon (e.g., coke or graphite) anode intercalated with lithium ions to form $Li_xC$; an electrolyte consisting of a lithium salt dissolved in one or more organic solvents; and a cathode made of an electrochemically active material, typically an insertion compound, such as $LiCoO_2$. During cell discharge, lithium ions pass from the carbon anode, through the electrolyte to the cathode, where the ions are taken up with the simultaneous release of electrical energy. During cell recharge, lithium ions are transferred back to the anode, where they reintercalate into the carbon matrix.

Future NASA missions aimed at exploring Mars, the Moon, and the outer planets require rechargeable batteries that can operate effectively over a wide temperature range (−60° C. (Celsius) to +60° C. (Celsius)) to satisfy the requirements of various applications, including: Landers (lander spacecraft), Rovers (surface rover spacecraft), and Penetraters (surface penetrator spacecraft). Some future applications typically will require high specific energy batteries that can operate at very low temperatures, while still providing adequate performance and stability at higher temperatures. In addition, many of these applications envisioned by the ESRT (Exploration Systems Research and Technology) program will require improved safety, due to their use by humans. Lithium-ion rechargeable batteries have the demonstrated characteristics of high energy density, high voltage, and excellent cycle life. Currently, the state-of-the-art lithium-ion system has been demonstrated to operate over a wide range of temperatures (−40° C. to +40° C.), however, abuse conditions such as being exposed to high temperature, overcharge, and external shorting, can often lead to cell rupture and fire. The nature of the electrolyte can greatly affect the propensity of the cell/battery to catch fire, given the flammability of the organic solvents used within. Therefore, extensive effort has been devoted recently to developing non-flammable electrolytes to reduce the flammability of the cell/battery.

Desired properties for Li-ion electrolytes can include high conductivity over a wide temperature range (e.g., 1 mS (milli-Siemens) $cm^{-1}$ from −60° C. to +60° C.); good electrochemical stability over a wide voltage range (e.g., 0 to 4.5V (volts)) with minimal oxidative degradation of solvents/salts; good chemical stability; good compatibility with a chosen electrode couple, including good SEI (solid electrolyte interface) characteristics on the electrode and facile lithium intercalation/de-intercalation kinetics; good thermal stability; good low temperature performance throughout the life of the cell, including good resilience to high temperature exposure and minimal impedance build-up with cycling and/or storage; and low toxicity. Since the flammability of the electrolyte solution in Li-ion batteries is a major concern, significant research has been devoted to developing electrolyte formulations with increased safety. Known electrolytes used in state-of-the-art Li-ion cells have typically comprised binary mixtures of organic solvents, for example, high proportions of ethylene carbonate, propylene carbonate or dimethyl carbonate, within which is dispersed a lithium salt, such as lithium hexafluorophosphate ($LiPF_6$). Examples may include 1.0 M (molar) $LiPF_6$ in a 50:50 mixture of ethylene carbonate/dimethyl carbonate, or ethylene carbonate/diethyl carbonate. More recently, electrolytes have also been developed which combine more than two solvents and/or have incorporated the use of electrolyte additives to address specific performance goals.

Fluorinated esters have been incorporated into multi-component electrolyte formulations and their performance was demonstrated over a wide temperature range (−60° C. to +60° C.) (see U.S. application Ser. No. 12/419,473 filed Apr. 7, 2009, for "Lithium Ion Electrolytes and Lithium Ion Cells with Good Low Temperature Performance", Smart et al.). The fluorinated ester co-solvents were employed due to their favorable properties and improved safety characteristics, mainly associated with their low flammability associated with their halogenated nature. Since the flammability of the electrolyte solution in Li-ion batteries is a major concern, significant research has been devoted to developing electrolyte formulations with increased safety. To achieve this, a number of approaches have been adopted, including the use of low-flammability solvents and the use of electrolyte additives. Regarding the first approach, the use of halogenated solvents (Smart, et al., "Improved Performance of Lithium Ion Cells with the use of Fluorinated Carbonate-Based Electrolytes", Journal of Power Sources, 119-121, 359-367 (2003)) and ionic liquids (Xu, Kang, "Nonaqueous Liquid Electrolytes for Lithium-Based Rechargeable Batteries", Chemical Reviews, 104(10), 4303-4417 (2004)) have been pursued. With respect to the use of electrolyte additives, the main focus has been upon the use of phosphorus containing additives, including trimethyl phosphate (Wang, et al., "Nonflammable Trimethyl Phosphate Solvent-Containing Electrolytes for Lithium-Ion Batteries", Journal of the Electrochemical Society, 148(10), A1058-A1065 (2001); Wang, et al., "Nonflammable Trimethyl Phosphate Solvent-Containing Electrolytes for Lithium-Ion Batteries", Journal of the Electrochemical Society, 148(10), A1066-A1071 (2001)), triethyl phosphate (Xu, et al., "An Attempt to Formulate Nonflammable Lithium Ion Electrolytes with Alkyl Phosphates and Phosphazenes", Journal of the Electrochemical Society, 149 (5), A622-A626 (2002)), triphenyl phosphate (Doughty, et al., "Effects of Additives on Thermal Stability of Li-ion Cells", Journal of Power Sources, Vol. 146, Issues 1-2, pp. 116-120 (2005)), tris(2,2,2-trifluoroethyl) phosphate (Xu, et al., "Nonflammable Electrolytes for Li-Ion Batteries Based on a Fluorinated Phosphate", Journal of the Electrochemical Society, 149(8), A1079-A1082 (2002); Xu, et al., "Evaluation of Fluorinated Alkyl Phosphates as Flame Retardants in Electrolytes for Li-Ion Batteries", *Journal of the Electrochemical Society*, 150(2), A161-A169 (2003)), and bis(2,2,2-trifluoroethyl) methyl phosphonate (TFMPo) (Xu, et al., "Nonflammable Electrolytes for Li-Ion Batteries Based on a Fluorinated Phosphate", *Journal of the Electrochemical Society*, 149(8), A1079-A1082 (2002); Xu, et al., "Evaluation of Fluorinated Alkyl Phosphates as Flame Retardants in Electrolytes for Li-Ion Batteries", *Journal of the Electrochemical Society*, 150(2), A161-A169 (2003)).

In addition, known improvements have been made to the safety characteristics of Li-ion electrolytes by the addition of flame retardant additives, such as triphenyl phosphate (referred to as TPhPh or TPP or TPPa), tributyl phosphate (referred to as TBP or TBuPh), triethyl phosphate (referred to as TEP or TEtPh), and bis(2,2,2-trifluoroethyl) methyl phosphonate (referred to as BTFEMP or TFMPo) (see NPO-46262, May 8, 2008). A number of electrolytes based upon these approaches have delivered good performance over a wide temperature range, good cycle life characteristics, and improved safety characteristics, namely reduced flammability. Since the flammability of the electrolyte solution in Li-ion batteries is a major concern, significant research has been devoted to developing electrolyte formulations with increased safety. To achieve this, a number of approaches have been adopted, including the use of low-flammability solvents and the use of electrolyte additives. As discussed above, regarding the first approach, the use of halogenated solvents (Smart, et al., "Improved Performance and Safety of Lithium Ion Cells with the Use of Fluorinated Carbonate-Based Electrolytes", *Journal of Power Sources*, 119-12, 359-367 (2003)) and ionic liquids (Xu, Kang, "Nonaqueous Liquid Electrolytes for Lithium-Based Rechargeable Batteries", *Chemical Review*, 104(10), 4303-4417 (2004)) have been pursued. With respect to the use of electrolyte additives, the main focus has been upon the use of phosphorus containing additives, including trimethyl phosphate, triethyl phosphate, triphenyl phosphate, tris(2,2,2-trifluoroethyl) phosphate, and bis(2,2,2-trifluoroethyl) methyl phosphonate (TFMPo) (see all above). In addition, known phosphorus based flame retardant additives have been investigated. Some of these electrolyte additives have been demonstrated to perform well in multi-component Li-ion battery electrolytes. For example, tris(2,2,2-trifluoroethyl) phosphate (see FIG. 5e) has been used in electrolyte solutions consisting of 1.0M LiPF$_6$ in EC+EMC (1:1 wt %) in varying concentrations (Xu, et al., "Nonflammable Electrolytes for Li-Ion Batteries Based on a Fluorinated Phosphate", *Journal of the Electrochemical Society*, 149(8), A1079-A1082 (2002); Xu, et al., "Evaluation of Fluorinated Alkyl Phosphates as Flame Retardants in Electrolytes for Li-Ion Batteries", *Journal of the Electrochemical Society*, 150(2), A161-A169 (2003)). Tris(2,2,2-trifluoroethyl) phosphite (see FIG. 5f) has been used in concentrations of up to 15% in solutions of 1.0M LiPF$_6$ PC+EC+EMC (3:3:4 wt %) (Zhang, et al., "Tris(2,2,2-trifluoroethyl) Phosphite as a Co-Solvent for Nonflammable Electrolytes in Li-Ion Batteries", *Journal of Power Sources*, 113 (1), 166-172 (2003)), while other have investigated in 1.15M LiPF6 in EC+EMC (3:7 vol %) (Nam, et al., "Diphenyloctyl Phosphate and tris (2,2,2-trifluoroethyl) Phosphite as Flame-Retardant Additives for Li-ion Cell Electrolytes at Elevated Temperature", *Journal of Power Sources*, 180 (1), 561-567 (2008)). Triphenylphosphite (see FIG. 5g) has been investigated in solutions consisting of 1.0M LiPF$_6$ in EC+DEC+DMC (1:1:1 wt %) using concentrations of 10 wt % FRA (Ma, et al., "A Phosphorous Additive for Lithium-Ion Batteries", *Electrochemical and Solid State Letters*, 11(8), A129-A131 (2008)).

Accordingly, there is a need for lithium-ion electrolytes containing flame retardant additives having increased and improved safety characteristics.

SUMMARY

This need for lithium-ion electrolytes containing flame retardant additives having increased and improved safety characteristics is satisfied. The invention discloses various embodiments of Li-ion electrolytes containing flame retardant additives that have delivered good performance over a wide temperature range, good cycle life characteristics, and improved safety characteristics, namely, reduced flammability.

In one embodiment of the invention there is provided an electrolyte for use in a lithium-ion electrochemical cell. The electrolyte comprises a mixture of an ethylene carbonate (EC); an ethyl methyl carbonate (EMC); a fluorinated co-solvent; a flame retardant additive; and, a lithium salt. Preferably, the electrochemical cell operates in a temperature range of from about −50 degrees Celsius to about 60 degrees Celsius. The fluorinated co-solvent preferably comprises 2,2,2-trifluoroethyl butyrate (TFEB), di-2,2,2-trifluoroethyl carbonate (DTFEC), 2,2,2-trifluoroethyl methyl carbonate (TFEMC), mono-fluoroethylene carbonate (FEC), ethyl trifluoroacetate (ETFA), 2,2,2-trifluoroethyl acetate (TFEA), 2,2,2-trifluoroethyl propionate (TFEP), ethyl-2,2,2-trifluoroethyl carbonate (ETFEC), propyl-2,2,2-trifluoroethyl carbonate (PTFEC), methyl-2,2,2,2',2',2'-hexafluoro-i-propyl carbonate (MHFPC), ethyl-2,2,2,2',2',2'-hexafluoro-i-propyl carbonate (EHFPC), fluoropropylene carbonate (FPC), trifluoropropylene carbonate (TFPC), methyl nonafluorobutyl ether, 2,2,3,3,3-pentafluoropropyl methyl ether, 1,1,3,3,3-pentafluoro-2-trifluoromethyl ether, 2,2,3,3-tetrafluoropropyl difluoromethyl ether, 1,1,2,3,3,3-hexafluoropropyl ethyl ether, or perfluoropolyether. The flame retardant additive preferably comprises triphenyl phosphate (TPhPh/TPP/TPPa), tributyl phosphate (TBP/TBuPh), triethyl phosphate (TEP/TEtPh), bis(2,2,2-trifluoroethyl) methyl phosphonate (BTFEMP/TFMPo), triphenyl phosphite, tris(2,2,2-trifluoroethyl) phosphate, tris(2,2,2-trifluoroethyl) phosphite, diethyl ethylphosphonate, and diethyl phenylphosphonate.

In another embodiment of the invention there is provided an electrolyte for use in a lithium-ion electrochemical cell. The electrolyte comprises a mixture of an ethylene carbonate (EC); an ethyl methyl carbonate (EMC); a flame retardant additive; a solid electrolyte interface (SEI) film forming agent; and, a lithium salt. Preferably, the electrochemical cell operates in a temperature range of from about −50 degrees Celsius to about 60 degrees Celsius. The flame retardant additive preferably comprises triphenyl phosphate (TPhPh/TPP/TPPa), tributyl phosphate (TBuPh), triethyl phosphate (TEtPh), bis(2,2,2-trifluoroethyl) methyl phosphonate (TFMPo), triphenyl phosphite, tris(2,2,2-trifluoroethyl) phosphate, tris(2,2,2-trifluoroethyl) phosphite, diethyl ethylphosphonate, and diethyl phenylphosphonate. The solid electrolyte interface (SEI) film forming agent preferably comprises vinylene carbonate (VC), vinyl ethylene carbonate (VEC), dibutyl pyrocarbonate (DBPC), dimethyl pyrocarbonate (DMPC), mono-fluoroethylene carbonate (FEC), lithium bis(oxalate)borate (LiBOB), lithium oxaltodifluoroborate (LiODFB), ethylene sulfite, propylene sulfite, butylene sulfite, lithium tetrafluorooxalatophosphate (LiPF$_4$(C$_2$O$_4$)), vinylene acetate, acrylic acid nitrile, ethyl isocyanate, 2-cyano furan, divinyl adipate, maleic anhydride, 2-vinyl pyridine, and vinyl-containing silane based compounds.

In another embodiment of the invention there is provided an electrolyte for use in a lithium-ion electrochemical cell. The electrolyte comprises a mixture of an ethylene carbonate (EC); an ethyl methyl carbonate (EMC); a phosphorus containing flame retardant additive; and, a lithium salt. Preferably, the electrochemical cell operates in a temperature range of from about −50 degrees Celsius to about 60 degrees Celsius. The phosphorus containing flame retardant additive preferably comprises triphenyl phosphate (TPhPh/TPP/TPPa), tributyl phosphate (TBuPh), triethyl phosphate (TEtPh), bis(2,2,2-trifluoroethyl) methyl phosphonate (TFMPo), triphenyl phosphite, tris(2,2,2-trifluoroethyl) phosphate, tris(2,2,2-trifluoroethyl) phosphite, diethyl ethylphosphonate, and diethyl phenylphosphonate.

In another embodiment of the invention there is provided a lithium-ion electrochemical cell comprising an anode; a cathode; and, an electrolyte interspersed between the anode and the cathode. The electrolyte comprises a mixture of an ethylene carbonate (EC); an ethyl methyl carbonate (EMC); a fluorinated co-solvent preferably comprising 2,2,2-trifluoroethyl butyrate (TFEB), di-2,2,2-trifluoroethyl carbonate (DTFEC), 2,2,2-trifluoroethyl methyl carbonate (TFEMC), mono-fluoroethylene carbonate (FEC), ethyl trifluoroacetate (ETFA), 2,2,2-trifluoroethyl acetate (TFEA), 2,2,2-trifluoroethyl propionate (TFEP), ethyl-2,2,2-trifluoroethyl carbonate (ETFEC), propyl-2,2,2-trifluoroethyl carbonate (PTFEC), methyl-2,2,2,2',2',2'-hexafluoro-i-propyl carbonate (MHFPC), ethyl-2,2,2,2',2',2'-hexafluoro-i-propyl carbonate (EHFPC), fluoropropylene carbonate (FPC), trifluoropropylene carbonate (TFPC), methyl nonafluorobutyl ether, 2,2,3,3,3-pentafluoropropyl methyl ether, 1,1,3,3,3-pentafluoro-2-trifluoromethyl ether, 2,2,3,3-tetrafluoropropyl difluoromethyl ether, 1,1,2,3,3,3-hexafluoropropyl ethyl ether, or perfluoropolyether; a flame retardant additive preferably comprising triphenyl phosphate (TPhPh/TPP/TPPa), tributyl phosphate (TBuPh), triethyl phosphate (TEtPh), bis(2,2,2-trifluoroethyl) methyl phosphonate (TFMPo), triphenyl phosphite, tris(2,2,2-trifluoroethyl) phosphate, tris(2,2,2-trifluoroethyl) phosphite, diethyl ethylphosphonate, and diethyl phenylphosphonate; and, a lithium salt. Preferably, the electrochemical cell operates in a temperature range of from about −50 degrees Celsius to about 60 degrees Celsius.

In another embodiment of the invention there is provided a lithium-ion electrochemical cell comprising an anode; a cathode; and, an electrolyte interspersed between the anode and the cathode. The electrolyte comprises a mixture of an ethylene carbonate (EC); an ethyl methyl carbonate (EMC); a phosphorus containing flame retardant additive preferably comprising triphenyl phosphate (TPhPh/TPP/TPPa), tributyl phosphate (TBuPh), triethyl phosphate (TEtPh), bis(2,2,2-trifluoroethyl) methyl phosphonate (TFMPo), triphenyl phosphite, tris(2,2,2-trifluoroethyl) phosphate, tris(2,2,2-trifluoroethyl) phosphite, diethyl ethylphosphonate, and diethyl phenylphosphonate; and, a lithium salt. The electrochemical cell operates in a temperature range of from about −50 degrees Celsius to about 60 degrees Celsius.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The invention can be better understood with reference to the following detailed description taken in conjunction with the accompanying drawings which illustrate preferred and exemplary embodiments, but which are not necessarily drawn to scale, wherein:

FIG. 1 is an illustration of a table summary of charge-discharge characteristics of experimental lithium-ion cells containing various electrolytes subjected to formation cycling according to the invention;

FIG. 2 is an illustration of a table summary of discharge capacity at low temperature for MCMB-LiNiCoO$_2$ containing electrolytes with flame retardant additives according to the invention;

FIG. 6 is an illustration of a table summary of charge-discharge characteristics of experimental MCMB-LiNiCoO$_2$ cells containing electrolytes with flame retardant additives subjected to formation cycling according to the invention;

FIG. 8 is an illustration of a table summary of discharge capacity at low temperature of a number of MCMB-LiNiCoO$_2$ cells containing electrolytes with flame retardant additives according to the invention;

FIG. 12 is an illustration of a summary table of formation characteristics of electrolytes with flame retardant additives and fluoroesters according to the invention;

FIG. 14 is an illustration of a summary table of results obtained from Electrochemical Impedance Spectroscopy (EIS) measurements for cathodes in contact with electrolytes with flame retardant additives and fluoroesters according to the invention;

FIG. 15 is an illustration of a summary table of results obtained from Electrochemical Impedance Spectroscopy (EIS) measurements for anodes in contact with electrolytes with flame retardant additives and fluoroesters according to the invention;

FIG. 16 is an illustration of a graph showing the Tafel polarization measurements performed on MCMB anodes in contact with electrolytes with flame retardant additives and fluoroesters and data was obtained from MCMB-$LiNi_{0.8}Co_{0.2}O_2$ cells containing lithium reference electrodes according to the invention;

FIG. 17 is an illustration of a graph showing the Tafel polarization measurements performed on $LiNiCoO_2$ cathodes in contact with electrolytes with flame retardant additives and fluoroesters and data was obtained from MCMB-$LiNiCoO_2$ cells equipped with lithium reference electrodes according to the invention;

FIG. 18 is an illustration of a table summary of DC micropolarization measurements for the cathode of cells containing flame retardant additives and fluoroester electrolytes according to the invention;

FIG. 19 is an illustration of a table summary of DC micropolarization measurements for the anode of cells containing flame retardant additives and fluoroester electrolytes according to the invention;

FIG. 21 is an illustration of a table summary of formation characteristics of electrolytes with flame retardant additives and SEI enhancing agent according to the invention;

FIG. 22 is an illustration of a table summary of evaluation of low temperature performance of cells containing flame retardant additives and SEI additive according to the invention;

FIG. 23 is an illustration of a table summary of results obtained from Electrochemical Impedance Spectroscopy (EIS) measurements for the cathodes of cells containing flame retardant additives/VC according to the invention;

FIG. 24 is an illustration of a table summary of results obtained from Electrochemical Impedance Spectroscopy (EIS) measurements for the anodes of cells containing flame retardant additives/VC according to the invention;

FIG. 25 is an illustration of a table summary of linear polarization measurements for the anodes of cells containing electrolytes with flame retardant additives/VC according to the invention;

FIG. 26 is an illustration of a table summary of linear polarization measurements for the cathodes of cells containing electrolytes with flame retardant additives/VC according to the invention;

FIG. 27 is an illustration of a table summary of formation characteristics of experimental MCMB-$LiNiCoO_2$ cells containing electrolytes with flame retardant additives subjected to formation cycling according to the invention;

FIG. 28 is an illustration of a table summary of discharge capacity at low temperature of a number of MCMB-$LiNiCoO_2$ cells containing electrolytes with flame retardant additives according to the invention;

FIG. 32 is an illustration of a graph showing the Tafel polarization measurements of MCMB electrodes from MCMB-$LiNiCoO_2$ cells containing electrolytes with 10% TPP and with and without the addition of DTFEC according to the invention;

FIG. 33 is an illustration of a table summary of discharge capacity at low temperature of a number of MCMB-$LiNiCoO_2$ cells containing electrolytes with 10% TPP and TFEMC and/or FEC according to the invention;

FIG. 35 is an illustration of a table summary of the formation characteristics of a number of Li—Li ($Li_{0.17}Ni_{0.25}Mn_{0.58}$)$O_2$ cells containing various electrolytes with TPP and TPPi flame retardant additives according to the invention;

FIG. 36 is an illustration of a table summary of discharge performance of a 7 Ah Li-ion cell containing 1.0M $LiPF_6$ in EC+EMC+TPP+VC (19.7/73.9/4.9/1.5 v/v %) according to the invention;

DETAILED DESCRIPTION

Disclosed embodiments will now be described more fully hereinafter with reference to the accompanying drawings, in which some, but not all disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The invention discloses various embodiments of Li-ion electrolytes containing flame retardant additives that have delivered good performance over a wide temperature range, good cycle life characteristics, and improved safety characteristics, namely, reduced flammability. In addition, the invention discloses lithium-ion electrochemical cells comprising anodes; cathodes; and embodiments of the electrolyte of the invention interspersed between the anodes and the cathodes.

Figure 39:
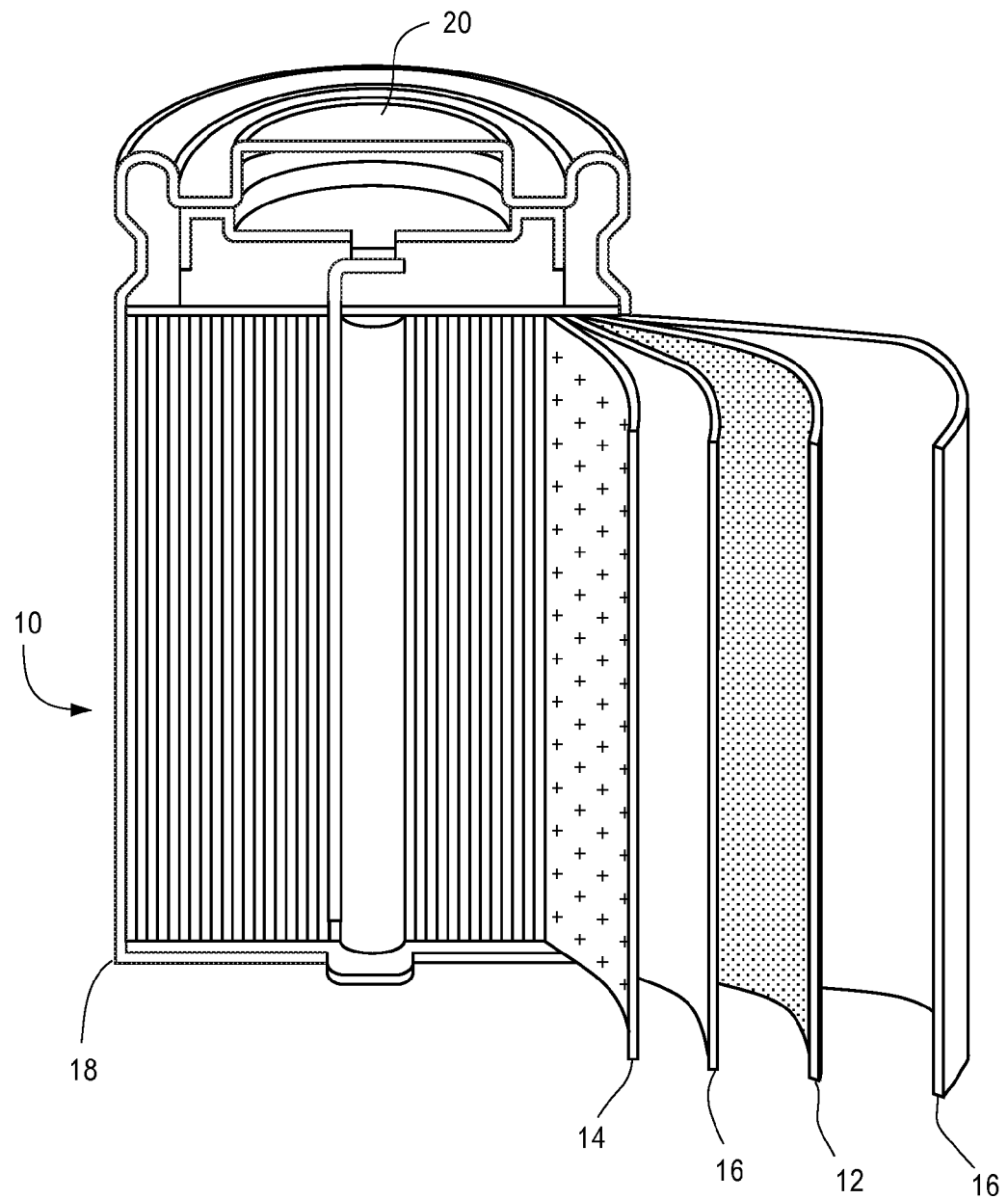

FIG. 39 is an illustration of a partially exploded view of a lithium-ion electrochemical cell 10 or battery constructed according to one embodiment of the invention. The electrolytes and organic solvents described herein may be used in the construction of the improved Li-ion electrochemical cell, characterized by good performance over a wide temperature range, good cycle life characteristics, and improved safety characteristics. The electrochemical cell preferably operates in a temperature range of from about −50 degrees C. (Celsius) to about 60 degrees C. (Celsius). The lithium-ion electrochemical cell 10 comprises an anode 12. The anode 12 may comprise mesocarbon microbeads (MCMB) carbon, lithium titanate ($Li_4Ti_5O_{12}$), carbon graphite, coke based carbon, lithium metal, or another suitable material. Carbon is the preferred anode material for lithium-ion rechargeable cells due to its low potential versus lithium (of the lithiated compound), excellent reversibility for lithium intercalation/de-intercalation reactions, good electronic conductivity, and low cost. Three broad types of carbonaceous anodic materials are known: (a) non-graphitic carbon, e.g., petroleum coke, pitch coke, (b) graphitic carbon, e.g., natural graphite, synthetic graphite, and (c) modified carbon, e.g., mesocarbon microbead carbon material. The lithium-ion electrochemical cell further comprises a cathode 14 such as an insertion-type cathode. The cathode 14 may comprise lithium cobalt oxide ($LiCoO_2$), lithium nickel cobalt oxide ($LiNi_{0.8}Co_{0.2}O_2$), lithium manganese oxide ($LiMn_2O_4$), lithium nickel cobalt aluminum oxide ($LiNiCoAlO_2$), lithium metal phosphate ($LiMPO_4$) where the metal may comprise iron, cobalt, manganese, or another suitable metal, lithium nickel cobalt manganese oxide ($LiNiCoMnO_2$), high voltage electrodes such as $Li(Li_{0.17}Ni_{0.25}Mn_{0.58})O_2$ and $LiMn_2O_4$ spinel, or another suitable material. Suitable cathode materials include transition metal oxides, such as insertion-type metal oxides. In lithium-ion cells, the cathode functions as a source of lithium for the intercalation/de-intercalation reactions at the anode and the cathode. Also, it is preferable that the cathode material in lithium-ion cells have a high voltage versus lithium (>3.0 V) to compensate for voltage losses due to the use of alternate lithium anode materials (having reduced lithium activity) such as lithiated carbon. Lithiated cobalt oxide is a preferred compound because of its ease of preparation and reversibility. Lithiated nickel oxide, lithiated manganese oxide, and other suitable lithiated metal oxides are good alternatives. The anode 12 may be separated from the cathode 14 by one or more electrolyte-permeable separators 16, with the anode/separator(s)/cathode preferably cylindrically rolled up in "jelly roll" fashion and inserted into a can or case 18, which is sealed or closed by a cap 20. The Li-ion electrochemical cell 10 further comprises an electrolyte, such as one of the electrolytes discussed in detail below, interspersed between the anode and the cathode. Both the anode 12 and the cathode 14 are bathed in the electrolyte which is able to pass through the separator(s), allowing ion movement from one electrode to the other. The electrolyte that may be used in the Li-ion electrochemical cell may comprise one of the below discussed mixtures. Other features, such as one or more gaskets, anode and cathode tabs, safety vents, center pin, and other features known in the art may be included as deemed appropriate, in accordance with known battery design and fabrication. The electrolytes of the invention may be used in the above-described electrochemical cell or battery, and may also be used in such batteries as automotive Li-ion cell batteries, computer laptop Li-ion cell batteries, and can be used for aerospace applications (e.g., astronaut equipment, satellites, planetary rovers, and other suitable applications), and military applications (e.g., communications devices, aircraft batteries, back-up power sources, and other suitable applications).

EXAMPLES AND ELECTROCHEMICAL MEASUREMENTS

Li-ion Electrolytes Containing FRA and Incorporating Fluorinated Ester Co-Solvents Description. Experiments were conducted on Li-ion electrolytes containing flame retardant additives (FRA) and incorporating fluorinated ester co-solvents. As part of a continuing effort to develop advanced electrolytes to improve the safety and performance of Li-ion cells, especially over a wide operating temperature range, a number of Li-ion electrolytes that contain flame retardant additive in conjunction with fluorinated ester co-solvents were developed to provide a safe, wide operating temperature range system. The safety characteristics of these electrolytes were further improved by the addition of flame retardant additives, such as triphenyl phosphate (TPP or TPPA or TPhPh), tributyl phosphate (TBP or TBuPh), triethyl phosphate (TEP or TEtPh), and bis(2,2,2-trifluoroethyl) methyl phosphonate (BTFEMP or TFMPo). A number of electrolytes based upon these approaches have delivered good performance over a wide temperature range, good cycle life characteristics, and improved safety characteristics, namely reduced flammability.

The following electrolyte formulations were investigated and demonstrated in experimental MCMB carbon-$LiNi_{0.8}Co_{0.2}O_2$ cells: (1) 1.0 M $LiPF_6$ in EC+EMC+TFEB+TPP (20:55:20:5 v/v %); (2) 1.0 M $LiPF_6$ in EC+EMC+TFEB+TBP (20:55:20:5 v/v %); (3) 1.0 M $LiPF_6$ in EC+EMC+TFEB+TEP (20:55:20:5 v/v %); (4) 1.0 M $LiPF_6$ in EC+EMC+TFEB+BTFEMP (20:55:20:5 v/v %); (5) 1.0 M $LiPF_6$ in EC+EMC+TPP (20:75:5 v/v %); (6) 1.0 M $LiPF_6$ in EC+EMC+TPP (20:75:5 v/v %)+1.5% VC; (7) 1.0 M $LiPF_6$ in EC+EMC (20:80 v/v %)+1.5%VC; and, (8) 1.0 M $LiPF_6$ in EC+EMC (20:80 v/v %) (Baseline).

In general, many of the formulations displayed good performance over a wide temperature range, good cycle life characteristics, and were expected to have improved safety characteristics, namely low flammability. Of the electrolytes studied, 1.0 M $LiPF_6$ EC+EMC+TFEB+TPP (20:55:20:5 v/v %) (where TPP=triphenyl phosphate) was identified as being a promising non-flammable electrolyte, due to reasonable low temperature performance and superior life characteristics. In addition, the electrolyte consisting of 1.0 M $LiPF_6$ EC+EMC+TPP (20:75:5 v/v %)+1.5%VC was demonstrated to have even further improved life characteristics, due to the incorporation of an SEI (solid electrolyte interface) promoter (i.e., VC=vinylene carbonate), which appears to inhibit the decomposition of the TPP.

A number of experimental lithium-ion cells, consisting of MCMB carbon anodes and $LiNi_{0.8}Co_{0.2}O_2$ cathodes, have been fabricated to study the described technology. These cells served to verify and demonstrate the reversibility, low temperature performance, and electrochemical aspects of each electrode as determined from a number of electrochemical characterization techniques. The electrolytes selected for evaluation are listed above (see electrolytes 1-8). FIG. 1 is an illustration of a table summary of charge-discharge characteristics of experimental lithium-ion cells containing various electrolytes subjected to formation cycling according to the invention. As shown in FIG. 1, all cells displayed good reversibility at room temperature and minimal reactivity during the formation cycling. The high coulombic efficiency and comparable irreversible capacity losses were indirectly related to the overall stability of the solutions and the electrode filming characteristics. As further shown in FIG. 1, reasonable reversibility was observed with the cells containing all of the electrolyte variations, when compared after the formation cycling. It should be noted that some variation in capacity was due to different electrode weights, and not electrolyte type, so most comparisons were expressed in terms of percentage of initial capacity under ambient temperatures. Of the additives investigated, the triphenyl phosphate (TPP) displayed the lowest irreversible capacity losses and highest coulombic efficiency, suggesting that it is not electrochemically decomposing and participating in the electrode filming process deleteriously.

Low Temperature Performance. FIG. 2 is an illustration of a table summary of discharge capacity at low temperature for MCMB-LiNiCoO$_2$ containing electrolytes with flame retardant additives according to the invention. When the cells described were evaluated at low temperatures, as shown in FIG. 2, reasonable low temperature performance was generally observed. This finding was significant since the use of flame retardant additives was anticipated in decreasing the power capability and low temperature performance, due to decreased ionic conductivity of the media and increased electrode film resistance with the possible reactivity of the FRA.

Figure 3:
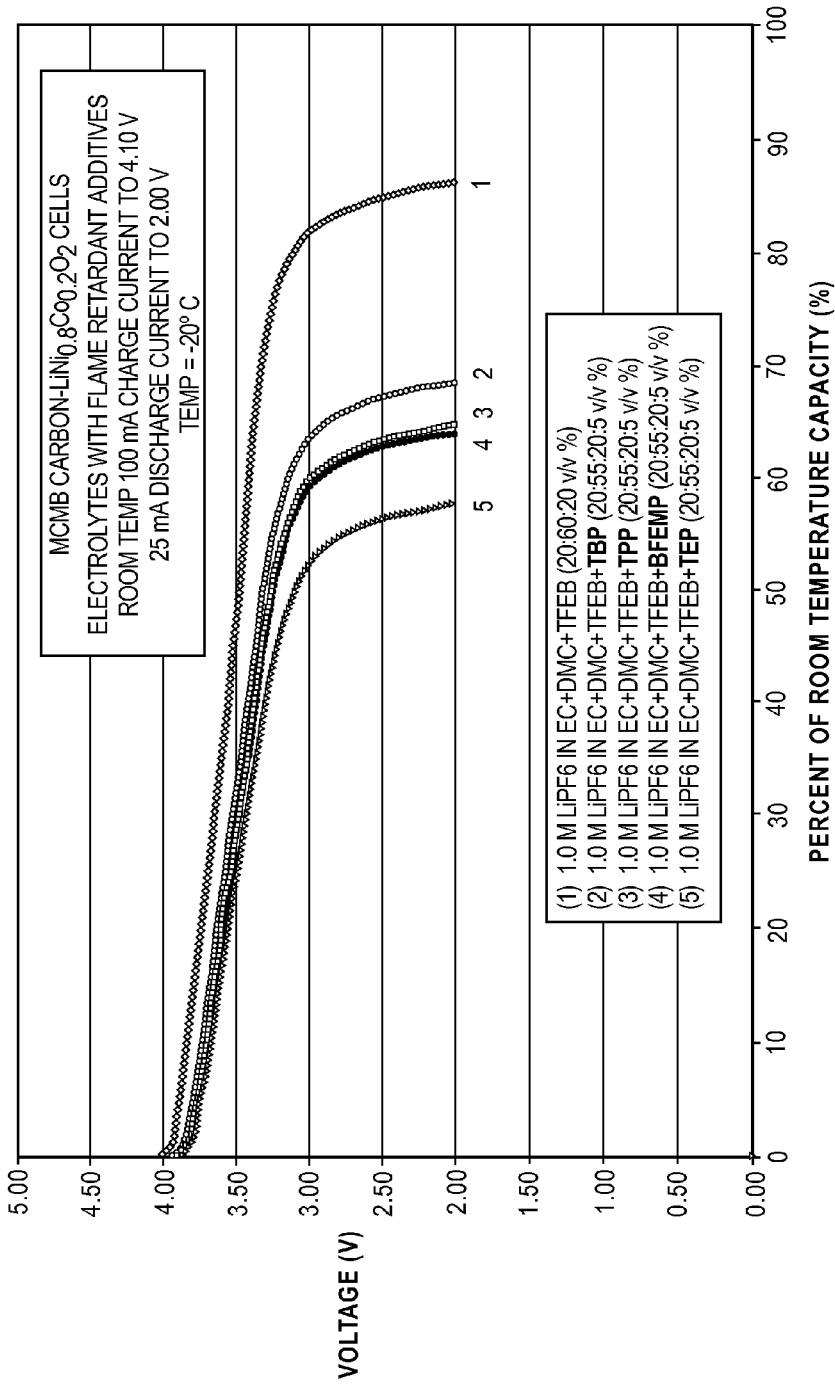
FIG. 3 is an illustration of a graph showing discharge capacity at −20° C. (expressed as percent of room temperature capacity) of MCMB-LiNiCoO$_2$ cells containing electrolytes with flame retardant additives according to the invention.

As expected, the low temperature performance was somewhat compromised upon the addition of the flame retardant additives, especially at temperatures below –20° C. (Celsius). Of the FRA-containing electrolytes the formulation containing tributyl phosphate delivered the best performance at low temperature, with over 68% of the room temperature capacity being delivered at –20° C. using a ~C/16 (approximate full capacity over 16 hour discharge rate), as illustrated in FIG. 3. FIG. 3 is an illustration of a graph showing discharge capacity at –20° C. (expressed as percent of room temperature capacity) of MCMB-LiNiCoO$_2$ cells containing electrolytes with flame retardant additives according to the invention. The x-axis shows percent of room temperature capacity (%) and the y-axis shows voltage (V).

Figure 4:
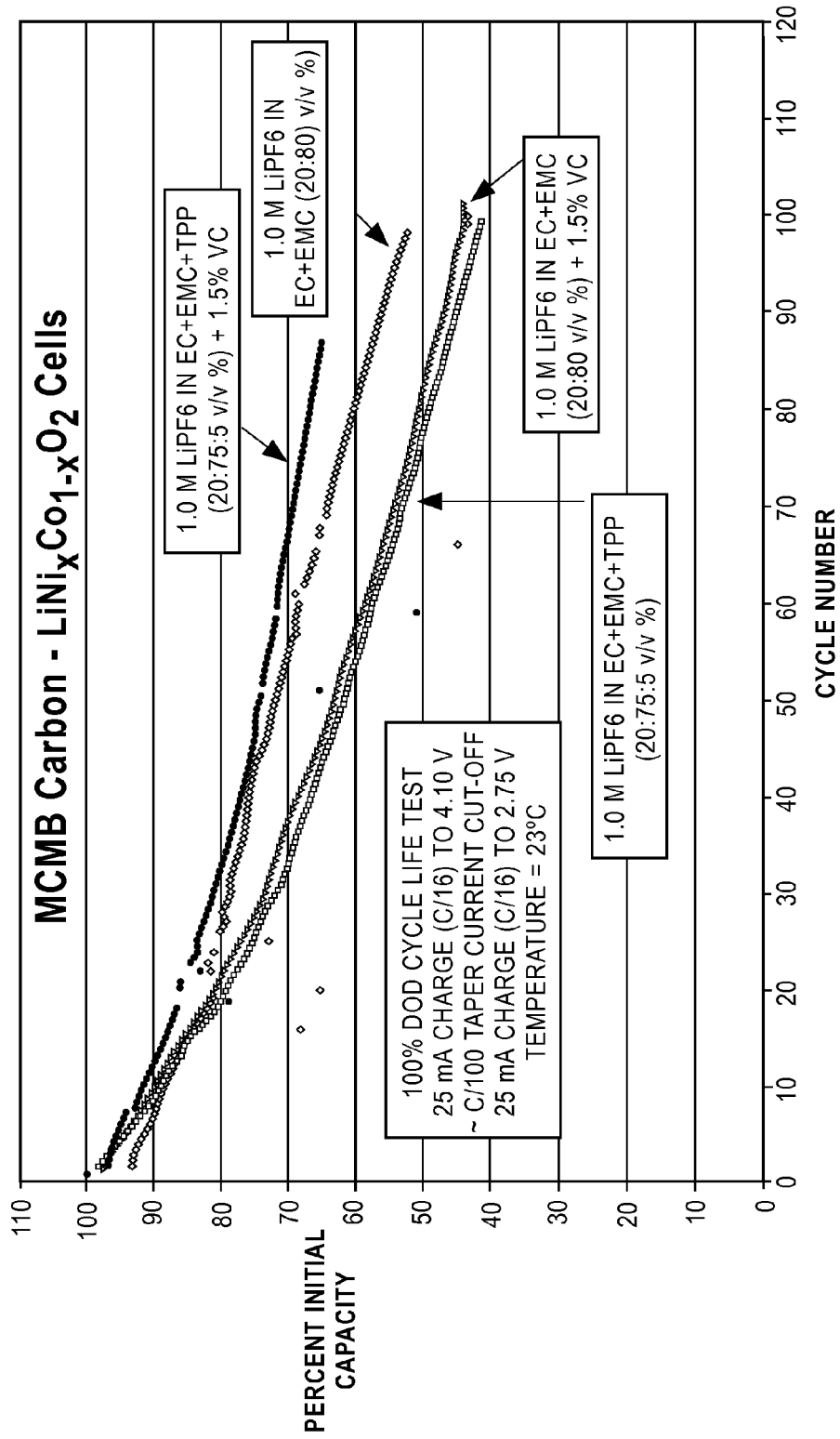
FIG. 4 is an illustration of a graph showing cycle life performance of MCMB-LiNiCoO$_2$ cell containing electrolytes with flame retardant additives according to the invention.

Cycle Life Performance. As mentioned previously, the general expectation was that the cycle life performance would be compromised with the addition of FRAs due to the possible reactivity with the electrode interfaces leading to impedance build-up and capacity loss. To mitigate this, incorporation of a "film forming" additive to the electrolyte to prevent excessive reactivity of the FRA, especially at the anode, was investigated. FIG. 4 is an illustration of a graph showing cycle life performance of MCMB-LiNiCoO$_2$ cell containing electrolytes with flame retardant additives according to the invention. The x-axis shows cycle number and the y-axis shows percent initial capacity. As illustrated in FIG. 4, when vinylene carbonate (VC), a well-known SEI "film forming" additive, was added to an electrolyte containing an FRA additive (e.g, triphenyl phosphate), much improved cycle life performance was obtained. It is anticipated that this approach can be extended to other FRA-containing electrolytes which have different solvent blends, salt types, and/or which employed other SEI film forming agents. It should also be noted that the cycle life performance is anticipated to be much better in aerospace quality lithium-ion cells, due to the fact that the data reflects experimental cells which are a flooded design, and not hermetically sealed.

Figure 13:
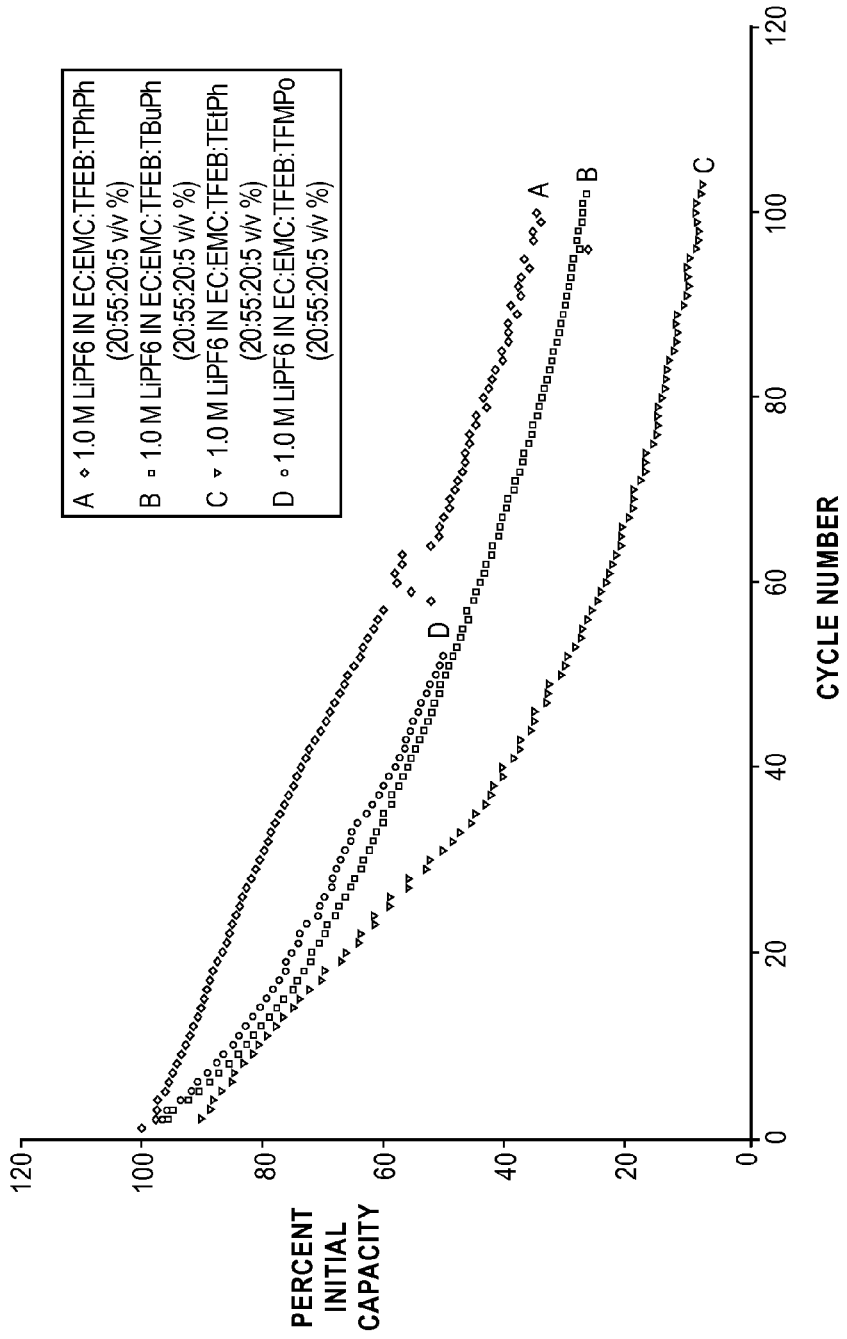
FIG. 13 is an illustration of a graph showing cycle life of electrolytes with flame retardant additives and fluoroesters according to the invention.

FIG. 12 is an illustration of a summary table of formation characteristics of electrolytes with flame retardant additives and fluoroester according to the invention. Addition of flame retardant additives did not significantly increase irreversible capacity loss or reduce coulombic efficiency of the cells during the formation cycles. FIG. 13 is an illustration of a graph showing cycle life of electrolytes with flame retardant additives and fluoroester according to the invention. The x-axis shows cycle number and the y-axis shows percent initial capacity. As shown in FIG. 13, phenyl branches improved cyclability of FRA electrolytes, and short aliphatic branches of the FRA reduced the electrochemical and life cycle stability of the electrolyte. FIG. 14 is an illustration of a summary table of results obtained from Electrochemical Impedance Spectroscopy (EIS) measurements for cathodes in contact with electrolytes with flame retardant additives and fluoroesters according to the invention. As shown in FIG. 14, addition of FRA did not significantly increase the impedance growth at the cathode. FIG. 15 is an illustration of a summary table of the results obtained from Electrochemical Impedance Spectroscopy (EIS) measurements for MCMB anodes in contact with electrolytes with flame retardant additives and fluoroesters according to the invention. As shown in FIG. 15, significant impedance growth at the anode occurred with the addition of the FRA, and the film resistance growth was significantly higher than the baseline. FIG. 16 is an illustration of a graph showing the Tafel polarization measurements performed on MCMB anodes in contact with electrolytes with flame retardant additives and fluoroesters and data was obtained from MCMB-LiNi$_{0.8}$Co$_{0.2}$O$_2$ cells containing lithium reference electrodes at a temperature of 23° C. according to the invention. The x-axis shows current (Amps) and the y-axis shows anode potential (mV versus Li$^+$/Li). FIG. 17 is an illustration of a graph showing the Tafel polarization measurements performed on LiNiCoO$_2$ cathodes in contact with electrolytes with flame retardant additives and fluoroesters and data was obtained from MCMB-LiNiCoO$_2$ cells equipped with lithium reference electrodes at a temperature of 23° C. according to the invention. The x-axis shows current (Amps) and the y-axis shows cathode potential (V versus Li$^+$/Li). FIG. 18 is an illustration of a table summary of DC (direct current) micro-polarization measurements for the cathode of cells containing flame retardant additives and fluoroester electrolytes according to the invention. FIG. 19 is an illustration of a table summary of the results obtained from DC micro-polarization measurements for the anode of MCMB-LiNi$_{0.8}$Co$_{0.2}$O$_2$ cells containing flame retardant additives and fluoroester electrolytes according to the invention. FIGS. 18-19 further highlight that the deleterious action of the flame retardant additives was resultant from their action at the anode.

Figure 20:
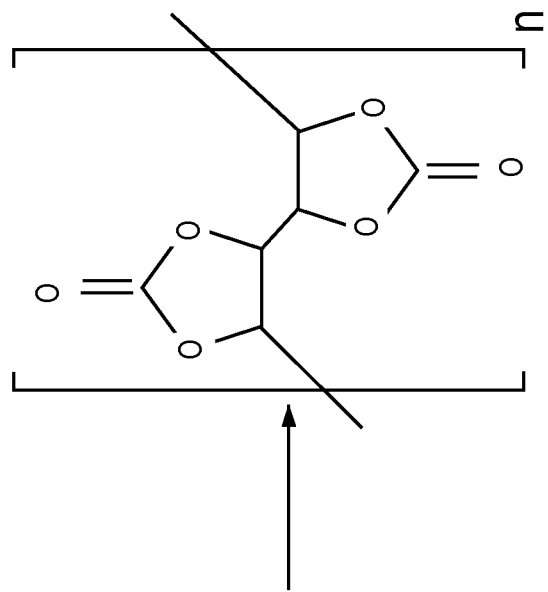
FIG. 20 is an illustration of the chemical structure of SEI (solid electrolyte interface) enhancing agent vinylene carbonate.

FIG. 20 is an illustration of the chemical formation and structure of SEI (solid electrolyte interface) enhancing agent vinylene carbonate. It is generally held that vinylene carbonate undergoes a radical polymerization process at the electrode surface, i.e., especially under reductive conditions at the anode, to produce poly(vinylene carbonate) which imparts beneficial properties to the SEI (i.e., facile transport of lithium ions while offering protection against excessive solvent reduction). SEI enhancing agents can improve the SEI layer by reducing gas generation against extended cycling, reduced capacity loss and SEI stabilization. The mechanism is electrochemically-induced polymerization, and it is terminated by a radical anion reaction with a solvent molecule. The SEI enhancing agent can reduce the decomposition of flame retardant additives. FIG. 21 is an illustration of a table summary of formation characteristics of electrolytes with flame retardant additives and SEI enhancing agent according to the invention. As shown by FIG. 21, the addition of the SEI enhancing additive, vinylene carbonate, increased irreversible capacity loss. However, continued degradation can be minimal after the formation cycling due to the protective nature of vinylene carbonate. FIG. 22 is an illustration of a table summary of evaluation of low temperature performance of cells containing flame retardant additives and SEI additive according to the invention. As shown by FIG. 22, the addition of vinylene carbonate contributed to improved low temperature and increased rate performance. FIG. 23 is an illustration of a table summary of results obtained from Electrochemical Impedance Spectroscopy (EIS) measurements performed on $LiNiCoO_2$ cathodes of $MCMB-LiNiCoO_2$ cells containing electrolytes possessing flame retardant additives/VC according to the invention. As shown by FIG. 23, the impedance growth at the cathode was not significantly influenced by the addition of vinylene carbonate or FRA. FIG. 24 is an illustration of a table summary of results obtained from Electrochemical Impedance Spectroscopy (EIS) measurements performed on MCMB anodes of $MCMB-LiNiCoO_2$ cells containing electrolytes possessing flame retardant additives/VC according to the invention. As shown by FIG. 24, the influence of both FRA and vinylene carbonate was seen at the anode and was exacerbated at low temperatures (i.e., larger film resistance, $R_f$, and larger charge transfer resistance, $R_{ct}$). FIG. 25 is an illustration of a table summary of linear polarization measurements that were performed on MCMB anodes from $MCMB-LiNiCoO_2$ cells containing electrolytes possessing flame retardant additives/VC according to the invention. FIG. 26 is an illustration of a table summary of linear polarization measurements performed on $LiNiCoO_2$ cathodes from $MCMB-LiNiCoO_2$ cells containing electrolytes possessing flame retardant additives/VC according to the invention. As shown by FIGS. 25-26, the polarization resistance of the MCMB anodes increased much more than the cathodes for cells containing FRA.

Summary. The safety characteristics of Li-ion electrolytes has been further improved by the addition of flame retardant additives (FRA), such as triphenyl phosphate (TPP or TPPa or TPhPh), tributyl phosphate (TBP or TBuPh), triethyl phosphate (TEP or TEtPh), and bis(2,2,2-trifluoroethyl) methyl phosphonate (BTEMP or TFMPo). A number of electrolytes based upon these approaches have delivered good performance over a wide temperature range, good cycle life characteristics, and improved safety characteristics, namely reduced flammability. Of the additives investigated, the triphenyl phosphate displayed the lowest irreversible capacity losses and high coulombic efficiency, suggesting that it displays the least amount of electrochemical decomposition and does not participate in the electrode filming process to a great extent. Of the FRA-containing electrolytes, the formulation containing tributyl phosphate delivered the best performance at low temperature, with over 68% (percent) of the room temperature capacity being delivered at −20° C. using a ~C/16 discharge rate. With respect to cycle life performance, improved life characteristics were observed with the incorporation of film forming additives, which serve to prevent excessive reactivity of the FRA at the electrode interfaces, especially at the carbon anode. Further optimization of these electrolyte formulations was anticipated to yield improved performance. It was also anticipated that much improved performance would be demonstrated once these electrolyte solutions were incorporated into hermetically sealed large capacity, prototype cells, especially if effort is devoted to ensuring that all electrolyte components are highly pure. The fluorinated esters imparted desirable physical characteristics on the base electrolyte solvent system. The structure of the FRA significantly influenced the performance characteristics of the cells. Short aliphatic chained phosphates imparted preferred low temperature characteristics. Larger branches of FRA offered increased electrochemical stability leading to improved cycle life. Deleterious effects of FRA were primarily seen at the anodes, such as the build-up of surface films at the interface which limits the kinetics of lithium intercalation/de-intercalation as determined by Electrochemical Impedance Spectroscopy (EIS) and the DC (direct current) polarization techniques. These findings can lead to the mitigation strategy of incorporating additional electrolyte additives to minimize the continued reaction of the FRA at the interface.

Li-ion Electrolytes Containing Phosphorus-Based FRA

Figure 5A:
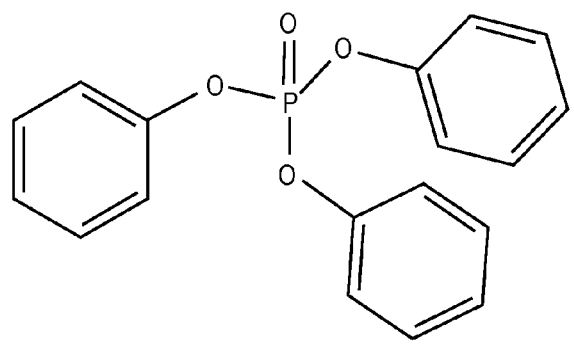
FIG. 5a is an illustration of the chemical structure of flame retardant triphenyl phosphate.
Figure 5B:
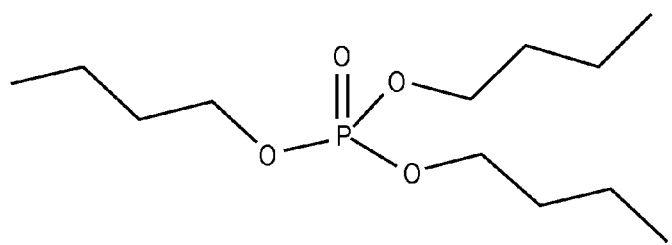
FIG. 5b is an illustration of the chemical structure of flame retardant tributyl phosphate.
Figure 5C:
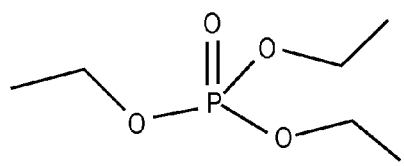
FIG. 5c is an illustration of the chemical structure of flame retardant triethyl phosphate.
Figure 5D:
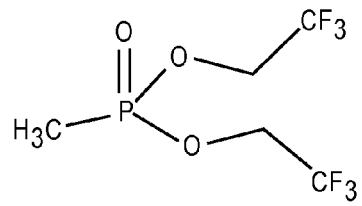
FIG. 5d is an illustration of the chemical structure of flame retardant bis(2,2,2-trifluoroethyl) methyl phosphonate.
Figure 5E:
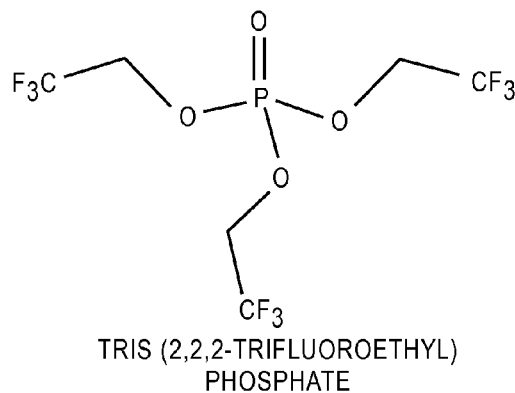
FIG. 5e is an illustration of the chemical structure of flame retardant tris(2,2,2-trifluoroethyl) phosphate.
Figure 5F:
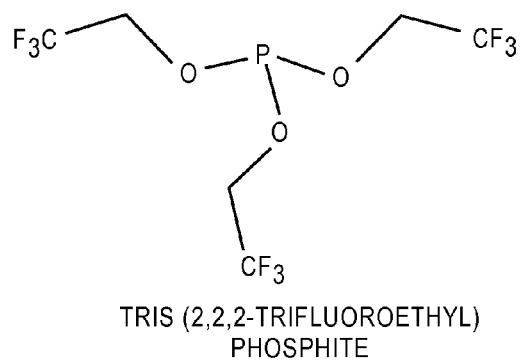
FIG. 5f is an illustration of the chemical structure of flame retardant tris(2,2,2-trifluoroethyl) phosphite.
Figure 5G:
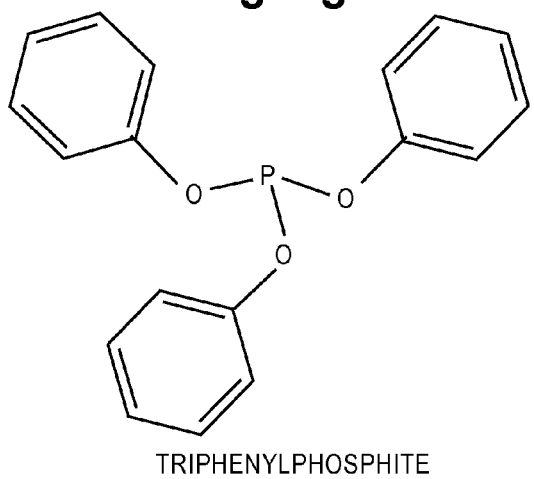
FIG. 5g is an illustration of the chemical structure of flame retardant triphenylphosphite.
Figure 5H:
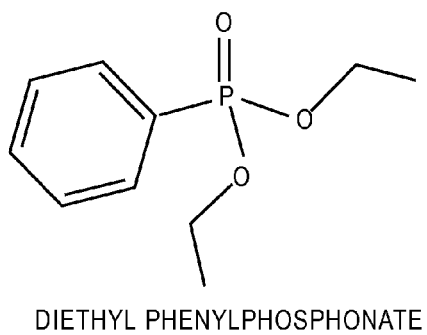
FIG. 5h is an illustration of the chemical structure of flame retardant diethyl phenyl phosphonate.
Figure 5I:
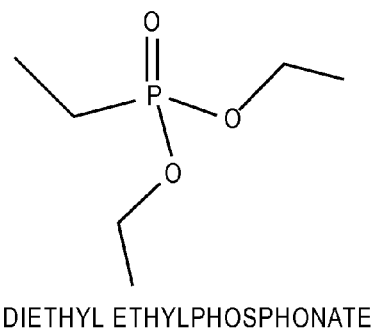
FIG. 5i is an illustration of the chemical structure of flame retardant diethyl ethyl phosphonate.

Description. Additional experiments were conducted with Li-ion electrolytes containing more phosphorus-based flame retardant additives. As part of a continuing effort to develop advanced electrolytes to improve the safety and performance of lithium-ion cells, especially over a wide operating temperature range, a number of Li-ion electrolytes that contain flame retardant additives optimized for operation over a wide temperature range were developed. Phosphorus-based flame retardant additives were investigated, including (a) tris(2,2,2-trifluoroethyl) phosphate (see FIG. 5e showing the chemical structure), (b) tris(2,2,2-trifluoroethyl) phosphite (see FIG. 5f showing the chemical structure), (c) triphenylphosphite (see FIG. 5g showing the chemical structure), (d) diethyl ethylphosphonate (see FIG. 5i showing the chemical structure), and (e) diethyl phenylphosphonate (see FIG. 5h showing the chemical structure). These phosphorus-based flame retardant additives, as shown in FIGS. 5e-5i, were added to an electrolyte composition intended for wide operating temperature range, namely 1.0M $LiPF_6$ in EC+EMC (20:80 v/v %).

The following electrolyte formulations were investigated and demonstrated in experimental MCMB carbon-$LiNi_{0.8}Co_{0.2}O_2$ cells: (1) 1.0 M $LiPF_6$ in EC+EMC+TFPa (20:75:5 v/v %); (2) 1.0 M $LiPF_6$ in EC+EMC+TFPi (20:75:5 v/v %); (3) 1.0 M $LiPF_6$ in EC+EMC+TPPi (20:75:5 v/v %); (4) 1.0 M $LiPF_6$ in EC+EMC+DEP (20:75:5 v/v %); (5) 1.0 M $LiPF_6$ in EC+EMC+DPP (20:75:5 v/v %); and, (6) 1.0 M $LiPF_6$ in EC+EMC (20:80 v/v %) (Baseline), (where TFPa=tris(2,2,2-trifluoroethyl) phosphate, TFPi=tris(2,2,2-trifluoroethyl) phosphite, TPPi=triphenyl phosphite, DEP=diethyl ethylphosphonate, and DPP=diethyl phenylphosphonate).

In general, many of the formulations investigated in this study displayed good performance over a wide temperature range, good cycle life characteristics, and were expected to have improved safety characteristics, namely low flammability. Of the electrolytes studied, 1.0 M $LiPF_6$ in EC+EMC+DEP (20:75:5 v/v %) and 1.0 M $LiPF_6$ in EC+EMC+DPP (20:75:5 v/v %) displayed the best operation at low temperatures, whereas the electrolyte containing triphenylphosphite displayed the best cycle life performance compared to the baseline solution. It is anticipated that further improvements can be made to the life characteristics with the incorporation of a SEI promoters (such as VC, vinylene carbonate), which will likely inhibit the decomposition of the flame retardant additives, as demonstrated in the previous study.

Description. A number of experimental lithium-ion cells, consisting of MCMB carbon anodes and $LiNi_{0.8}Co_{0.2}O_2$ cathodes, were fabricated to study the described technology. These cells served to verify and demonstrate the reversibility, low temperature performance, and electrochemical aspects of each electrode as determined from a number of electrochemical characterization techniques. The electrolytes selected for evaluation are listed above (electrolytes 1-6). FIG. 6 is an illustration of a table summary of charge-discharge characteristics of experimental MCMB-LiNiCoO$_2$ cells containing electrolytes with flame retardant additives subjected to formation cycling according to the invention. As shown in FIG. 6, all cells displayed good reversibility at room temperature and minimal reactivity during the formation cycling. The high coulombic efficiency and comparable irreversible capacity losses were indirectly related to the overall stability of the solutions and the electrode filming characteristics.

Figure 7:
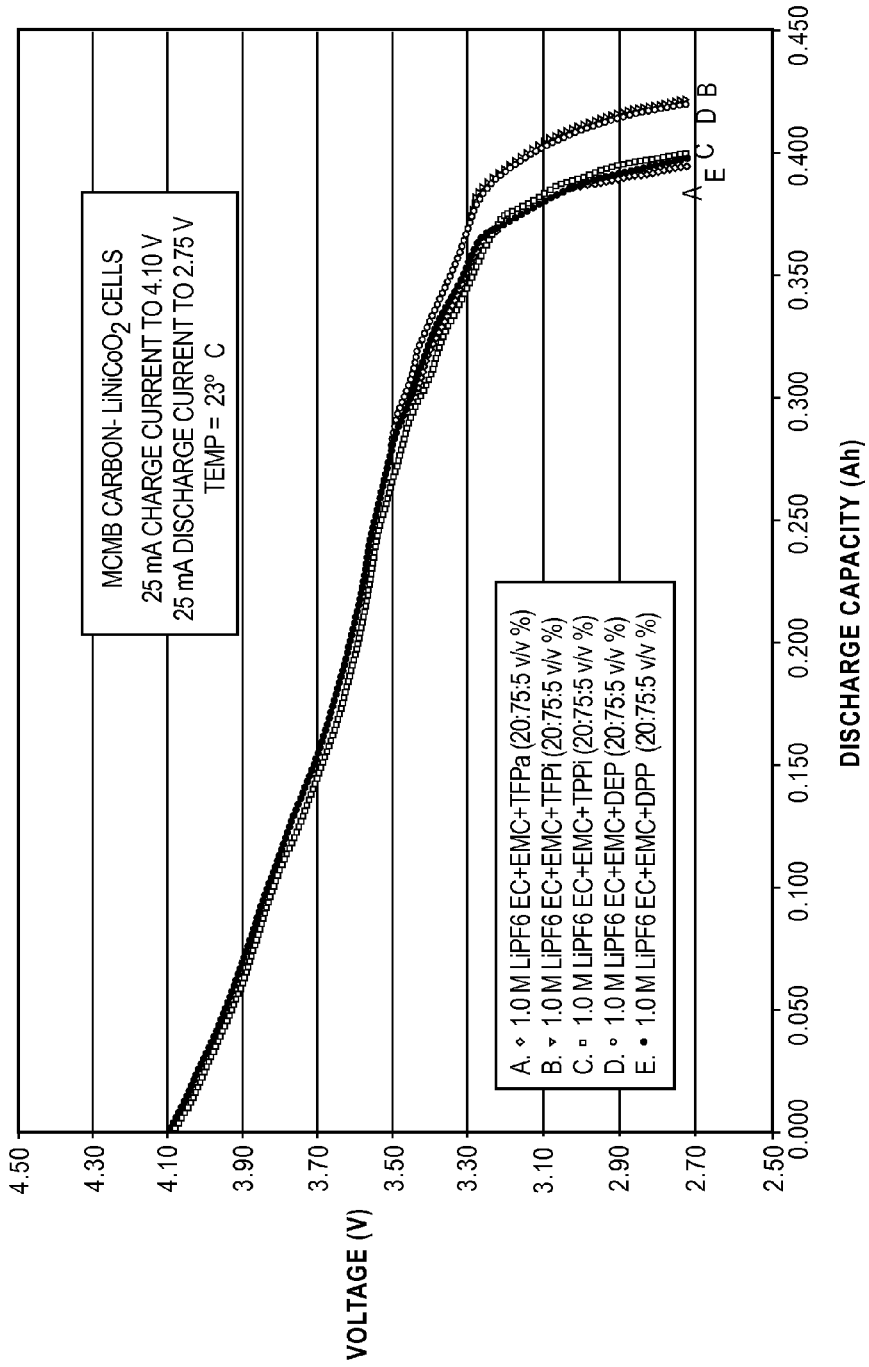
FIG. 7 is an illustration of a graph showing fifth discharge of formation cycling for cells containing flame retardant additives according to the invention.

FIG. 7 is an illustration of a graph showing fifth discharge of formation cycling for cells containing flame retardant additives according to the invention. The x-axis shows discharge capacity in Ah (Ampere hours) and the y-axis shows voltage (V). As shown in FIGS. 6-7, reasonable reversibility was observed with the cells containing all of the electrolyte variations, when compared after the formation cycling. It should be noted that some variation in capacity was due to different electrode weights, and not electrolyte type, so most comparisons were expressed in terms of percentage of initial capacity under ambient temperatures. Of the additives investigated, the electrolytes containing the diethyl ethylphosphonate and diethyl phenylphosphonate displayed the lowest irreversible capacity losses and highest coulombic efficiency, suggesting that it was not electrochemically decomposing and participating in the electrode filming process deleteriously.

Low Temperature Performance. FIG. 8 is an illustration of a table summary of discharge capacity at low temperature of a number of MCMB-LiNiCoO$_2$ cells containing electrolytes with flame retardant additives according to the invention. When the cells described were evaluated at low temperatures, as shown in FIG. 8, reasonable low temperature performance was generally observed. This finding is significant since the use of flame retardant additives was anticipated in decreasing the power capability and low temperature performance, due to decreased ionic conductivity of the media and increased electrode film resistance with the possible reactivity of the FRA.

Of the additives investigated, the diethyl ethylphosphonate (DEP)-containing electrolyte resulted in cells that displayed the best low temperature performance of the group. Conductivity studies performed on the individual electrolyte solutions lead to the finding that some of the solutions containing FRA actually displayed higher ionic conductivity at lower temperatures compared with the baseline solution which did not contain any flame retardant additive, such as with triethyl phosphate. This finding suggests that the FRA can serve to lower the viscosity of the medium, in addition to imparting flame retardant properties. Thus, the high conductivity of the electrolyte, coupled with potentially minimal decomposition of the additive on the electrode surfaces, can lead to good low temperature performance.

Figure 9:
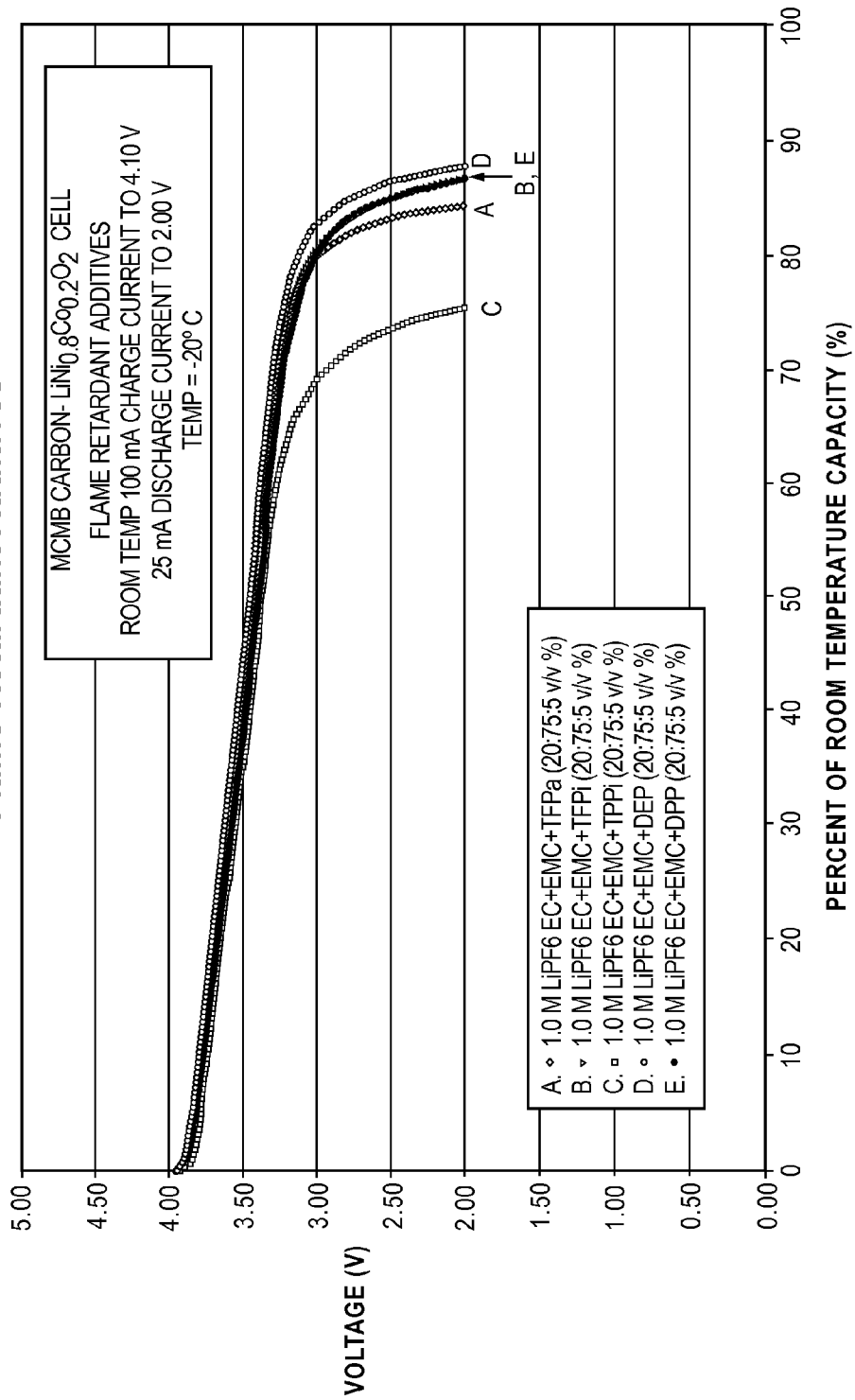
FIG. 9 is an illustration of a graph showing discharge capacity at −20° C. (expressed as percent of room temperature capacity) of MCMB-LiNiCoO$_2$ cells containing electrolytes with flame retardant additives according to the invention.

This is illustrated in FIG. 9, in which the performance of cells containing electrolytes with various FRAs are shown when discharged at −20° C. using a C/16 discharge rate. FIG. 9 is an illustration of a graph showing discharge capacity at −20° C. (expressed as percent of room temperature capacity) of MCMB-LiNiCoO$_2$ cells containing electrolytes with flame retardant additives according to the invention. The x-axis shows percent of room temperature capacity (%) and the y-axis shows voltage (V). Of the FRA-containing electrolytes, the formulation containing diethyl ethylphosphonate delivered the best performance at low temperature, with over 85% of the room temperature capacity being delivered at −20° C.

Figure 10:
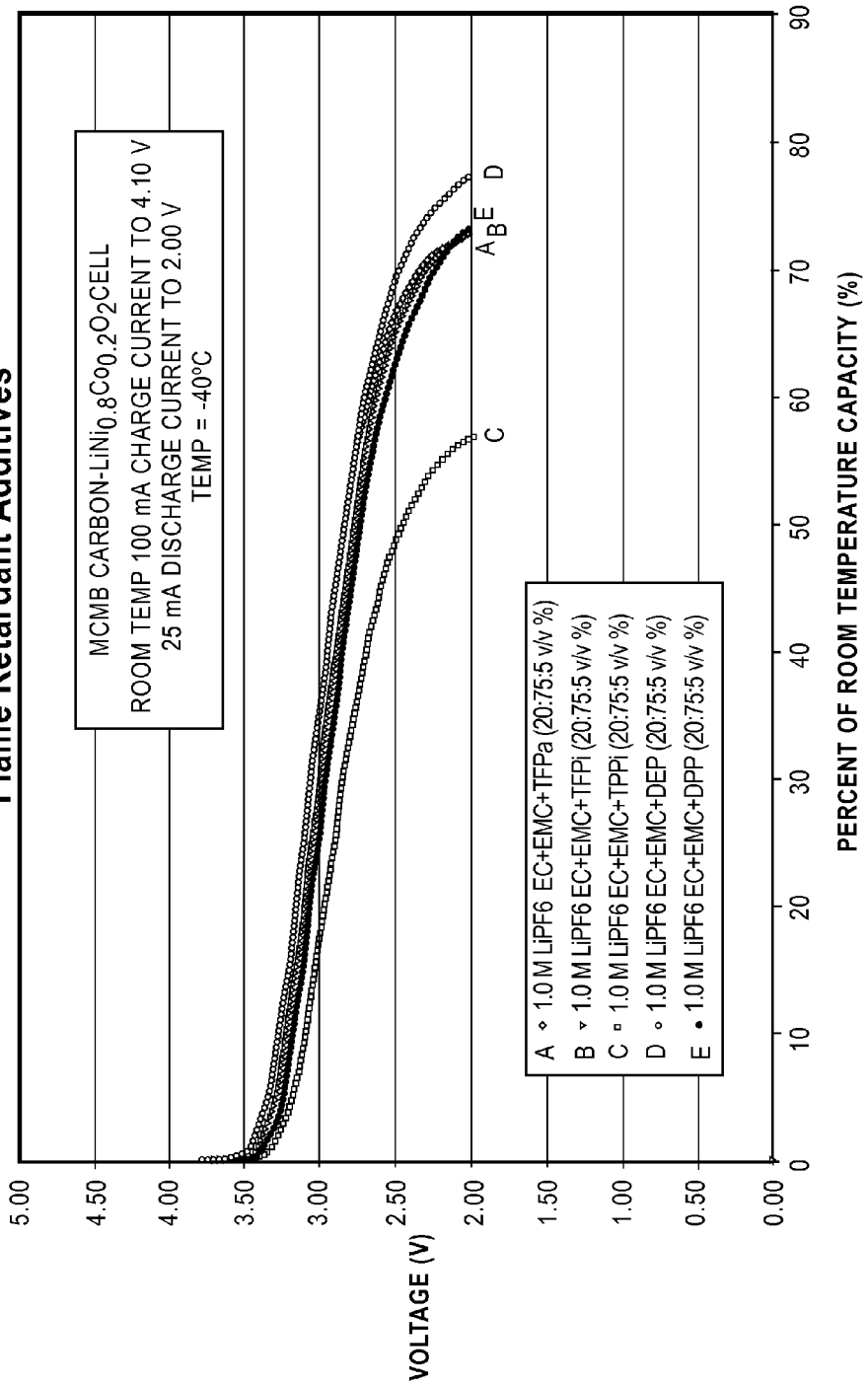
FIG. 10 is an illustration of a graph showing discharge capacity at −40° C. (expressed as percent of room temperature capacity of MCMB-LiNiCoO$_2$ cells containing electrolytes with flame retardant additives according to the invention.

Similar trends and excellent performance was obtained at −40° C., as shown in FIG. 10, in which the cells were discharged using a C/16 discharge rate, following charging at room temperature. FIG. 10 is an illustration of a graph showing discharge capacity at −40° C. (expressed as percent of room temperature capacity) of MCMB-LiNiCoO$_2$ cells containing electrolytes with flame retardant additives according to the invention. The x-axis shows percent of room temperature capacity (%) and the y-axis shows voltage (V). As shown, the cell containing the electrolyte with the DEP additive again displayed the best performance at low temperature.

Figure 11:
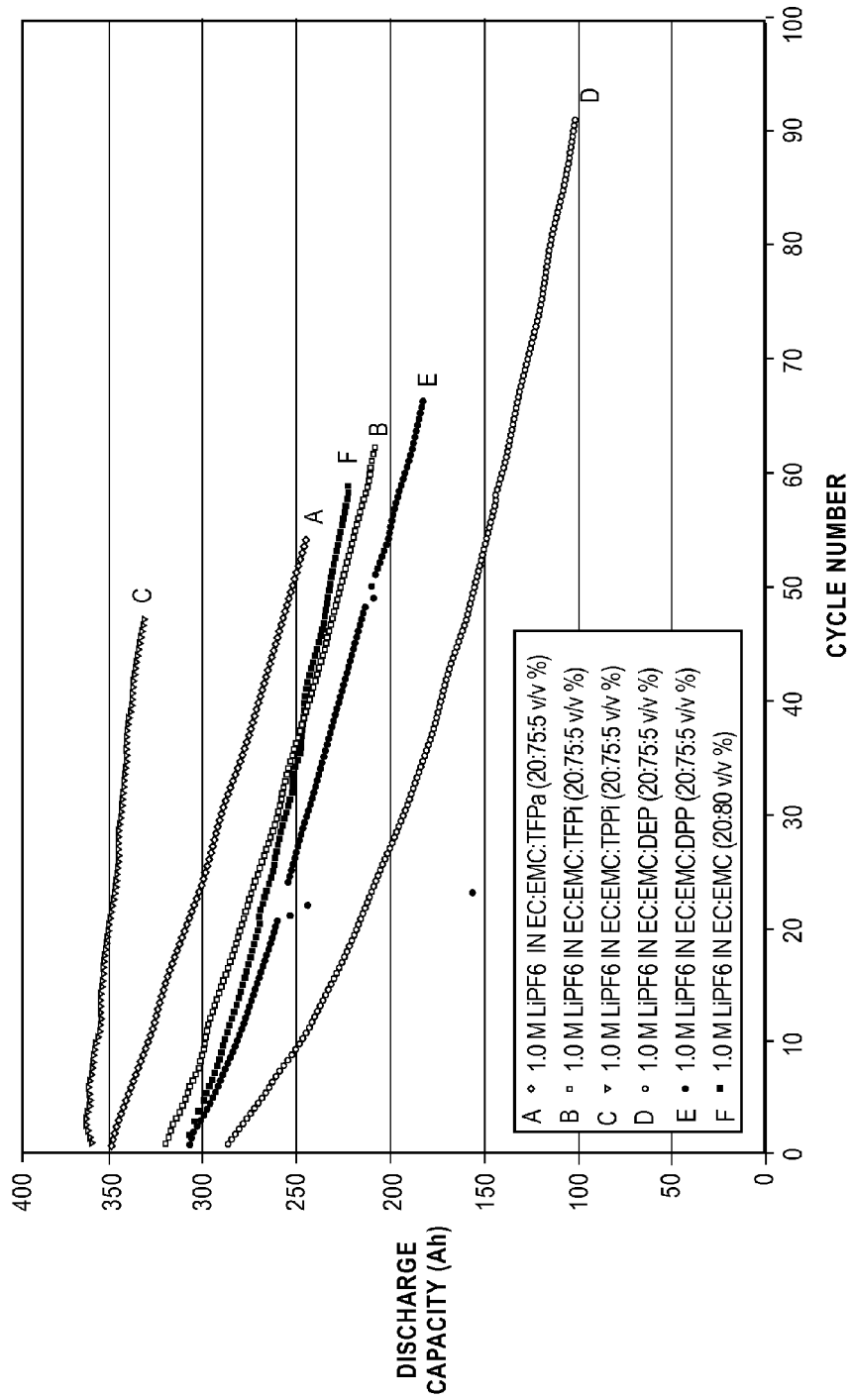
FIG. 11 is an illustration of a graph showing cycle life performance of MCMB-LiNiCoO$_2$ cells containing electrolytes with flame retardant additives according to the invention.

Cycle Life Performance. As mentioned previously, the general expectation is that the cycle life performance will be compromised with the addition of FRAs due to the possible reactivity with the electrode interfaces leading to impedance build-up and capacity loss. However, generally good cycle life performance was obtained in experimental cells, as illustrated in FIG. 11, with the cell containing the electrolyte with triphenyl phosphite additive delivering the best performance. FIG. 11 is an illustration of a graph showing cycle life performance of MCMB-LiNiCoO$_2$ cells containing electrolytes with flame retardant additives according to the invention. The x-axis shows cycle number and the y-axis shows discharge capacity in (mAh) (milli-Ampere-hours). To further improve the cycle life characteristics, the addition of SEI "film forming" additives is anticipated to impart enhanced stability to the system. It should also be noted that the cycle life performance is anticipated to be much better in aerospace quality lithium-ion cells, due to the fact that the data reflects experimental cells which are a flooded design, and not hermetically sealed.

Summary. The safety characteristics of Li-ion electrolytes have been further improved by the addition of flame retardant additives, such as tris(2,2,2-trifluoroethyl) phosphate, (b) tris (2,2,2-trifluoroethyl) phosphite, (c) triphenylphosphite, (d) diethyl ethylphosphonate, and (e) diethyl phenylphosphonate. A number of electrolytes based upon these additives have delivered good performance over a wide temperature range, good cycle life characteristics, and improved safety characteristics, namely reduced flammability. Of the additives investigated, the diethyl ethylphosphonate displayed the lowest irreversible capacity losses and high coulombic efficiency, suggesting that it displayed the least amount of electrochemical decomposition and did not participate in the electrode filming process to a great extent. Of the FRA-containing electrolytes studied, the formulation containing diethyl ethylphosphonate also delivered the best performance at low temperature, with over 85% of the room temperature capacity being delivered at the −20° C. using a C/16 discharge rate. With respect to cycle life performance, the formulation containing the triphenylphosphite electrolyte additive displayed the best performance. Further optimization of these electrolyte formulations is anticipated to yield improved performance. It is also anticipated that much improved performance will be demonstrated once these electrolyte solutions are incorporated into hermetically sealed large capacity, prototype cells, especially if effort is devoted to ensuring that all electrolyte components are highly pure.

Li-ion Electrolytes Containing Increased Concentrations of FRA

Description. A number of additional electrolyte formulations containing flame retardant additives were investigated and demonstrated in experimental MCMB carbon-LiNi$_{0.8}$Co$_{0.2}$O$_2$ cells. These electrolytes included: (1) formulations which incorporated greater concentrations of the flame retardant additive; (2) the use di-2,2,2-trifluoroethyl carbonate (DTFEC) as a co-solvent; (3) the use of 2,2,2- trifluoroethyl methyl carbonate (TFEMC) as a co-solvent; (4) the use of mono-fluoroethylene carbonate (FEC) as a co-solvent and/or a replacement for ethylene carbonate in the electrolyte mixture; and, (5) the use of vinylene carbonate (VC) as an "SEI promoting" electrolyte additive, to build on the favorable results previously obtained. The use of higher concentrations of the flame retardant additive is known to reduce the flammability of the electrolyte solution, thus, a range was investigated (e.g., 5% to 20% by volume). The desired concentration of the flame retardant additive is the greatest amount tolerable without adversely affecting the performance in terms of reversibility, ability to operate over a wide temperature range, and the discharge rate capability. Fluorinated carbonates, such as mono-fluoroethylene carbonate (FEC), may be used as both a fluorinated ester-based co-solvent, as well as a flame retardant additive.

The electrolytes developed which embodied these approaches included: (1) Approaches based on increased FRA concentrations: (a) 1.0 M $LiPF_6$ in EC+EMC+TPP (20:70:10 v/v %); (b) 1.0 M $LiPF_6$ in EC+EMC+TPPi (20:70:10 v/v %); and (c) 1.0 M $LiPF_6$ in EC+EMC+TPPi (20:80:20 v/v %); (2) Approaches based on the incorporation of di-2,2,2-trifluoroethyl carbonate: (a) 1.0 M $LiPF_6$ in EC+EMC+DT-FEC+TPP (20:50:20:10 v/v %); and (b) 1.0 M $LiPF_6$ in EC+EMC+DTFEC+TPP (20:30:40:10 v/v %); (3) Approaches based on the use of 2,2,2-trifluoroethyl methyl carbonate (TFEMC) and (4) mono-fluoroethylene carbonate (FEC): (a) 1.0 M $LiPF_6$ in EC+EMC+TFEMC+TPP (20:50:20:10 v/v %); (b) 1.0 M $LiPF_6$ in FEC+EMC+TFEMC+TPP (20:50:20:10 v/v %); and (c) 1.0 M $LiPF_6$ in FEC+EMC+TPP (20:70:10 v/v %); (5) Approaches based on the use of vinylene carbonate (VC): (a) 1.0 M $LiPF_6$ in EC+EMC+TPPi (20:75:5 v/v %)+1.5% VC; and (b) 1.0 M $LiPF_6$ FEC+EMC+TFEMC+TPP (20:50:20:10 v/v %)+1.5% VC; (where TPP=TPPa=triphenyl phosphate, TPPi=triphenyl phosphite, DTFEC=di-2,2,2-trifluoroethyl carbonate, TFEMC=2,2,2-trifluoroethyl methyl carbonate, FEC=mono-fluoroethylene carbonate, VC=vinylene carbonate, EC=ethylene carbonate, EMC=ethyl methyl carbonate).

A number of experimental lithium-ion cells, consisting of MCMB carbon anodes and $LiNi_{0.8}Co_{0.2}O_2$ cathodes, were fabricated to study the described technology. These cells served to verify and demonstrate the reversibility, low temperature performance, and electrochemical aspects of each electrode as determined from a number of electrochemical characterization techniques. The electrolytes selected for evaluation are listed above (electrolytes 1-5). FIG. 27 is an illustration of a table summary of formation characteristics of experimental MCMB-$LiNiCoO_2$ cells containing electrolytes with flame retardant additives subjected to formation cycling according to the invention. As shown in FIG. 27, in which the formation characteristics are shown for a number of cells containing electrolytes with triphenyl phosphate (TPP) as a flame retardant additive, all cells displayed good reversibility at room temperature and minimal reactivity during the formation cycling. The high coulombic efficiency and comparable irreversible capacity losses were indirectly related to the overall stability of the solutions and the electrode filming characteristics.

For comparison, two baseline electrolytes were investigated which do not contain any flame retardant additive or fluorinated solvents, namely 1.0M $LiPF_6$ in EC+DMC+DEC (1:1:1 v/v %) and 1.0M $LiPF_6$ in EC+EMC (20:80 v/v %). As shown in FIG. 27, notable features are that the FRA-containing electrolytes possess comparable couloumbic efficiency on the first cycle (e.g., above 83%), with 1.0 M $LiPF_6$ in EC+EMC+DTFEC+TPP (20:50:20:10 v/v %) and 1.0 M $LiPF_6$ in FEC+EMC+TPP (20:70:10 v/v %) displaying the highest values of 85.9% and 85.6%, respectively. Also of note is the fact that the FEC and TFEMC-containing carbonate blends displayed the highest coloumbic efficiency by the fifth cycle, all exhibiting over 98% efficiency (compared to ~(approximately) 97% shown by the baseline solutions), indicative of good stability. Furthermore, some of the solutions displayed much lower cumulative irreversible capacities compared to the baseline formulation, especially with the FEC containing electrolyte formulations which all displayed less than 104 mAh in contrast to the baseline solutions which exhibited greater than 126 mAh and 136 mAh, respectively.

Figure 29:
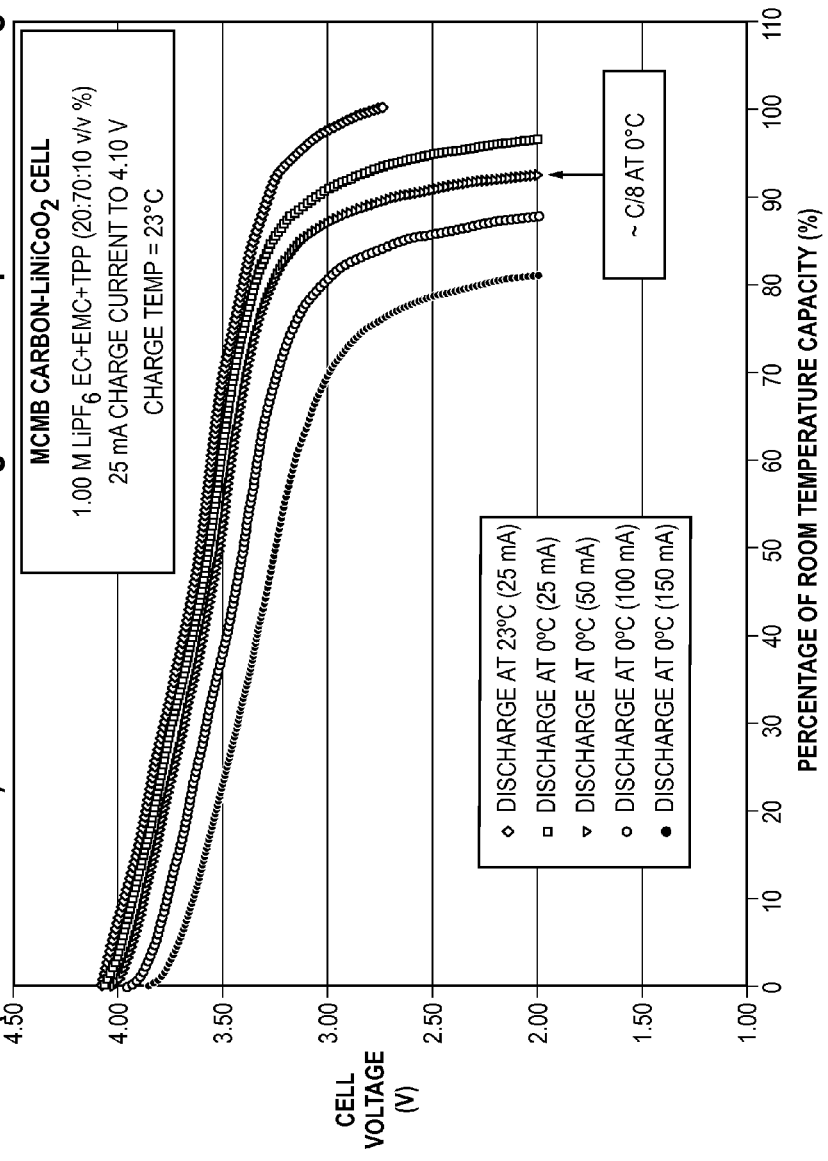
FIG. 29 is an illustration of a graph showing discharge performance at 0° C. (expressed as percent of room temperature capacity) of a ~400 mAh MCMB-$LiNiCoO_2$ cell containing 1.0 M $LiPF_6$ in EC+EMC+TPP (20:70:10 v/v %) according to the invention.
Figure 30:
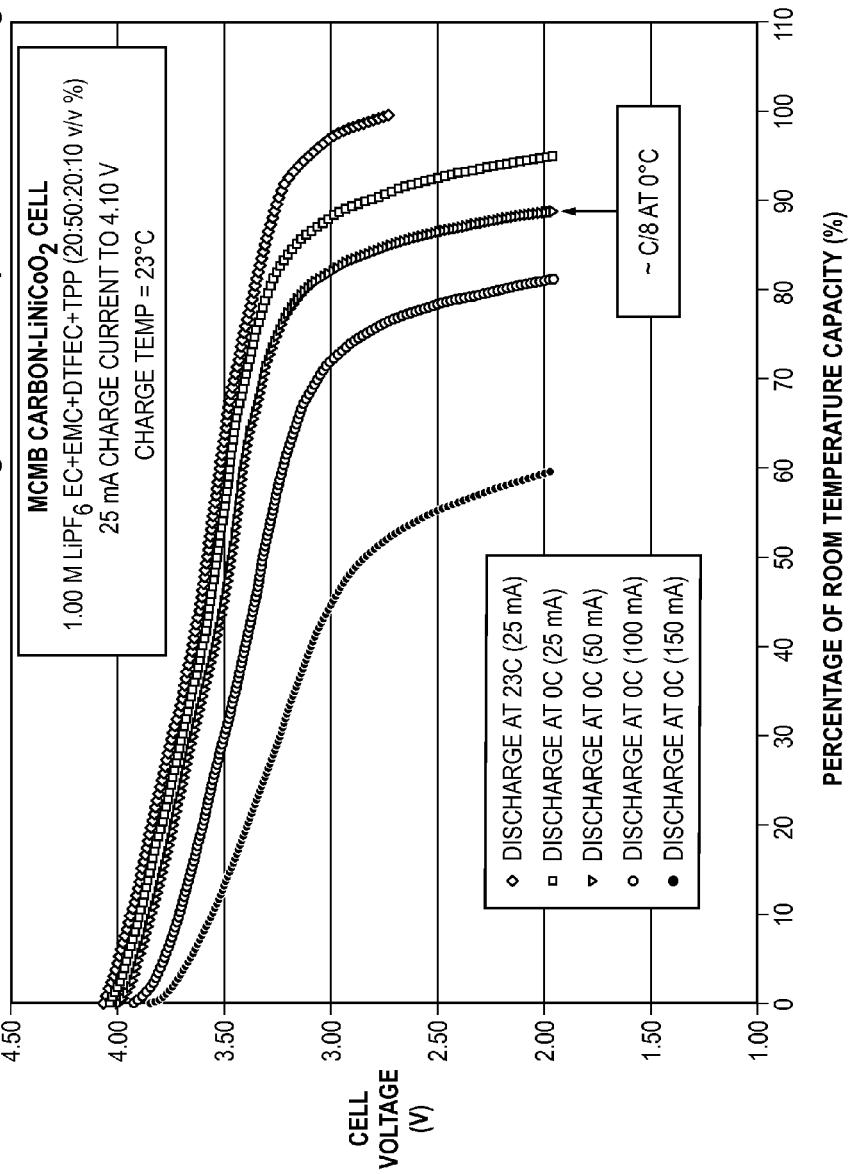
FIG. 30 is an illustration of a graph showing discharge performance at 0° C. (expressed as percent of room temperature capacity) of a MCMB-$LiNiCoO_2$ cell containing 1.0 M $LiPF_6$ in EC+EMC+DTFEC+TPP (20:50:20:10 v/v %) according to the invention.

Effect of Increased TPP Concentration and Incorporation of DTFEC on the Discharge Performance at Different Temperatures. When the cells containing electrolyte possessing 10% TPP with and without the incorporation of DTFEC described were evaluated at different rates and low temperatures, as shown in FIG. 28, reasonable low temperature performance was generally observed. FIG. 28 is an illustration of a table summary of discharge capacity at low temperature of a number of MCMB-$LiNiCoO_2$ cells containing electrolytes with flame retardant additives according to the invention. This finding was significant since the use of flame retardant additives was anticipated in decreasing the power capability and low temperature performance. As illustrated in FIG. 28, when 10% TPP was added to one of the baseline electrolytes, namely 1.0M $LiPF_6$ in EC+EMC (20:80 v/v %), minimal impact upon the low temperature discharge rate capability was observed, being essentially comparable at 0° C. over a range of discharge rates investigated. The performance of the cell containing 1.0 M $LiPF_6$ in EC+EMC+TPP (20:70:10 v/v %) at 0° C. is displayed in FIG. 29. FIG. 29 is an illustration of a graph showing discharge performance at 0° C. (expressed as percent of room temperature capacity) of a ~400 mAh MCMB-$LiNiCoO_2$ cell containing 1.0 M $LiPF_6$ in EC+EMC+TPP (20:70:10 v/v %) according to the invention. The x-axis shows percentage of room temperature capacity (%) and the y-axis shows cell voltage (V). When the performance of a cell containing an electrolyte possessing both 10% TPP and 20% DTFEC was evaluated under identical conditions, as shown in FIG. 30, somewhat decreased performance was observed, being more dramatic at higher rates and lower temperatures. FIG. 30 is an illustration of a graph showing discharge performance at 0° C. (expressed as percent of room temperature capacity) of a MCMB-$LiNiCoO_2$ cell containing 1.0 M $LiPF_6$ in EC+EMC+DTFEC+TPP (20:50:20:10 v/v %) according to the invention. The x-axis shows percentage of room temperature capacity (%) and the y-axis shows cell voltage (V). Thus, although this system was anticipated to have increased safety in contrast to an electrolyte with only TPP present, it was observed to have diminished performance capability at higher rates. When increased DTFEC was added to the system (e.g., 40% DTFEC by volume), this trend of decreased rate capability at lower temperature was further magnified.

Figure 31:
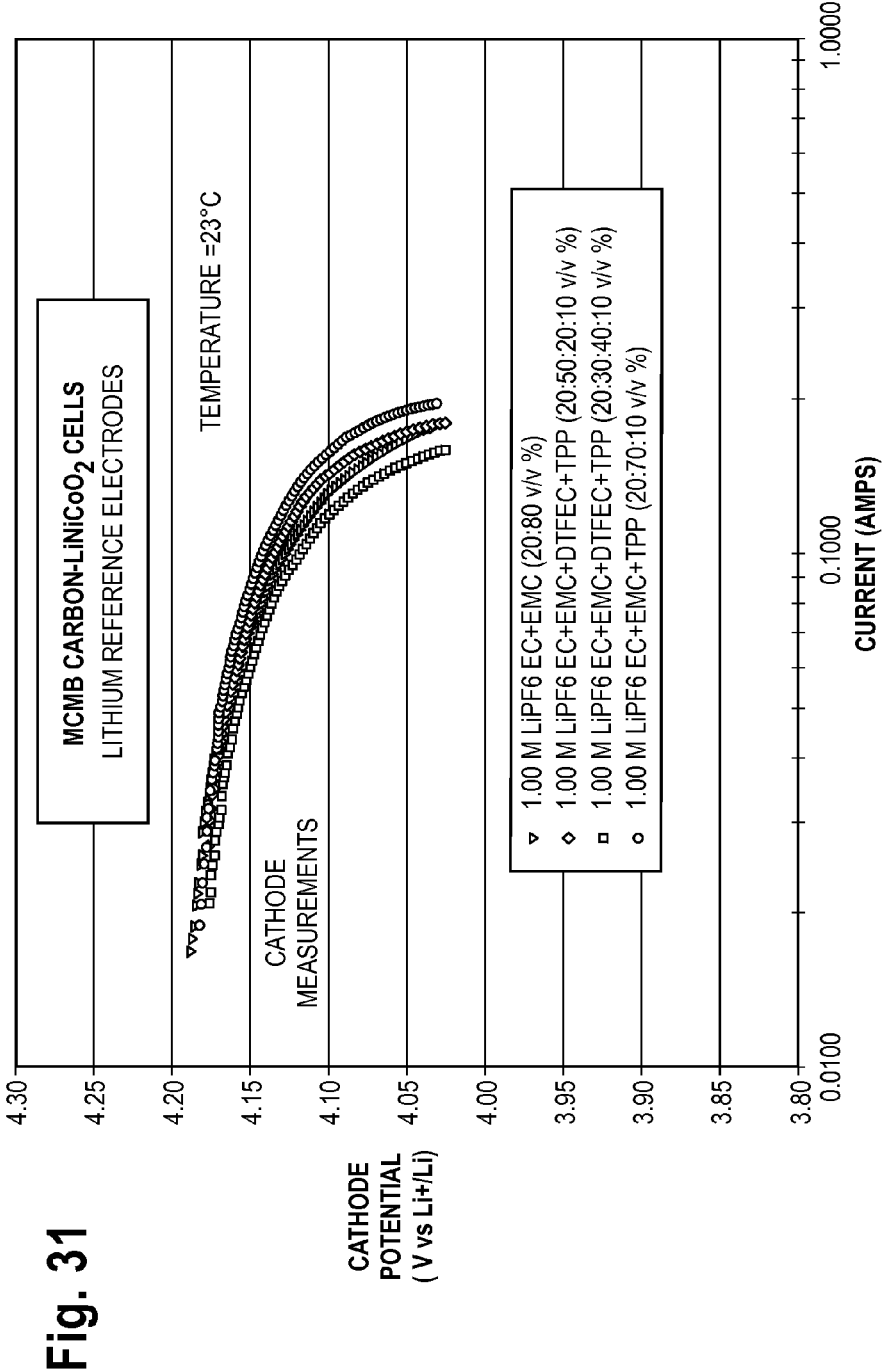
FIG. 31 is an illustration of a graph showing the Tafel polarization measurements of $LiNiCoO_2$ electrodes from MCMB-$LiNiCoO_2$ cells containing electrolytes with 10% TPP and with and without the addition of DTFEC according to the invention.

In order to further elucidate the nature of the performance characteristics of the cells containing the different electrolytes, Tafel polarization measurements were performed on both the anodes and cathodes at different temperature to determine the lithium intercalation/de-intercalation kinetics. The measurements were conducted on the cells while they were in a full SOC (state of charge) (OCV (open circuit voltage)=>4.07V) on each electrode while utilizing a lithium reference electrode. In all of these Tafel plots, there were distinct charge-transfer controlled regimes, where the overpotential increased linearly with log (I). The effect of mass transfer seems to be relatively insignificant, such that kinetic parameters, i.e., exchange current and transfer coefficients, can be derived. FIG. 31 is an illustration of a graph showing the Tafel polarization measurements of $LiNiCoO_2$ electrodes from $MCMB$-$LiNiCoO_2$ cells containing electrolytes with 10% TPP and with and without the addition of DTFEC according to the invention. The x-axis shows current (Amps) and the y-axis shows cathode potential (V versus $Li^+$/Li). As illustrated in FIG. 31, in which the Tafel polarization measurements have been performed on the $LiNiCoO_2$ cathodes at room temperature, the cell containing the 1.0 M $LiPF_6$ in EC+EMC+TPP (20:70:10 v/v %) electrolyte displayed enhanced lithium kinetics (i.e., higher limiting current densities) compared to the baseline system that does not contain the flame retardant additive. When the cell containing both the 10% TPP and 20% DTFEC was evaluated comparable kinetics to the baseline was observed. In contrast, when 40% DTFEC was added to the electrolyte the resultant limiting current densities of the cathode were noticeably lower.

FIG. 32 is an illustration of a graph showing the Tafel polarization measurements of MCMB electrodes from $MCMB$-$LiNiCoO_2$ cells containing electrolytes with 10% TPP and with and without the addition of DTFEC according to the invention. The x-axis shows current (Amps) and the y-axis shows anode potential (V versus $Li^+$/Li). When the Tafel polarization measurements were performed on the MCMB anodes at room temperatures, as shown in FIG. 32, both the incorporation of 10% TPP and DTFEC were observed to decrease the lithium de-intercalation kinetics compared to the baseline composition. These results suggested that these compounds react at the anode interface to produce solid electrolyte interface (SEI) layers that do not allow facile movement of lithium-ions at high rates. To mitigate this behavior "SEI promoting" additives can be added to the electrolyte to further improve the nature of the interface.

Effect of Increased TPP Concentration and Incorporation of TFEMC and FEC on the Discharge Performance at Different Temperatures. In addition to investigating trifluoroethyl butyrate and di-2,2,2-trifluoroethyl carbonate as co-solvents in multi-component mixtures, other fluorinated carbonates were incorporated into electrolyte formulations with the intent of further lower the flammability of the system, such as 2,2,2-trifluoroethyl methyl carbonate and mono-fluoroethylene carbonate. As mentioned previously, when electrolytes containing these co-solvents and 10% TPP were added to $MCMB$-$LiNiCoO_2$ cells, good reversibility, high coulombic efficiency and low irreversible capacities were observed. When the cells were evaluated at different rates and different temperatures, good performance was observed being comparable to the baseline formulations, as shown in FIG. 33. FIG. 33 is an illustration of a table summary of discharge capacity at low temperature of a number of $MCMB$-$LiNiCoO_2$ cells containing electrolytes with 10% TPP and TFEMC and/or FEC according to the invention.

Figure 34:
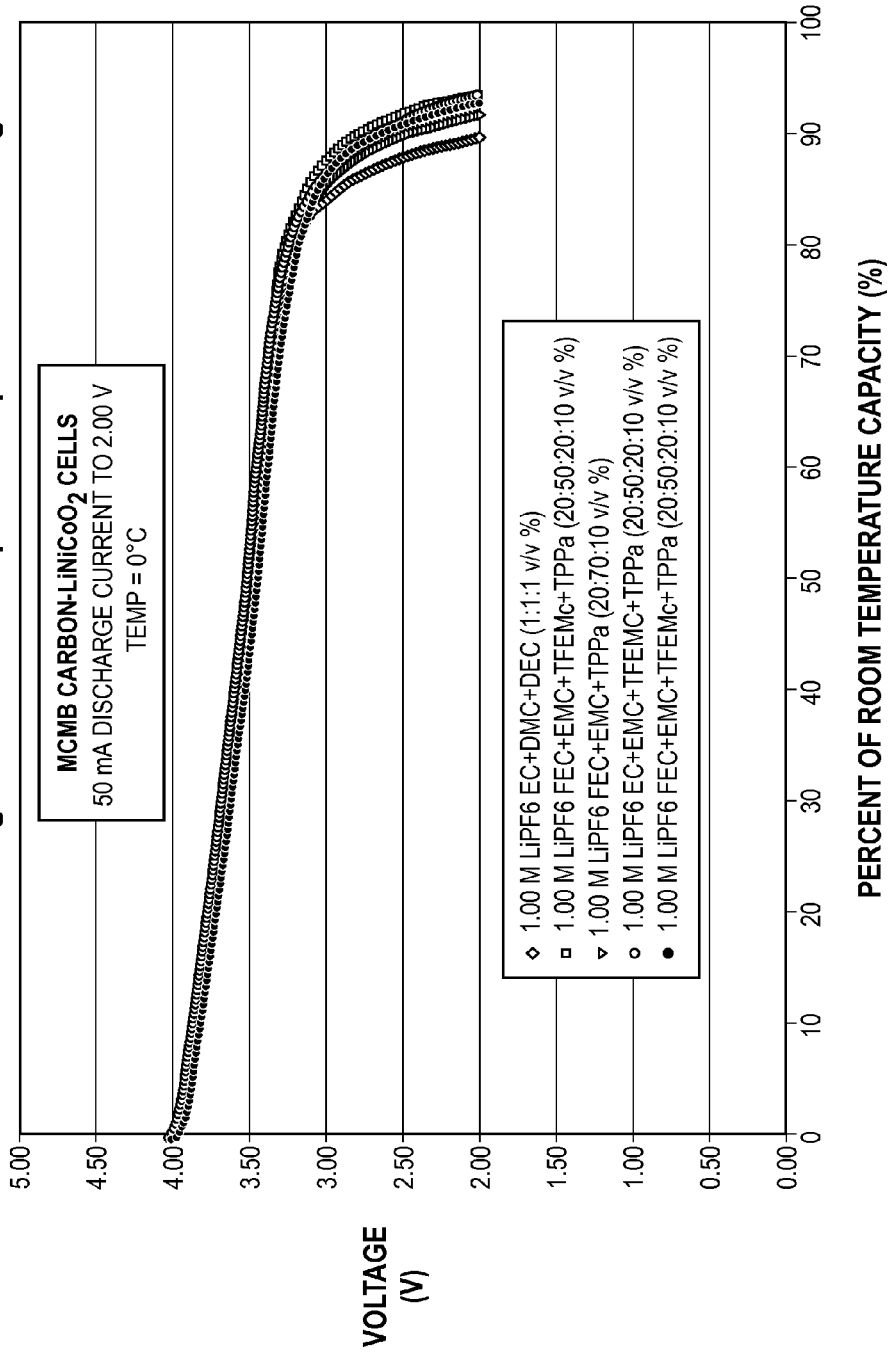
FIG. 34 is an illustration of a graph showing discharge performance at 0° C. using a ~C/8 discharge rate to 2.0 V (volts) according to the invention.

FIG. 34 is an illustration of a graph showing discharge performance at 0° C. using a ~C/8 discharge rate to 2.0 V (volts) according to the invention. The x-axis shows percent of room temperature capacity (%) and the y-axis shows Voltage (V). As illustrated in FIG. 34, good performance was delivered from the cells containing 10% triphenyl phosphate and trifluoroethyl methyl carbonate and/or fluoroethylene carbonate when evaluated at a ~C/8 discharge rate (50 mA) at 0° C. In all cases, the cells were observed to deliver more capacity than the baseline system, with the cell containing the 1.0 M $LiPF_6$ in FEC+EMC+TFEMC+TPP (20:50:20:10 v/v %) electrolyte exhibiting the best performance.

Evaluation of FRA-Containing Electrolyte Formulations in Conjunction with High Voltage, High Capacity Cathode Materials. In addition to evaluating the electrolytes in $MCMB$-$LiNiCoO_2$ cells, a number of the formulations were investigated in Li—Li($Li_{0.17}Ni_{0.25}Mn_{0.58})O_2$ cells to determine their compatibility with high voltage, high capacity cathode materials. These systems are typically charged to a much higher potential (e.g., 4.80V) than the commonly used lithium nickel cobalt oxide materials.

FIG. 35 is an illustration of a table summary of the formation characteristics of a number of Li—Li($Li_{0.17}Ni_{0.25}Mn_{0.58})O_2$ cells containing various electrolytes with TPP and TPPi flame retardant additives according to the invention. As illustrated in FIG. 35, Li—Li($Li_{0.17}Ni_{0.25}Mn_{0.58})O_2$ cells containing a "baseline" electrolyte that does not contain any flame retardant additives delivered an average of 234 mAh/g reversible capacity when cycled to 4.80V vs Li+/Li using C/20 charge and discharge rates. When triphenyl phosphate (TPP) was incorporated into the electrolyte formulation very little loss in reversible capacity is observed, with the cells displaying an average of 228 and 221 mAh/g being displayed with 5% TPP and 10% TPP, respectively. Slightly lower reversible capacity was observed with the incorporation of 10% TPP and 20% DTFEC (e.g., 216 mAh/g). In contrast, the use of triphenyl phosphite (TPPi) was accompanied by a sharp decline in the performance, resulting in much lower reversible capacity and an increase in the irreversible capacity. Similar trends in the rate capability at room temperature were observed for the cells.

Demonstration of FRA-Containing Electrolytes in High Capacity Prototype Li-Ion Cells. To further assess the performance characteristics of candidate electrolyte formulations, a number of high capacity, hermetically sealed Li-ion cells were fabricated with one of the promising electrolyte solutions, namely 1.0M $LiPF_6$ in EC+EMC+TPP+VC (19.7/73.9/4.9/1.5 v/v %). Thus, a number of 7 Ah $MCMB$-$LiNiCoO_2$ Li-Ion cells were obtained from Yardney Technical Products, Inc. of Pawcatuck, Conn., that incorporated this electrolyte. After the formation process at the vendor, the cells were subjected to conditioning cycling at various temperatures (20° C., 0° C., and −20° C.) to determine the reversible capacity, the specific energy, and the impedance of the cells. After completing the initial characterization testing, a number of performance tests were performed on the cells, including evaluating: (a) the discharge rate performance at various temperatures, (b) the charge rate performance at various temperatures, and (c) determining the cycle life characteristics. FIG. 36 is an illustration of a table summary of discharge performance of a 7 Ah Li-ion cell containing 1.0M $LiPF_6$ in EC+EMC+TPP+VC (19.7/73.9/4.9/1.5 v/v %) according to the invention. As shown in FIG. 36, the discharge rate characterization testing was performed over a wide temperature range (20° to −60° C.) and a wide range of discharge rates (e.g., C/100 to 1.0 C). The cells were charged at room temperature and discharged to 2.0V (the initial measurement at C/5 and 20° C. was performed only down to 2.75V). As illustrated, the cells displayed good rate capability down to very low temperatures, being able to support moderate rates to temperatures as low as −50° C.

Figure 37:
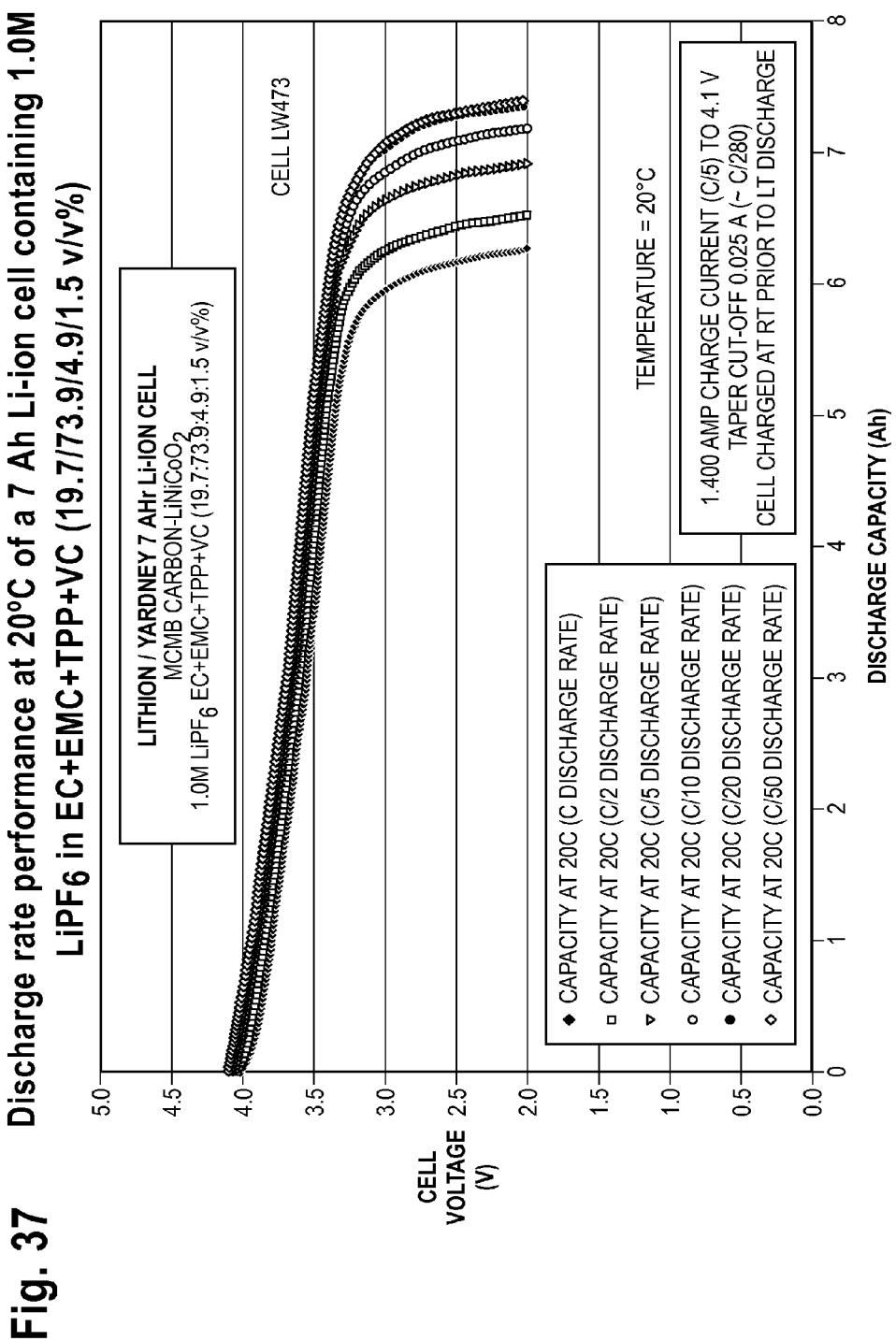
FIG. 37 is an illustration of a graph showing discharge rate performance at 20° C. of a 7 Ah Li-ion cell containing 1.0M $LiPF_6$ in EC+EMC+TPP+VC (19.7/73.9/4.9/1.5 v/v %) according to the invention.

FIG. 37 is an illustration of a graph showing discharge rate performance at 20° C. of a 7 Ah Li-ion cell containing 1.0M $LiPF_6$ in EC+EMC+TPP+VC (19.7/73.9/4.9/1.5 v/v %) according to the invention. The x-axis shows discharge capacity (Ah) and the y-axis shows cell voltage (V). In FIG. 37, the discharge rate performance of the cell is displayed at 20° C., illustrated that superior performance was obtained in the prototype cells compared to the data generated with the experimental three electrode cells. This trend has also been observed with a number of electrolyte formulations that have been scaled up to industrially manufactured Li-ion cells.

As mentioned above, charge rate characterization testing was also performed on the 7 Ah Li-ion cells, which consisted of evaluating the cell at different temperatures (20° C., 10° C., 0° C., and −10° C.) and different charge rates (ranging up to a C rate charge). Charging consisted of employing constant current to a constant potential of 4.10V, followed by taper current cut-off of C/100. It was observed that the cell could be effectively charged over the range of conditions investigated, without the evidence of lithium plating occurring which can be deleterious to cell health.

Figure 38:
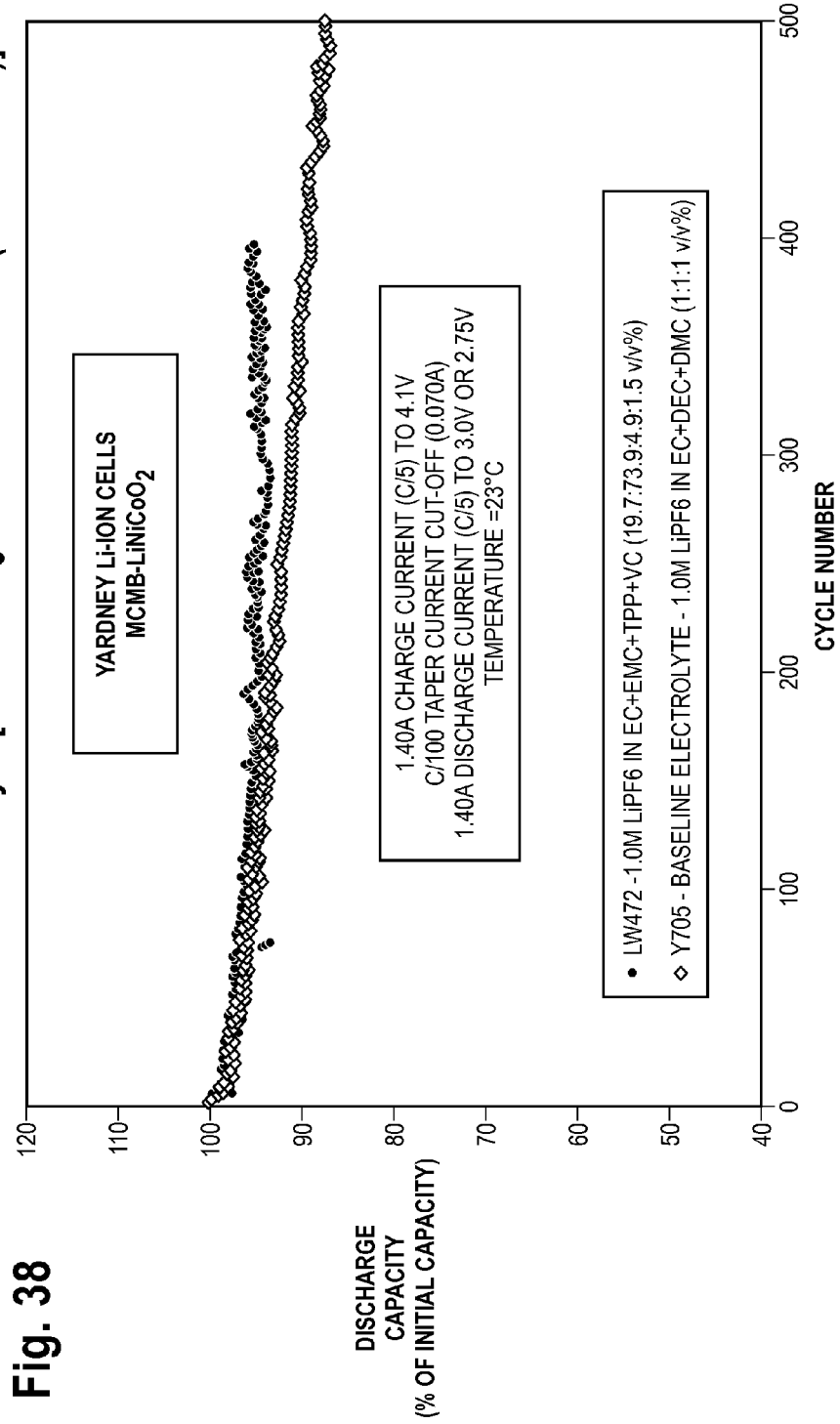
FIG. 38 is an illustration of a graph showing 100% depth of discharge (DOD) cycling of 7 Ah Li-ion cell containing flame retardant additive containing electrolyte [1.0M $LiPF_6$ in EC+EMC+TPP+VC (19.7/73.9/4.9/1.5 v/v %)] and the baseline electrolyte [1.0M $LiPF_6$ in EC+DMC+DEC (1:1:1 v/v %)] according to the invention; and, FIG. 39 is an illustration of a partially exploded view of a lithium-ion electrochemical cell constructed according to one embodiment of the invention.

In addition to these tests, a 100% depth-of-discharge (DOD) test was implemented using C/5 charge and discharge rates (over a voltage range of 2.75V to 4.10V). FIG. 38 is an illustration of a graph showing 100% depth of discharge (DOD) cycling of 7 Ah Li-ion cell containing flame retardant additive containing electrolyte [1.0M LiPF$_6$ in EC+EMC+TPP+VC (19.7/73.9/4.9/1.5 v/v %)] and the baseline electrolyte [1.0M LiPF$_6$ in EC+DMC+DEC (1:1:1 v/v %)] according to the invention. The x-axis shows cycle number and the y-axis shows discharge capacity (% of initial capacity). As illustrated in FIG. 38, excellent cycle life performance has been obtained thus far, with approximately 400 cycles being completed while still retaining 95% of the initial capacity. The cycle life observed was actually superior to that obtained with a similar cell containing the baseline electrolyte formulation, namely 1.0M LiPF$_6$ in EC+DMC+DEC (1:1:1 v/v %).

It is expected that other FRAs in the same or similar classes of compounds as discussed above, can work in a similar fashion in the invention, i.e., phosphates, phosphites, and phosphonates.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. An electrolyte for use in a lithium-ion electrochemical cell, the electrolyte comprising a mixture of:
   an ethylene carbonate (EC);
   an ethyl methyl carbonate (EMC);
   a fluorinated co-solvent selected from a group consisting of fluorinated carbonates, fluorinated ester co-solvents, and fluorinated ethers;
   a flame retardant additive selected from a group consisting of fluorinated phosphate flame retardant additives, phosphite flame retardant additives, and phosphonate flame retardant additives; and,
   a lithium salt
   wherein the electrolyte comprises from about 5% to about 30% by volume flame retardant additive.

2. The electrolyte of claim 1 wherein the fluorinated co-solvent is selected from the group consisting of 2,2,2-trifluoroethyl butyrate (TFEB), di-2,2,2-trifluoroethyl carbonate (DTFEC), 2,2,2-trifluoroethyl methyl carbonate (TFEMC), mono-fluoroethylene carbonate (FEC), ethyl trifluoroacetate (ETFA), 2,2,2-trifluoroethyl acetate (TFEA), 2,2,2-trifluoroethyl propionate (TFEP), ethyl-2,2,2-trifluoroethyl carbonate (ETFEC), propyl-2,2,2-trifluoroethyl carbonate (PTFEC), methyl-2,2,2,2',2',2'-hexafluoro-i-propyl carbonate (MHFPC), ethyl-2,2,2,2',2',2'-hexafluoro-i-propyl carbonate (EHFPC), fluoropropylene carbonate (FPC), trifluoropropylene carbonate (TFPC), methyl nonafluorobutyl ether, 2,2,3,3,3-pentafluoropropyl methyl ether, 1,1,3,3,3-pentafluoro-2-trifluoromethyl ether, 2,2,3,3-tetrafluoropropyl difluoromethyl ether, 1,1,2,3,3,3-hexafluoropropyl ethyl ether, and perfluoropolyether.

3. The electrolyte of claim 1 wherein the flame retardant additive is selected from the group consisting of bis(2,2,2-trifluoroethyl) methyl phosphonate (BTFEMP/TFMPo), triphenyl phosphite, tris(2,2,2-trifluoroethyl) phosphate, tris(2,2,2-trifluoroethyl) phosphite, diethyl ethylphosphonate, and diethyl phenylphosphonate.

4. The electrolyte of claim 1 wherein the lithium salt is selected from the group consisting of lithium hexafluorophosphate (LiPF$_6$), lithium tetrafluoroborate (LiBF$_4$), lithium bis(oxalate) borate (LiBOB), lithium hexafluoroarsenate (LiAsF$_6$), lithium perchlorate (LiClO$_4$), lithium trifluoromethanesulfonate (LiCF$_3$SO$_3$), lithium bistrifluoromethanesulfonate sulfonyl imide (LiN(SO$_2$CF$_3$)$_2$), and mixtures thereof.

5. The electrolyte of claim 1 wherein the electrolyte comprises from about 10% to about 60% by volume fluorinated co-solvent.

6. The electrolyte of claim 1 wherein the electrolyte comprises from about 5% to about 15% by volume flame retardant additive.

7. The electrolyte of claim 1 wherein the electrolyte comprises 1.0 M LiPF$_6$ in 20% by volume ethylene carbonate (EC) plus 55% by volume ethyl methyl carbonate (EMC) plus 20% by volume 2,2,2-tri-fluoroethyl butyrate (TFEB) plus 5% by volume triphenyl phosphite.

8. A lithium-ion electrochemical cell comprising:
   an anode;
   a cathode;
   an electrolyte interspersed between the anode and the cathode, wherein the electrolyte comprises a mixture of:
      an ethylene carbonate (EC);
      an ethyl methyl carbonate (EMC);
      a fluorinated co-solvent selected from the group consisting 2,2,2-trifluoroethyl butyrate (TFEB), di-2,2,2-trifluoroethyl carbonate (DTFEC), 2,2,2-trifluoroethyl methyl carbonate (TFEMC), mono-fluoroethylene carbonate (FEC), ethyl trifluoroacetate (ETFA), 2,2,2-trifluoroethyl acetate (TFEA), 2,2,2-trifluoroethyl propionate (TFEP), ethyl-2,2,2-trifluoroethyl carbonate (ETFEC), propyl-2,2,2-trifluoroethyl carbonate (PTFEC), methyl-2,2,2,2',2',2'-hexafluoro-i-propyl carbonate (MHFPC), ethyl-2,2,2,2',2',2'-hexafluoro-i-propyl carbonate (EHFPC), fluoropropylene carbonate (FPC), trifluoropropylene carbonate (TFPC), methyl nonafluorobutyl ether, 2,2,3,3,3-pentafluoropropyl methyl ether, 1,1,3,3,3-pentafluoro-2-trifluoromethyl ether, 2,2,3,3-tetrafluoropropyl difluoromethyl ether, 1,1,2,3,3,3-hexafluoropropyl ethyl ether, and perfluoropolyether;
      a flame retardant additive selected from the group consisting of triphenyl phosphate (TPhPh/TPP/TPPa), tributyl phosphate (TBuPh), triethyl phosphate (TEtPh), bis(2,2,2-trifluoroethyl) methyl phosphonate (TFMPo), triphenyl phosphite, tris(2,2,2-trifluoroethyl) phosphate, tris(2,2,2-trifluoroethyl) phosphite, diethyl ethylphosphonate, and diethyl phenylphosphonate; and,
      a lithium salt,
   wherein the electrochemical cell operates in a temperature range of from about −50 degrees Celsius to about 60 degrees Celsius and further wherein the electrolyte comprises from about 5% to about 30% by volume flame retardant additive.

9. A lithium-ion electrochemical cell comprising:
an anode;
a cathode;
an electrolyte interspersed between the anode and the cathode, wherein the electrolyte comprises a mixture of:
an ethylene carbonate (EC);
an ethyl methyl carbonate (EMC);
a fluorinated co-solvent selected from the group consisting 2,2,2-trifluoroethyl butyrate (TFEB), di-2,2,2-trifluoroethyl carbonate (DTFEC), 2,2,2-trifluoroethyl methyl carbonate (TFEMC), mono-fluoroethylene carbonate (FEC), ethyl trifluoroacetate (ETFA), 2,2,2-trifluoroethyl acetate (TFEA), 2,2,2-trifluoroethyl propionate (TFEP), ethyl-2,2,2-trifluoroethyl carbonate (ETFEC), propyl-2,2,2-trifluoroethyl carbonate (PTFEC), methyl-2,2,2,2',2',2'-hexafluoro-i-propyl carbonate (MHFPC), ethyl-2,2,2,2',2',2'-hexafluoro-i-propyl carbonate (EHFPC), fluoropropylene carbonate (FPC), trifluoropropylene carbonate (TFPC), methyl nonafluorobutyl ether, 2,2,3,3,3-pentafluoropropyl methyl ether, 1,1,3,3,3-pentafluoro-2-trifluoromethyl ether, 2,2,3,3-tetrafluoropropyl difluoromethyl ether, 1,1,2,3,3,3-hexafluoropropyl ethyl ether, and perfluoropolyether;
a flame retardant additive selected from the group consisting of triphenyl phosphate (TPhPh/TPP/TPPa), tributyl phosphate (TBuPh), triethyl phosphate (TEtPh), bis(2,2,2-trifluoroethyl) methyl phosphonate (TFMPo), triphenyl phosphite, tris(2,2,2-trifluoroethyl) phosphate, tris(2,2,2-trifluoroethyl) phosphite, diethyl ethylphosphonate, and diethyl phenylphosphonate; and,
a lithium salt,
wherein the electrochemical cell operates in a temperature range of from about −50 degrees Celsius to about 60 degrees Celsius and further wherein the electrolyte comprises 1.0 M $LiPF_6$ lithium salt in 20% by volume ethylene carbonate (EC) plus 55% by volume ethyl methyl carbonate (EMC) plus 20% by volume 2,2,2-tri-fluoroethyl butyrate (TFEB) plus 5% by volume triphenyl phosphate (TPhPh/TPP/TPPa).

* * * * *